(12) United States Patent
Loveland et al.

(10) Patent No.: US 11,205,072 B2
(45) Date of Patent: Dec. 21, 2021

(54) SOLAR RAY MAPPING VIA DIVERGENT BEAM MODELING

(71) Applicant: Loveland Innovations, LLC, Pleasant Grove, UT (US)

(72) Inventors: Jim Loveland, Alpine, UT (US); Leif Larson, Alpine, UT (US); Dan Christiansen, Alpine, UT (US); Tad Christiansen, Alpine, UT (US); Daniel Gerszewski, Lehi, UT (US)

(73) Assignee: Loveland Innovations, LLC, Pleasant Grove, UT (US)

( * ) Notice: Subject to any disclaimer, the term of this patent is extended or adjusted under 35 U.S.C. 154(b) by 0 days.

(21) Appl. No.: 17/087,074

(22) Filed: Nov. 2, 2020

(65) Prior Publication Data

US 2021/0117677 A1    Apr. 22, 2021

Related U.S. Application Data

(60) Continuation-in-part of application No. 16/865,158, filed on May 1, 2020, which is a continuation-in-part
(Continued)

(51) Int. Cl.
*G06K 9/00* (2006.01)
*G01J 1/44* (2006.01)
(Continued)

(52) U.S. Cl.
CPC ........ *G06K 9/00637* (2013.01); *B64C 39/024* (2013.01); *G01J 1/44* (2013.01);
(Continued)

(58) Field of Classification Search
CPC ...... G06K 9/0063; G01C 11/02; H04N 7/185; G06T 7/0053
See application file for complete search history.

(56) References Cited

U.S. PATENT DOCUMENTS

| | | | |
|---|---|---|---|
| 5,721,691 | A | 2/1998 | Wuller |
| 6,037,945 | A | 3/2000 | Loveland |

(Continued)

FOREIGN PATENT DOCUMENTS

| | | |
|---|---|---|
| WO | 2016/053438 | 4/2016 |
| WO | 2018/089268 | 5/2018 |

OTHER PUBLICATIONS

USPTO Non-final Office Action; U.S. Appl. No. 15/388,754; dated May 26, 2017.
(Continued)

*Primary Examiner* — Nam D Pham
(74) *Attorney, Agent, or Firm* — Phillips Winchester; Justin K. Flanagan

(57) ABSTRACT

Systems, methods, and computer-readable media are described herein to model divergent beam ray paths between locations on a roof (e.g., of a structure) and modeled locations of the sun at different times of the day and different days during a week, month, year, or another time period. Obstructed and unobstructed divergent beam ray paths are identified. Unobstructed divergent beam ray paths contribute to the calculation of a solar irradiance value for each location on the roof. Divergent beam ray paths, such as cones or pyramid ray paths, allow for sparse or lower-resolution spatial and/or temporal sampling without sacrificing obstacle detection.

20 Claims, 34 Drawing Sheets

Related U.S. Application Data of application No. 16/522,948, filed on Jul. 26, 2019, now Pat. No. 10,733,443, which is a division of application No. 16/228,019, filed on Dec. 20, 2018, now Pat. No. 10,366,287.

(60) Provisional application No. 63/107,585, filed on Oct. 30, 2020, provisional application No. 62/842,961, filed on May 3, 2019, provisional application No. 62/722,714, filed on Aug. 24, 2018.

(51) Int. Cl.
  *B64C 39/02* (2006.01)
  *G06K 9/20* (2006.01)
  *G01J 1/42* (2006.01)

(52) U.S. Cl.
  CPC ..... *G06K 9/00657* (2013.01); *G06K 9/00805* (2013.01); *G06K 9/2018* (2013.01); *B64C 2201/123* (2013.01); *G01J 2001/4276* (2013.01)

(56) References Cited

U.S. PATENT DOCUMENTS

| | | | |
|---|---|---|---|
| 6,137,896 | A | 10/2000 | Chang |
| 6,292,575 | B1 | 9/2001 | Bortolussi et al. |
| 6,333,749 | B1 | 12/2001 | Reinhardt et al. |
| 6,563,023 | B2 | 5/2003 | Liu et al. |
| 6,810,383 | B1 | 10/2004 | Loveland |
| 6,816,819 | B1 | 11/2004 | Loveland |
| 6,826,539 | B2 | 11/2004 | Loveland |
| 6,829,584 | B2 | 12/2004 | Loveland |
| 7,363,157 | B1 | 4/2008 | Hanna |
| 7,447,564 | B2 | 11/2008 | Yasukawa |
| 7,868,812 | B2 | 1/2011 | Huthoefer |
| 8,078,436 | B2 | 12/2011 | Pershing |
| 8,159,662 | B2 | 4/2012 | Rezac |
| 8,170,840 | B2 | 5/2012 | Pershing |
| 8,209,152 | B2 | 6/2012 | Pershing |
| 8,229,768 | B1 | 7/2012 | Hopkins, III |
| 8,345,578 | B2 | 1/2013 | Thoumy |
| 8,346,578 | B1 | 1/2013 | Hopkins, III et al. |
| 8,380,349 | B1 | 2/2013 | Hickman |
| 8,473,125 | B2 | 6/2013 | Rischmuller |
| 8,542,880 | B2 | 9/2013 | Thornberry |
| 8,577,616 | B2 | 11/2013 | Dunlap |
| 8,718,838 | B2 | 5/2014 | Kokkeby |
| 8,818,572 | B1 | 8/2014 | Tofte |
| 8,818,770 | B2 | 8/2014 | Pershing |
| 8,823,732 | B2 | 9/2014 | Adams |
| 8,825,454 | B2 | 9/2014 | Pershing |
| 9,036,861 | B2 | 5/2015 | Chen |
| 9,075,415 | B2 | 7/2015 | Kugelmass |
| 9,098,655 | B2 | 8/2015 | Plummer |
| 9,116,003 | B2 | 8/2015 | Khorashadi |
| 9,129,376 | B2 | 9/2015 | Pershing |
| 9,135,737 | B2 | 9/2015 | Pershing |
| 9,152,863 | B1 | 10/2015 | Grant |
| 9,162,753 | B1 | 10/2015 | Panto |
| 9,201,422 | B2 | 12/2015 | Ohtomo |
| 9,251,417 | B1 | 2/2016 | Xu |
| 9,501,061 | B2 | 11/2016 | Canoy |
| 9,501,700 | B2 | 11/2016 | Loveland |
| 9,505,494 | B1 | 11/2016 | Marlow |
| 9,513,635 | B1 | 12/2016 | Bethke |
| 9,563,201 | B1 | 2/2017 | Tofte |
| 9,609,288 | B1 * | 3/2017 | Richman ............... H04N 7/183 |
| 9,613,538 | B1 | 4/2017 | Poole |
| 9,618,940 | B1 | 4/2017 | Michini |
| 9,639,960 | B1 | 5/2017 | Loveland |
| 9,734,397 | B1 | 8/2017 | Larson |
| 9,805,261 | B1 | 10/2017 | Loveland |
| 9,805,489 | B2 | 10/2017 | Schultz |
| 9,823,658 | B1 | 11/2017 | Loveland |
| 9,836,882 | B2 | 12/2017 | Freund |
| 9,881,163 | B2 | 1/2018 | Schultz |
| 10,032,078 | B2 | 1/2018 | Schultz |
| 9,898,802 | B2 | 2/2018 | Giuffrida |
| 9,933,254 | B2 | 4/2018 | Thornberry |
| 9,953,112 | B2 | 4/2018 | Schultz |
| 9,959,609 | B2 | 5/2018 | Giuffrida |
| 9,959,653 | B2 | 5/2018 | Schultz |
| 9,959,667 | B2 | 5/2018 | Schultz |
| 9,972,126 | B2 | 5/2018 | Freund |
| 9,978,149 | B1 | 5/2018 | Zhang |
| 10,037,463 | B2 | 7/2018 | Schultz |
| 10,037,464 | B2 | 7/2018 | Schultz |
| 10,366,287 | B1 | 7/2019 | Loveland |
| 10,733,443 | B2 | 8/2020 | Loveland |
| 2002/0013644 | A1 | 1/2002 | Mekemson |
| 2002/0169664 | A1 | 11/2002 | Walker |
| 2003/0033242 | A1 | 2/2003 | Lynch |
| 2003/0123713 | A1 | 7/2003 | Geng |
| 2003/0210168 | A1 | 11/2003 | Ruszkowski, Jr. |
| 2004/0066917 | A1 | 4/2004 | Yasukawa |
| 2004/0167667 | A1 | 8/2004 | Goncalves |
| 2004/0167861 | A1 | 8/2004 | Hedley |
| 2004/0177373 | A1 | 9/2004 | Kawabe et al. |
| 2005/0267657 | A1 | 12/2005 | Devdhar |
| 2006/0133661 | A1 | 6/2006 | Takeda |
| 2006/0137736 | A1 | 6/2006 | Nishitani et al. |
| 2007/0233367 | A1 | 10/2007 | Chen |
| 2009/0201190 | A1 | 8/2009 | Huthoefer |
| 2009/0265193 | A1 | 10/2009 | Collins |
| 2010/0215212 | A1 | 8/2010 | Flakes |
| 2010/0277588 | A1 | 11/2010 | Ellsworth |
| 2010/0277723 | A1 | 11/2010 | Rezac |
| 2012/0237083 | A1 | 9/2012 | Lange |
| 2013/0216089 | A1 | 8/2013 | Chen |
| 2013/0325244 | A1 | 12/2013 | Wang |
| 2014/0153773 | A1 | 6/2014 | Gupta |
| 2014/0168420 | A1 | 6/2014 | Naderhirn |
| 2014/0316614 | A1 | 10/2014 | Newman |
| 2014/0316616 | A1 | 10/2014 | Kugelmass |
| 2014/0324405 | A1 | 10/2014 | Plummer |
| 2014/0336928 | A1 | 11/2014 | Scott |
| 2015/0019267 | A1 | 1/2015 | Prieto |
| 2015/0148955 | A1 | 5/2015 | Chin |
| 2015/0220085 | A1 | 8/2015 | Ohtomo |
| 2015/0225081 | A1 | 8/2015 | Kespry |
| 2015/0348204 | A1 | 12/2015 | Daues |
| 2015/0371346 | A1 | 12/2015 | Frendling |
| 2015/0377405 | A1 | 12/2015 | Down |
| 2016/0004795 | A1 | 1/2016 | Novak |
| 2016/0148363 | A1 | 5/2016 | Phan |
| 2016/0246304 | A1 | 8/2016 | Canoy |
| 2016/0247115 | A1 | 8/2016 | Pons |
| 2016/0253808 | A1 | 9/2016 | Metzler |
| 2016/0257424 | A1 | 9/2016 | Kespry |
| 2016/0272308 | A1 | 9/2016 | Gentry |
| 2016/0292872 | A1 | 10/2016 | Hammond |
| 2016/0301859 | A1 | 10/2016 | Tebay |
| 2016/0307447 | A1 | 10/2016 | Johnson |
| 2016/0321503 | A1 | 11/2016 | Zhou |
| 2016/0327959 | A1 | 11/2016 | Brown |
| 2016/0347462 | A1 | 12/2016 | Kespry |
| 2016/0363929 | A1 | 12/2016 | Kespry |
| 2016/0365825 | A1 | 12/2016 | Poivet |
| 2016/0377424 | A1 | 12/2016 | Clark |
| 2017/0053169 | A1 | 2/2017 | Cuban |
| 2017/0090481 | A1 | 3/2017 | Kespry |
| 2017/0123035 | A1 | 5/2017 | Kespry |
| 2017/0146344 | A1 | 5/2017 | Kespry |
| 2017/0193829 | A1 | 7/2017 | Bauer |
| 2017/0249510 | A1 | 8/2017 | Labrie |
| 2017/0270612 | A1 | 9/2017 | Howe |
| 2017/0270650 | A1 | 9/2017 | Howe |
| 2020/0065583 | A1 | 2/2020 | Loveland |
| 2020/0293773 | A1 | 9/2020 | Loveland |

(56) References Cited

OTHER PUBLICATIONS

USPTO Non-final Office Action; U.S. Appl. No. 15/360,630; dated Apr. 13, 2017.
USPTO Non-final Office Action; U.S. Appl. No. 15/480,310; dated May 15, 2017.
USPTO Final Office Action; U.S. Appl. No. 15/444,164; dated Jul. 14, 2017.
USPTO Notice of Allowance; U.S. Appl. No. 15/360,630; dated Jun. 21, 2017.
USPTO Notice of Allowance; U.S. Appl. No. 15/360,641; dated Mar. 17, 2017.
USPTO Notice of Allowance; U.S. Appl. No. 15/388,754; dated Oct. 5, 2017.
Autonomous MAV—Cues, Cooper Bills et al., IEEE, 978-1-61284-385-8, 2011, pp. 5776-5783.
Unmanned—Monitoring, C. Eschmann et al., ResearchGate, 2012, pp. 1-8.
USPTO Final Office Action; U.S. Appl. No. 15/446,202; dated Nov. 8, 2017.
USPTO Non-final Office Action; U.S. Appl. No. 15/444,164; dated Apr. 21, 2017.
USPTO Non-final Office Action; U.S. Appl. No. 15/446,202; dated Jun. 28, 2017.
PCT Application No. PCT/US2017/059990, International Search Report dated Jan. 29, 2018.
PCT Application No. PCT/US2017/059990, Written Opinion dated Jan. 29, 2018.
U.S. Appl. No. 15/796,672, Non-Final Office Action dated Dec. 14, 2017.
U.S. Appl. No. 15/708,471, Non-Final Office Action dated Jan. 5, 2018.
U.S. Appl. No. 15/796,672, Final Office Action dated Jun. 25, 2018.
U.S. Appl. No. 15/446,202, Notice of Allowance dated Jul. 5, 2018.
U.S. Appl. No. 15/446,202, Non-Final Office Action dated Feb. 22, 2018.

\* cited by examiner

| Panel Size | Qty. | Watts | Price |
|---|---|---|---|
| 2'X4' Panels = $235.00 | 4 | 600 | $940.00 |
| 3'X6' Panels = $270.00 | 2 | 400 | $540.00 |
| 4'X6' Panels = $350.00 | 0 | 0 | 0 |
| 4'X8' Panels = $525.00 | 0 | 0 | 0 |
| Subtotals: | 6 | 1000 | $1480.00 |

Number of Months: 60

= $24.66 per Mo.

Back    Continue

FIG. 14

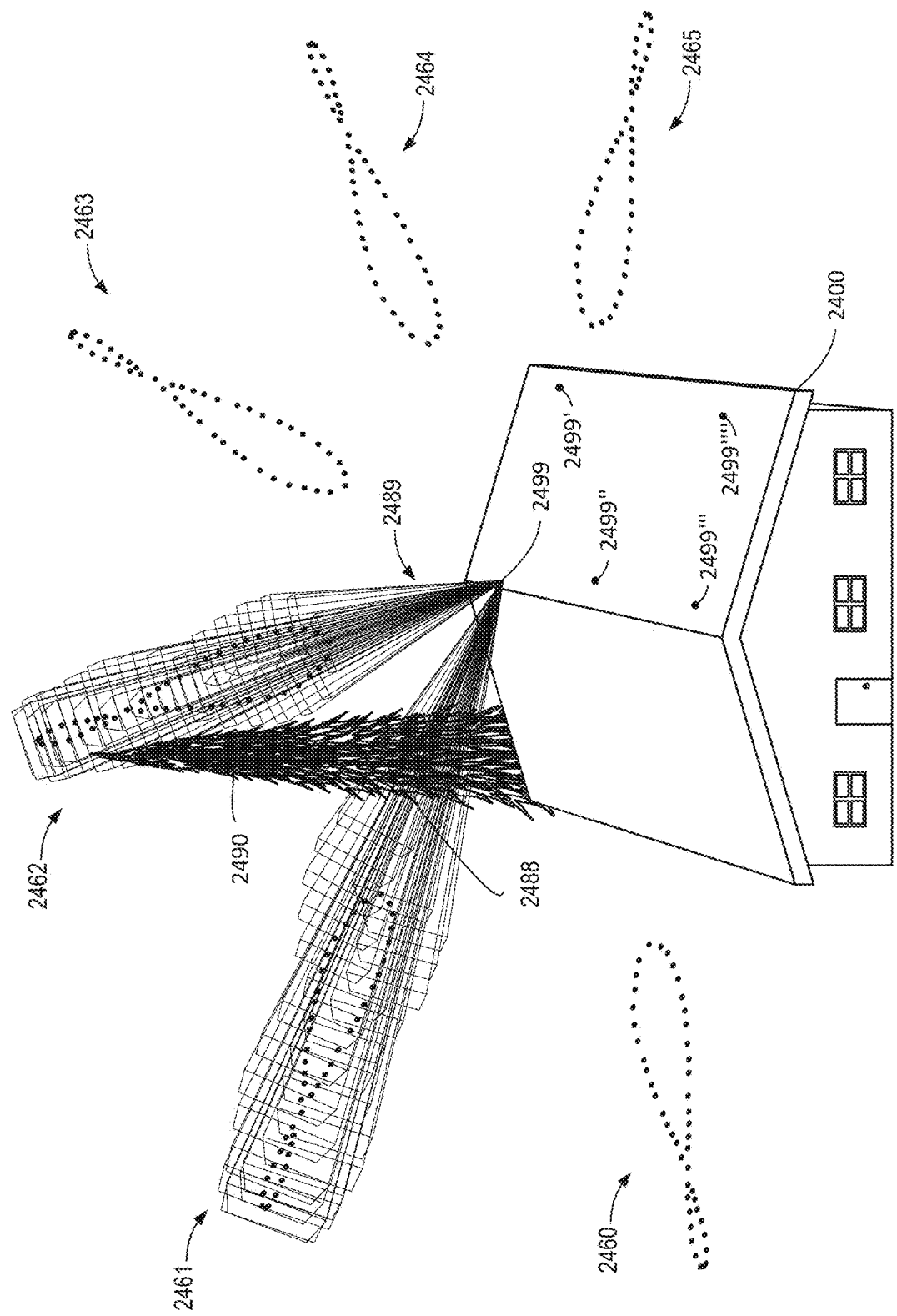

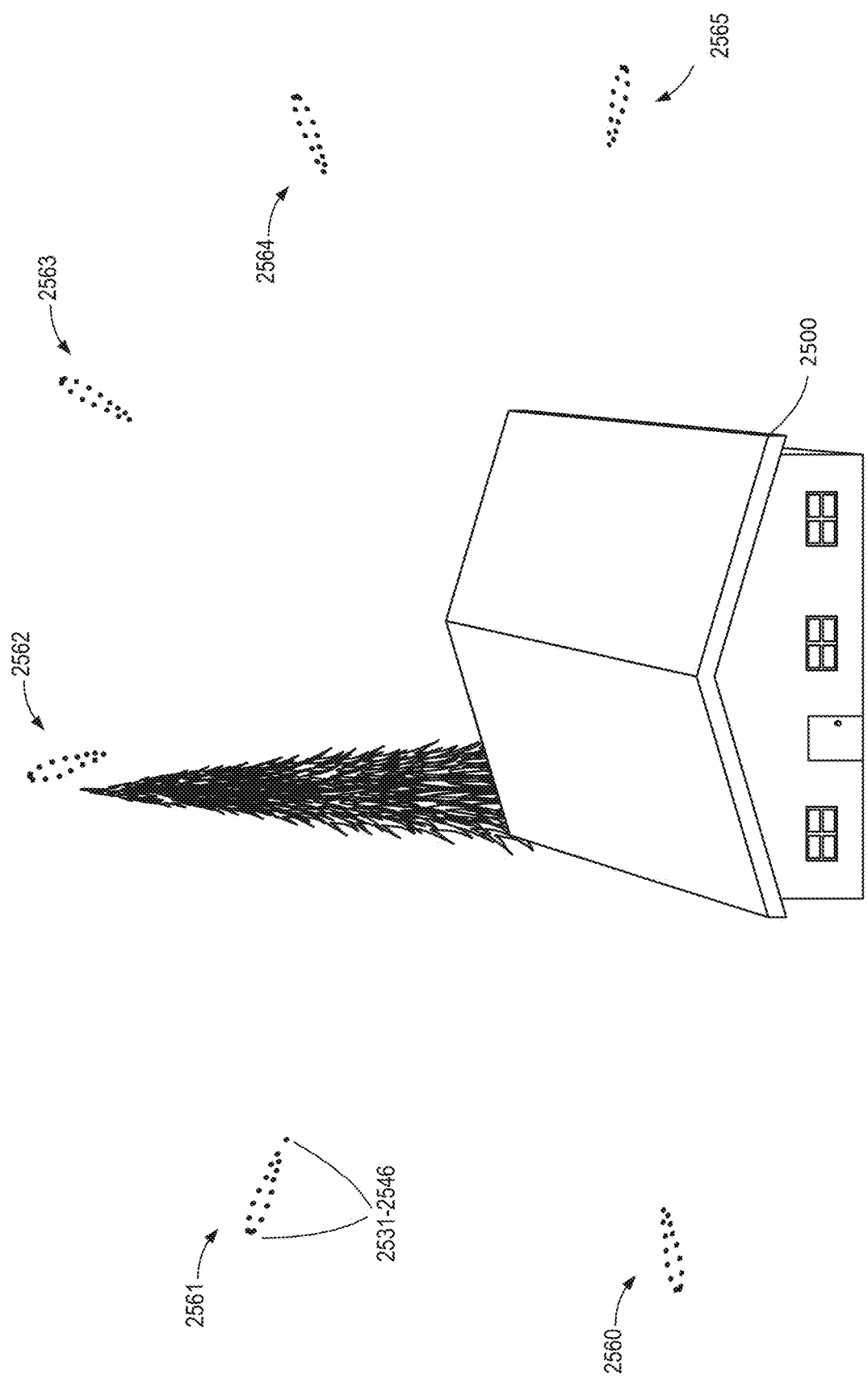

SOLAR RAY MAPPING VIA DIVERGENT BEAM MODELING

RELATED APPLICATIONS

This application claims priority to U.S. Provisional Patent Application 63/107,585, filed on Oct. 30, 2020, titled "Solar Ray Mapping and Associated Visualization Interface." This application is also a continuation-in-part of U.S. patent application Ser. No. 16/865,158, filed on May 1, 2020, titled "Image Analysis and Estimation of Rooftop Solar Exposure Via Solar Ray Mapping," which application claims priority to U.S. Provisional Patent Application No. 62/842,961, filed on May 3, 2019, titled "Image Analysis and Estimation of Roof Solar Exposure" and is a continuation-in-part of U.S. patent application Ser. No. 16/522,948, filed on Jul. 26, 2019, and granted as U.S. Pat. No. 10,733,443 on Aug. 4, 2020 and also titled "Image Analysis and Estimation of Rooftop Solar Exposure," which is a divisional application of U.S. patent application Ser. No. 16/228,019, filed on Dec. 20, 2018, and granted as U.S. Pat. No. 10,366,287 on Jul. 30, 2019, also titled "Image Analysis and Estimation of Rooftop Solar Exposure," which claims priority to U.S. Provisional Patent Application No. 62/722,714, filed on Aug. 24, 2018, titled "Systems and Methods for Imaging and Reporting the Solar Irradiance of a Structure," all of which are hereby incorporated by reference in their entireties.

TECHNICAL FIELD

This disclosure relates to systems and methods for determining spatial and temporal solar irradiance values of a roof of a structure.

BRIEF DESCRIPTION OF THE DRAWINGS

Non-limiting and non-exhaustive embodiments of the disclosure are described herein, including various embodiments of the disclosure with reference to the figures listed below.

FIG. 14 illustrates an example of a GUI of a system enabling an operator to select sizes, quantities, power, and/or prices of a plurality of solar panels for installation.

FIG. 24 illustrates a model of a roof with divergent beam solar rays mapped using pyramidal beams to avoid object occlusion in a sparse solar ray mapping, according to one embodiment.

FIG. 25B illustrates a sparse solar ray mapping of a roof with only the summer months mapped, according to one embodiment.

DETAILED DESCRIPTION

Figure 1:
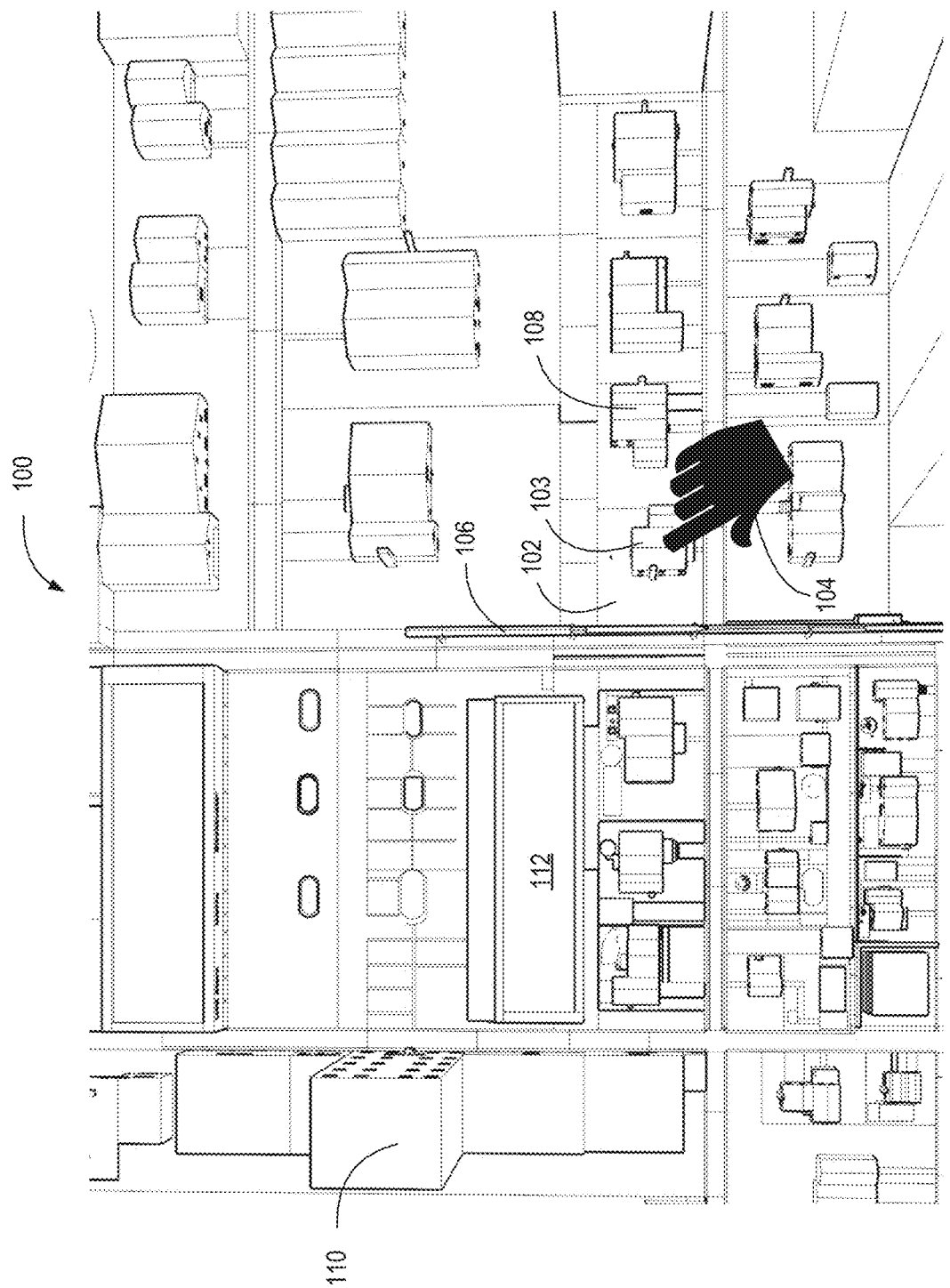
FIG. 1 illustrates an operator selecting a structure based on a satellite image of a group of houses, according to one embodiment.

This disclosure provides methods and systems for assessing structures and/or other real property using an unmanned aerial vehicle (UAV). A UAV may carry an optical imaging or another sensing system to capture a sequence of images of a target object, such as a structure. The UAV may position itself above the location of interest to allow the imaging system to capture a nadir image of an area of interest (e.g., a target structure). The UAV may follow a boustrophedonic flight path while the imaging system captures a series of images and/or collects non-image scan information. The UAV may position itself around the structure to collect oblique images at one or more heights on each side of the structure and/or one or more corners of the structure. To collect partial or full structural information, the UAV may perform a loop scan while the imaging system captures a set of oblique images. For additional detailed images of the area of interest, the UAV and imaging system may perform a series of microscans. Using the collection of images, a rendering system or subsystem (e.g., as part of a modeling subsystem) may generate interactive models of the target structure, the roof, surrounding objects, or other objects.

According to various embodiments, the system accurately models solar irradiance via ray-trace modeling of sunlight incident on the roof of a structure. In some embodiments, additional scanning, such as loop scans, microscans, boustrophedonic scans, and/or crisscross boustrophedonic scans may be utilized to enhance the modeling accuracy of the structure on which solar panels are to be installed. Similarly, additional scanning, such as loop scans, microscans, boustrophedonic scans, and/or crisscross boustrophedonic scans may be utilized to enhance the modeling accuracy of the surrounding trees, neighboring structures, and/or other nearby objects that may be obstacles to solar irradiance.

This disclosure also provides systems and methods for post image and data collection processing, visualization, annotation, and reporting. This disclosure provides some examples of how images (including optical images, infrared images, moisture sensor data images, ultraviolet images, ultrasonic images, and false-color representations thereof) and other data may be collected as full-subject views, oblique images, perpendicular images, and microscan surface and subsurface views. Ultimately, a context-rich visualization of the target location may create one or more markers identifying solar irradiance values at target locations. For example, microscan images of target locations on a roof of a structure may include an estimate of annual solar irradiance (e.g., measured in cumulative $kWh/m^2$). The operator may select a target location, such as the roof of a structure, a planar section of a roof, or a portion of a roof. The system may then display a context-rich visualization of the annual solar irradiation associated with the selected target location. The solar irradiation for various locations on the roof may be calculated using a ray-based approach, as described below.

In some embodiments, the system may generate a detailed finite element model, or heatmap, of the solar irradiance. For example, a visual display of the portions of the roof with the highest solar irradiance or highest average solar irradiance may be displayed as an overlay on the roof using a blackbody radiation color mapping. The system may calculate the solar irradiance for one or more portions of the roof.

The system may utilize images captured by an intelligent electronic device (IED) to generate a three-dimensional model that includes the structure, obstacles on the structure, and obstacles proximate to the structure (e.g., via a rendering or modeling system or subsystem). The level of detail, the accuracy of the scan, and the newness of the scan all contribute to more accurate solar irradiance calculations. In some embodiments, the system may identify and conceptually divide the roof surfaces into a plurality of polygons. Each polygon may be approximated as a planar surface, the normal to which represents the ideal angle from which to receive solar radiation. National services and databases can be used to look up the maximum solar irradiation possible for a given geolocation (e.g., based on the longitude and latitude of the structure). Additionally, or alternatively, a maximum possible solar irradiation level may be measured at the location. Similarly, publicly available databases and calculators may be used to model the relative location of the sun at any given time, past or future.

The system may model ray paths between each polygon on the roof and the modeled location of the sun. The system may determine an angle between the normal to each polygon on the roof and the ray between the polygon and the modeled location of the sun. In some embodiments, the system may compute the solar irradiance as a decreasing function of the cosine of the angle. Thus, in some embodiments, the function used to calculate solar irradiance may be maximized when the ray from the sun is normal to the approximated planar surface of the polygon. The computation of solar irradiance on any given location or locations may be further calculated as a function of other diffuse light, estimated or average cloud cover, other weather conditions, estimated light reflections, and/or the like. According to various embodiments, the system may utilize known solar irradiance calculation models supplemented with shadow and/or obstruction information obtained using one or more of the solar ray-path modeling approaches described herein.

A solar panel installed parallel with, or in the same plane as, the modeled polygon or set of polygons may have a protective cover, such as tempered glass or a polytetrafluoroethylene ("PTFE"). In some embodiments, most or all the direct solar radiation at angles in excess of the glancing angle of the protective cover is reflected and not available for energy production. Accordingly, some embodiments of the systems and methods described herein may approximate the solar irradiance as zero (or decreased) for each polygon for which the ray path between the polygon and the modeled location of the sun is at an angle in excess of the glancing angle.

The system may calculate a total solar irradiance for a period of time (e.g., a second, a minute, an hour, a day, a month, a year, and/or another period of time) at each target location. The system may calculate the solar irradiance for different seasons, for each of a plurality of days, for only weekdays when a business is in operation, monthly, a yearly total, or an average over a time period. In some embodiments, an operator may toggle, select, or slide an element in a graphical user interface to select a time or time period for visualizing the solar irradiance as a heatmap. In some embodiments, the system may calculate, and the operator may select to view solar irradiance values for a one-year, five-year, or ten-year average. The three-dimensional model includes other objects in the space that may obstruct a ray path between the modeled location of the sun and a polygon on the roof, depending on the modeled location of the sun for a given day and time. The system may model the ray path between each polygon on the roof surface and the modeled location of the sun at different times of the day and for different days each week.

Increasing the number of polygons or locations used to model the roof surface(s) may increase the resolution and accuracy of the solar irradiance calculations but increase the complexity of the calculations. The system may calculate the solar irradiance associated with each polygon in time increments selected by the user or at default time increments. For example, solar irradiation values may be calculated every second of every day of every year. As another example, to reduce the computational load, the system may calculate the solar irradiation values of each polygon every fifteen minutes of one day each week for a year.

The system calculates the decrease in solar irradiation based on ray paths being blocked by obstructions and/or at an angle to the normal of each respective polygon for the various time increments. For various modeled locations of the sun, the ray paths to some polygons may be blocked by obstacles proximate to the house (e.g., trees or other buildings) or by obstacles on the roof of the house (e.g., swamp coolers, vent pipes, satellite dishes, air conditioning (AC) units, other portions of the roof, etc.). Effectively, the ray paths that are blocked correspond to the shadows that would be present for different locations of the sun at various times of the day and various days during the year.

For instance, at noon, the sun may be modeled as being nearly directly overhead, and so the ray paths may be relatively unobstructed. However, at other times of the day, an increasing number of ray paths may be blocked by, for example, vent pipes, AC units, other portions of the roof, or nearby trees. Again, blocked ray paths correspond to shadows. For example, a relatively large chimney may cast very little or no shadow (i.e., block relatively few ray paths) on a roof when the sun is directly overhead. However, during mid-morning, the chimney may cast a relatively large shadow on a first portion of the roof (i.e., block many ray paths).

The system identifies ray paths between locations on the roof and the modeled location of the sun that are obstructed by an object at various time increments throughout a time period. The blocked ray paths correspond to shadows that will be cast on the locations of the roof at various times of day, at all times, and/or on various days of the year.

In the various embodiments, a UAV may capture images (optical or otherwise), and the UAV or a remote system may perform imaging processing and/or utilize computer vision techniques to identify planar sections of the roof, relative pitches thereof, objects on the roof, and/or objects and structures proximate the roof. The polygonal modeling of the roof surface may facilitate dividing the roof surface into a discrete set of locations and facilitate the identification of a normal from each polygon surface corresponding to the ideal ray path for optimum solar irradiance. For example, the roof surface may be divided into a plurality of triangles. The three vertices of each triangle on the roof may be used to form a plane, the normal to which may be quickly calculated by the system. However, similar calculations can be done for other polygons, such as squares, hexagons, rhombi, and the like. For purposes of this disclosure, the term polygon can be expanded to encompass circles, ovals, and shapes having any combination of curved and straight edges. Moreover, as the area of the polygon approaches zero, the polygon may be represented as a location or spot on the roof from which solar rays may be mapped.

In some embodiments, the normal to the surface of the roof is calculated for a plurality of locations on the surface of the roof without necessarily dividing the roof into a plurality of polygons. For example, the thousands of points on the surface of the roof may be identified, and the solar irradiance ray-path tracing to various modeled locations of the sun at various time increments during a time period may be mapped. The solar irradiance to each location on the roof may be modeled based on the presence of an obstruction (i.e., blocking the ray path) and the angle of the ray path relative to the normal of the surface underlying each respective location.

As an example of an obstruction, a tree may block ray paths between some locations (e.g., polygons, locations, spots, etc.) on the roof at some times during the day and on some days of the year. The same tree may block different ray paths, or block no ray paths at all, at different times of the day and on different days of the year. A graphical user interface may show a heatmap that uses various shades of gray or different colors (e.g., blackbody temperature modeling) to illustrate the relative impact or effect of various obstacles and obstructions. White or red may be used to show unshaded portions of the roof. Darker gray shading or darker shades of blue may be used to show the impact or effect of shadows (ray-blocking objects) on the roof that have a significant or relatively higher light-blocking effect over a period of time. Lighter gray shading or various shades of red may be used to show the impact or effect of shadows cast by obstacles that have less of an overall light-blocking effect over a period of time.

As previously described, the three-dimensional model may include a model of the structure, objects on the roof of the structure, objects proximate to the structure (e.g., trees, poles, other buildings, power lines, etc.), and may be augmented to include expected or possible future objects. That is, the three-dimensional model constructed using images captured by a UAV will include existing objects in the three-dimensional space at the time of the scan. Additional objects may be added based on an analysis of the space surrounding the roof of the structure. For example, expected tree growth may be used to augment the size of the trees in the three-dimensional space. Similarly, trees may be modeled as cut down or trimmed to illustrate the potential benefits of removing or trimming a tree. Expected or possible construction may be used to augment the model with additional buildings proximate to the structure imaged with the UAV.

In some embodiments, the system may recommend or suggest that vents, pipes, trees, AC units, swamp coolers, and/or other existing obstacles be relocated or removed to improve solar irradiance. For example, the system may include a graphical user interface that allows a user to selectively remove or relocate existing obstacles from the solar irradiance calculations. Thus, the system may selectively generate a solar irradiance map of the roof (or a portion thereof) with solar irradiances calculated with one or more existing obstacles simulated as having been removed or relocated.

In some instances, the ray-path modeling from locations on the roof to the modeled locations of the sun at various times during a time period may omit the future obstacle during some time periods and add the obstacle into the three-dimensional model for ray-path modeling during future time periods when the obstacle is reasonably expected to exist. A user may use a slider, selection icons, or other features in a graphical user interface to show the solar irradiation heatmap on the roof of a structure at various times during a multi-year time period. As the user moves, for example, the slider, to transition the image from a first day in a starting year to another day in a future year, the graphical user interface may augment the three-dimensional model to show tree growth, building construction, weather conditions (e.g., sunny days, cloudy days, snow, rain, etc.). The granularity of the slider or another selection icon in the graphical user interface may allow for average solar irradiance values to be displayed as a heatmap, and averaged over a period of minutes, hours, days, weeks, months, or years.

For instance, a slider with hourly granularity may allow the user to visualize an hour-by-hour change in solar irradiance as a heatmap on the surface of a roof every hour for any number of days, months, or years. Similarly, a selection element with daily or weekly granularity allows a user to visualize a daily or weekly change in solar irradiance as a heatmap on the surface of the roof during an extended time period.

The average effect of a future obstacle may be displayed as having less of an effect than an existing obstacle simply because the future obstacle may affect the solar irradiance for a fewer number of years. For example, a tree may be estimated to block certain ray paths for only the last five years of a 20-year time period. In some embodiments, the system may include or interface with an external tree variety identification subsystem. The tree variety identification subsystem may identify the variety of a detected tree and estimate a mature-sized tree. The estimated mature-sized tree may then be used to identify future or potential shadows on the portion of the roof of the structure.

The tree variety identification subsystem may utilize samples from the tree, user input manually identifying a tree variety, or images of the tree. For example, the system may utilize images of the foliage, tree shape, and/or bark to identify the tree variety. A wide variety of systems, methods, and techniques for identifying plant species, including identifying tree species, may be utilized and/or included within the presently described systems and methods. An example of such a system is described in U.S. Pat. No. 8,577,616 titled "System and Method for Plant Identification," which is hereby incorporated by reference in its entirety as it relates to the tree variety identification subsystem and is not inconsistent herewith.

In some embodiments, the system may determine whether an identified tree is a deciduous tree or an evergreen tree and modify the expected solar irradiance during summer and winter according to the expected difference in ray-path blocking during each season. Specifically, a deciduous tree may be expected to block less sunlight during the winter (when it has no leaves) and block more sunlight during the summer when it has foliage. Current systems that detect trees, and manual detection or identification of trees by human operators, may inaccurately estimate the impact of the tree if the analysis is done during the winter or early spring. Some embodiments of the presently described systems may identify ray paths blocked by a deciduous tree in the winter months and calculate or estimate the expected ray paths that will be blocked for various locations on the roof during the summer months when the tree is in full foliage. In such embodiments, the identification of the tree variety may be based on manual user selection or an automated identification system using, for example, bark or leaf image analysis. In some instances, a user may manually identify trees as being columnar or broad spread without further identification to provide a rough modeling (e.g., estimate) of future growth.

The system may identify portions of the roof where snow might be expected to accumulate on the roof during certain times of the year. In some embodiments, the graphical user interface may allow the user to visualize the snow on the roof. Average annual snowfalls, temperatures, and other weather information may be used to modify the three-dimensional model to show the effect of the snow on the heatmap.

Identified objects, and specifically the relative locations of the objects, may affect the annual or average solar irradiance on portions of the roof. The system may create a detailed finite element model of the irradiance at target locations on the structure or property. In other embodiments, as a user navigates through the hours, days, or weeks of a wintertime period, the graphical user interface may display snow on the roof of the structure for a number of days corresponding to the average weather patterns for the location of the structure.

In various embodiments, UAV hardware, firmware, and/or software may be modified, upgraded, and/or programmed to perform the functions, methods, and behaviors described herein. In some embodiments, software, hardware, and/or firmware may be created to interface with pre-existing UAV interfaces. In other embodiments, modifications to one or more portions of a UAV may be made to accomplish the described systems and methods.

In some embodiments of the present disclosure, a technician may manually operate a UAV to perform one or more assessment tasks. For example, a technician may manually operate a drone to capture photographs that would otherwise have required the technician to scale a building. Some UAVs have semi-autonomous capabilities. These UAVs may be directed to capture photographs of an operator-identified location. However, semi-autonomous UAVs may not capture a comprehensive image collection of the entire site and may not provide adequate information to replace an on-site technician. Some UAVs are autonomous. A technician may program autonomous UAVs onsite or offsite to follow a boustrophedonic flight pattern and identify, pre-flight or during flight, one or more target areas for detailed microscans. In some embodiments, the technician turns on the UAV, selects a property, and the system autonomously performs the scan and determines solar irradiance values at various locations at the time of the scan and for future time increments during future time periods.

The UAV assessment and reporting systems described herein provide comprehensive, automatic (or at least semi-automatic), and methodical approaches for assessing a structure or other object for a particular purpose. The types of assessments, reports, and images collected may vary based on the specific application and intended use. Generally, the approaches obviate the need for an industry-specific trained technician to be present and/or change the relevant qualifications of a suitable technician. In some embodiments, the approach may significantly reduce the workload of a technician. Although this disclosure provides many examples in the context of a roof of a residential building, a person with ordinary skill in the art will recognize that the system is not confined to any particular type of structure. Any solar panel installation site may benefit from the systems and methods described. For example, the systems described in this application may be applied with some adaptation or modification to an empty field, a skyscraper, a house, an apartment complex, a commercial building or factory, and/or any other solar panel installation site.

The use of a UAV to provide detailed scan data greatly enhances the accuracy of the ray-path tracing as compared to using images available from satellites, low-altitude fixed-wing image capture, and manual ground-based image capture. Each of the foregoing suffers from relatively low resolution, image stitching errors, and out-of-date images. For instance, satellite or low-altitude fixed-wing images may be months or even years old. Changes in surrounding objects (e.g., trees or new construction) or even modifications to the structure itself may greatly impact the accuracy of solar irradiance modeling. UAV imaging (including optical, ultrasonic, LIDAR, and the like) provides highly accurate spatial data for building accurate three-dimensional models of the structure and surrounding space to allow for highly accurate ray-path modeling.

In one embodiment, a graphical user interface allows a user to provide operator input for a desired solar irradiance level and/or available or acceptable solar panel size(s). The UAV may identify objects that will present actual obstructions and/or future obstructions to solar exposure, as found during ray-path modeling. Solar exposure may be measured as a flux of energy, such as irradiance per unit area ($kW/m^2$). Solar exposure may be determined based, at least in part, on a historical average for a region, adjusted to compensate for the pitch of the roof and reduced in locations calculated to have obstructions occluding solar exposure. To determine the location of relevant obstructions, an imaging system (e.g., a camera and/or a sensor) captures images/data and determines, based on the time of day, a solar angle of irradiance (i.e., the angle between the normal to each location on the roof and the ray path from the modeled locations of the sun to each respective location on the roof). Based on historical measurements and/or collected data, the system may calculate the total irradiance for a period of time. The period of time may be measured in seconds, minutes, hours, days, months, years, etc.

A solar evaluation system may determine the total irradiance at a target location. For example, the solar evaluation system may use historical data (e.g., known angles and locations of the sun day-by-day, expected number of sunny days and cloudy days, etc.) to determine the total solar irradiance expected at the target location for one year (or another period of time). In some embodiments, it may be useful to calculate a first solar irradiance value during hot months when air conditioners are in use and calculate a second solar irradiance value in colder months when electrical usage is lower.

In some embodiments, the solar evaluation system may determine the solar irradiance through a direct measurement either on the ground or via the UAV. The solar evaluation system may convert the direct measurement into an estimate at the target location based on the location of the ray-path blocking obstacles and the length of time they are expected to interfere with the solar exposure based on the angle of solar irradiance as the sun is modeled to move relative to the structure. The length of time an obstruction occludes solar exposure may be measured in seconds, minutes, hours, days, months, years, etc. The system (e.g., the UAV and/or associated remote computing system) may determine the angle of irradiance, a level of irradiance at the target location, and any obstructions to the irradiance at the target location. The solar evaluation system may use this information to determine an estimated total irradiance reaching a target location for a period of time and reduce the total irradiance based on the time the obstructions are calculated to occlude solar exposure.

In some embodiments, the system may determine a pitch of one or more planar surfaces making up the roof of a structure. The pitch information may be used to calculate the normal to each location on the roof. For example, in embodiments in which the roof is conceptually divided into a plurality of triangles, the pitch information may be used to determine the normal of each triangle. In other embodiments, the spatial location of the vertices of each triangle may be used to calculate the normal for each triangle without necessarily measuring or calculating the pitch of the underlying roof surface. Of course, it would be expected that the normal for triangles on the same planar portion of a roof surface will be the same or approximately the same.

In embodiments in which the pitch of each planar roof face is used, a UAV may utilize a sensor to make at least two distance measurements from at least two different locations relative to the roof (e.g., two different elevations or horizontal positions) and calculate the pitch of the roof. The system may include an electronic non-transitory computer-readable medium with instructions stored thereon that, when executed by a computing device, cause hardware components of the system to perform operations to calculate the total irradiance at the target location (e.g., a roof or surface of a roof) for a defined period of time.

In some embodiments, the solar evaluation system may include a site selection interface. The site selection interface may receive an electronic input from a user identifying the site or location of a structure. For example, the site selection interface may identify geographic boundaries of an area, an address, and/or the GPS coordinates of a structure. The solar evaluation system may include a hazard input selection system to receive electronic input identifying geographic hazards. Such hazards may include above-ground power lines, tall trees, neighboring structures, etc.

The UAV may include a camera, proximity sensor, and/or other sensors to identify navigational obstacles and/or solar irradiance obstructions. In many cases, navigational obstacles may also be obstructions. The terms "obstacle" and "obstruction" may be used interchangeably in some instances and understood as being relevant to UAV navigation and/or solar irradiance based on context. The camera or sensor may communicate with an imaging system to determine the angle of irradiance. For example, based on the time of day of the UAV scan, the system may estimate or calculate a total irradiance level.

The UAV may include an imaging system with sonar sensors, lidar sensors, infrared sensors, optical sensors, irradiance sensors, and/or radar sensors. In some embodiments, the imaging system includes one visible light imaging camera and any combination and number of other types of sensors. The imaging system may determine the angle of irradiance (e.g., the location of the sun) at a given time. The determined angle of irradiance may be used to calibrate the relative location of the structure with the sun. Known values of the angle of irradiance at other times of the day and during other days of the year may be used to calculate solar irradiance values for each portion of the roof of the structure using a ray-path tracing algorithm to account for blocked ray paths at various times of day during various days of the year. The system can calculate solar irradiance values at the specific location for a period of time (e.g., the system may estimate the irradiance for a month, year, or another period of time utilizing forecasted data).

As previously described, the UAV imaging system may identify locations of objects that will obstruct the ray path between the sun and various locations on the roof of the structure. The UAV may include an onboard processor and/or a communication interface to communicate with the controller and/or the interface's cloud-based processing. The UAV may conduct a structural assessment. The structural assessment may include a first boustrophedonic scan of the area defined by geographic boundaries that include the structure. The boustrophedonic scan may include capturing images and/or irradiance during a boustrophedonic flight pattern within a first altitude range. The boustrophedonic scan may include determining distances to a surface for each of a plurality of potential vertical approaches within the area defined by the geographic boundaries. The UAV assessment and reporting system may include identifying a structure on the site based on the identified geographic boundaries and/or the boustrophedonic scan of the area. The UAV assessment and reporting system may include a loop scan of the structure. The loop scan may include a second flight pattern for the UAV to travel around the perimeter of the structure. The second flight pattern may be at a second altitude range lower than the first altitude range. The UAV assessment and reporting system may include a target location scan of the structure in a third flight pattern that includes vertical approaches proximate the structure to capture detailed images at target locations on the structure.

The UAV may include one or more processors and/or a communication interface to communicate with the controller and/or the interface's cloud-based processing. The UAV may calculate solar irradiance values at the target location and/or supply data to remote processing devices in real-time or via a post-landing data transfer. Regardless of which portion of the system implements the algorithms, the system may calculate the total irradiance for the period of time (e.g., one day of irradiance) for each location on a roof of a structure.

In some embodiments, obstructions to portions of the surface of the roof may actually be reflective and increase solar irradiance on other portions of the surface of the roof at various times of the day. For example, a copper-clad chimney, aluminum sheeting, or a tourelle (e.g., a copper-coated decorative cone-shaped turret) may block solar irradiance relative to some portions of the planar surfaces of the roof but actually increase solar irradiance to other portions of the roof due to reflections. In such embodiments, the system may identify material types of the various obstructions and/or other portions of the roof to determine reflectivity properties. Solar irradiance values may be adjusted accordingly based on solar irradiance obstructions and reflections. Ray-path modeling may account for these reflective materials by modeling a ray path between the modeled location of the sun and a location on the roof surface that includes one or more intermediary reflections.

As previously noted, the UAV solar irradiation assessment system may include a site selection interface to receive electronic input from a user identifying a structure. In some embodiments, the operator may control the device through remote control. For example, the operator may direct the UAV to an operator-identified location and capture data. The operation may be semi-autonomous such that the operator directs the device to various locations for analysis. In other embodiments, the device may be fully autonomous. For example, the operator may begin the assessment by placing the UAV in a safe location for takeoff and select a "start" or "begin" icon on the computing device or UAV. The operator may select the nearest roof or one or more roofs for analysis by the UAV. The system may analyze the nearest roof or one or more roofs based on an operator selection. For example, the system may use satellite images, real-time nadir images, or satellite images aligned using nadir images to select a structure for analysis.

The operator may, for example, be an employee, contractor, or agent of a solar panel installation company, a roofing company, an inspector, an analyst, an owner of the structure, and/or another person involved with the design and installation of solar panels on a roof or structure. In some embodiments, the operator of the UAV may utilize a remote-control system such as a personal computer or personal electronic device. Examples of such devices include watches, tablets, laptops, smart glasses, wearable technology, and mobile phones. For example, an operator may use the computing device to initiate an assessment of solar irradiance via a software program on the computing device. In some embodiments, the computing device may comprise custom hardware designed specifically to implement the systems and methods described herein. In other embodiments, a computing device may be customized and made to perform new functions through the incorporation of additional hardware, software, and/or firmware. The autonomous or semi-autonomous processes may obviate the need for an industry-specific trained technician to be present and/or may substantially reduce the workload of a technician. In some embodiments, a salesperson may use the UAV system to perform an initial scan and capture the necessary data for the technician to begin a detailed design review at a remote location.

The UAV may perform a boustrophedonic scan to determine the irradiance of the site or a structure on the site. During the boustrophedonic scan, the UAV may follow a predetermined flight pattern. For example, the UAV may travel from one edge to the opposite edge of the site in alternating offset zones. One or more cameras and/or sensors on the UAV may obtain data, make measurements, and/or capture images of the site throughout the boustrophedonic flight pattern.

A UAV may carry an imaging system and/or one or more sensors to capture data and images of a roof. The UAV may capture relative solar irradiance, energy flux, and/or solar exposure in the visible light, ultraviolet, and/or infrared wavelengths as part of the scan. The relative values can be used to crosscheck calculations of surface pitch and the identification of obstructions. For example, the system may assume that two unobstructed surfaces, having the same angle relative to the sun, will have the same solar irradiance values at a given time. If sensors on the UAV (e.g., a camera) detect otherwise, the system may re-evaluate or attempt to identify the angles of the surfaces and/or identify any obstructions that may be causing the difference. Thus, the system may utilize real-time solar irradiance values to ensure an accurate model for calculating temporally averaged solar irradiance values.

The UAV may use other sensors, including moisture sensors, sonar sensors, optical sensors, ultrasonic sensors, LIDAR, RADAR, irradiance sensors, and/or other sensors to capture data. The UAV may capture images and/or video data in the visible, infrared, and/or ultraviolet spectrums. As used herein, the term "image" is used broadly to include visible-spectrum images, as well as "images" captured using alternative sensor types in the infrared, ultraviolet, and/or ultrasonic sensor systems. For example, some images may be visible spectrum images, some images may be infrared images presented in false color, and other images may be infrared presented in numerical values overlaid on a finite element model of the roof of the structure. Some images may correlate to a single numerical value, for example, the irradiance at a specified location.

Ultimately, the scan can be used to generate a context-rich report of solar irradiation at various locations along the roof of a structure (or at specific areas of the site). The operator may select a target location on the roof, and the system may display the solar energy flux, irradiation, exposure, and/or other data relevant to the installation of a solar panel at the specified location. The system may generate a report with a digital full subject image (e.g., a three-dimensional model of the structure, a three-dimensional model of the roof, and/or a model of a portion of the roof).

The UAV may perform a loop scan to analyze the angles of a structure. The loop scan may include a flight pattern that positions the UAV at the perimeter of the structure and/or the site. The loop scan may include the UAV traveling around the perimeter. As the UAV travels around the perimeter, the UAV may lower its altitude while the camera captures images of the structure at one or more angles. The angles may be oblique or perpendicular to the walls of the structure. The UAV assessment and reporting system may use these images to create a three-dimensional model of the structure. In one embodiment, the UAV may make multiple passes around the perimeter of the structure at different altitudes. For example, the UAV may fly around the perimeter at a first altitude to capture images of the structure at a first angle and then fly around the perimeter at a second altitude to capture additional images of the structure at a second angle. In other embodiments, a loop scan is not needed if sufficient data is captured during one or more boustrophedonic scans.

The UAV may perform a microscan for close-up, detailed images of a target location or another area of interest. In some embodiments, the UAV may perform a series of vertical approaches near the structure. In some embodiments, the vertical approaches may be simulated via digital or optical zooming of a camera. In other embodiments, the resolution of the camera may obviate the need for vertical approaches. The UAV may perform microscans by traversing the surface of a structure (including the roof surface, walls of the structure, surrounding objects such as trees and other buildings, telephone or power poles, and the like).

In various embodiments, the UAV may perform a 360-degree panoramic scan of a surrounding area and/or capture similar data via one or more nadir images. For example, a UAV may be positioned above a structure (e.g., a peak of a roof) and remain in approximately the same location relative to the structure while the UAV rotates 360 degrees to capture a panoramic image of the surrounding area. As a specific example, a UAV may fly to a height above the roof (e.g., 5' or 10' above the highest point on the roof or site) and scan the site for obstacles in the surrounding area as it rotates 360 degrees. A second 360-degree panoramic image of the surrounding area from a different elevation may be used to enhance the resolution and accuracy of the three-dimensional modeling of objects near the structure. The system may utilize the 360-degree scan of the surrounding area to calculate distance measurements and build the three-dimensional model of the structure that includes surrounding buildings, obstacles, trees, vacant lots, and/or other objects of interest for ray-path modeling.

The system may identify existing and/or potential obstructions to the solar irradiance received by the surfaces of the roof. For example, the system may identify a tree that will cast a shadow on a portion of the roof of the structure at some time of the day and/or time of year. Such an obstacle is considered an "existing obstruction" because as it currently exists, it is an obstruction during at least one time of day and/or for at least some of the days each year. The UAV does not necessarily measure or detect an existing shadow since the tree may not currently cast a shadow because of the location of the sun due to the time of day and/or time of year. Rather, the UAV identifies the relative location, shape, and/or height of an obstacle and calculates shadows at the various times of day on various days throughout a given month or year.

In contrast, a tree that is still small may not currently block ray paths at any time of day during any days of the year. Nevertheless, such an object may be identified as a "potential obstruction" or "future obstruction." The system may detect that the tree could grow, or is expected to grow, a certain amount, at which point it would begin to obstruct solar irradiation during at least some time periods during the day and on at least some days of each year. The owner of the structure planning to install solar panels may determine to cut down or trim the tree to eliminate the potential obstruction or design the solar power system to account for the tree as if it were full-grown and an actual obstruction that blocks the ray paths as modeled.

In some embodiments, the 360-degree panoramic scan may assess neighboring lots, adjacent buildings, and/or other information not located on the site. For example, the UAV may scan an adjacent vacant lot, connect to a network, and determine that the lot is zoned for commercial use. The system may then calculate that although the vacant lot does not presently interfere with the irradiance received at the site, future developments may impact the irradiance and solar exposure received at various locations on the roof and/or site. The system may follow a similar process for neighboring trees, predicting their future growth and reducing the expected irradiance at various locations of the site. In some embodiments, the system can determine the zoning for adjacent lots in real-time. For example, the system may utilize a network connection to determine whether a developer of an adjacent lot has submitted any plans for the lot (e.g., available city or county records). The system can utilize this information to make more accurate predictions about the potential impact the development of the adjacent lot may have on the site.

The system may automatically select and/or an operator may manually select a target distance for default scanning based on the resolution of a camera, desired level of detail, adjustability of the camera, and/or a fixed field of view of the camera. The camera may obtain images corresponding to specific dimensions (e.g., a known area) on the roof's surface. For example, the dimensions of the known area may correspond to a finite element of the heatmap model. A camera may have a fixed field of view or an adjustable (zoomable) field of view. The square footage and dimensions of the portion of the roof may be captured or calculated using a single image, depending on the field of view of the camera and the distance of the camera from the roof. A given field of view may determine the target distance. The correct field of view and distance measurements ensure that the captured images correctly correspond to the specified dimensions at the target location. As such, the system may store the field of view and distance measurements as metadata associated with each captured image. In some embodiments, the default square footage per image may be 50 square feet, 100 square feet, 200 square feet, etc. The images may be square or rectangular with any of a wide variety of aspect ratios.

In some embodiments, the UAV solar irradiance system may generate a shaded map (e.g., a heatmap or blackbody model) of the roof showing areas of the roof receiving varying levels of solar energy during a given time period. For example, a heatmap of the solar irradiance along the roof may be generated for a day, month, or year. The heatmap may comprise a series of finite elements (e.g., the polygons used to model the ray paths) that each represent a target location on the roof. The heatmap may consider the total or average irradiance at the target location based on the known angle of the roof and known locations of the sun at various times of the day and various days throughout a given week, month, year, etc. For example, a chimney, an AC unit, pipes, trees, the direction of the roof panels, and/or other factors may affect the amount of irradiance available at each specific location on the roof. Moreover, the location of the chimney, vent, skylight, etc. may impact the possible locations for solar panel installation. The system may divide the site into discrete finite elements that each receive different solar exposure assessments. For example, the model can average the flux over discrete sections of the roof. A completely obstructed area may receive an average of zero Watts/meter$^2$ (e.g., 0 W/m$^2$). In other largely unobstructed locations, the irradiance may have a higher average (e.g., to 1,367 W/m$^2$ or another amount).

In other embodiments, the heatmap may be graphically illustrated as varying levels of gray, where dark areas represent areas with less irradiance, and lighter areas represent areas with more irradiance. In still other embodiments, colors, or shades of particular colors, may be used to illustrate the solar irradiance received by various locations on the roof of a structure.

The heatmap may enable a user to quickly visualize the optimal location for solar panels at the site. In some embodiments, the system may use the finite element data to determine and recommend the optimal placement of solar panels. An operator may not immediately recognize the optimal location for solar panels because the average irradiance of the panel, rather than the highest discrete irradiance, may determine the optimal placement of the panels. Different heatmaps may be generated for peak irradiance, average irradiance, or even a weighted average irradiance relative to demand.

For example, if energy demand is known to be higher in the summer between the hours of 12 pm and 5 pm, the expected irradiance values at various locations on the roof during these times may be weighted higher than the irradiance values at the same locations during winter months or off-peak hours. Thus, a generated heatmap may illustrate average irradiance values over a period of time adjusted for the energy demand at the various time periods. In such an embodiment, a heatmap displayed for a user and/or used to calculate solar panel placement may graphically illustrate the optimal location for solar panel placement, taking into account existing obstructions, potential obstructions, time of day variations, day of year variations, and time-based energy demand.

Accordingly, an obstruction that prevents irradiance at a peak time (e.g., noon during a high-demand summer day) may have a greater impact on the generated heatmap and/or solar panel placement estimator than an obstruction that prevents irradiance at a low-demand time (e.g., 8 pm)—even if the actual decrease on received radiation is the same.

As previously noted, the effect on solar irradiation of an obstacle may vary with time. For example, a vacant lot can later be developed to include an obstructing structure. To account for potential obstacles, the operator and/or the system may make reasonable predictions. For example, zoning restrictions may regulate the type of structures available for a vacant lot. In some examples, the county or a builder may make available the plans for the vacant lot. Using this information, the heatmap may make future predictions about the expected solar exposure at the site. The ability to assess adjacent or neighboring lots for potential obstacles (e.g., obstacles not present but planned in the future), as well as for existing off-site obstacles, enables the system to capture information in the heatmap that a trained technician may have difficulty recognizing or modeling.

For example, a wide variety of obstacles may affect the heatmap due to the ray paths they will block at various times, as determined via the ray-path analysis of the three-dimensional modeling. Obstacles to solar irradiation may include but are not limited to trees, shrubs, satellite and other communication dishes and antennas, poles, chimneys, other buildings, orientation, gables, air conditioning/heating units, and/or other objects. Also, obstacles may change over time. A tree or shrub may grow. An undeveloped lot may be developed to include a building that obstructs solar exposure. The variety of obstacles, both present/current and future/potential, may generate a complex heatmap along the surface of a roof. Shadows cast by obstacles may interfere with one another. Even a trained, skilled technician may not foresee how shadows from obstacles may interfere with one another. For example, obstacles may overlap for some lengths of time and create different shadows at other times. The interference and combination of current and potential future shadows may further complicate the heatmap.

For example, the zoning and/or size of an adjacent proposed building may affect the future amount of energy flux or irradiance received at a target location. For example, a two-story building in a zoned residential neighborhood may not adversely impact the site on a roof. The heatmap, or FEM, may reflect little to no adjustment. The recommended placement of solar panels may not substantially deviate due to a small (e.g., two-story) building in a neighboring lot. In contrast, a large (e.g., four-story) building may substantially interfere with optimum solar panel placement. The heatmap may encode and/or display all this information in a graphical user interface. In some embodiments, a user may toggle certain effects on and off. For example, a user may prefer to view a heatmap based on all existing obstacles and omit the effects on the heatmap of potential obstacles. The operator and/or system may then use the heatmap (or data to generate the heatmap) to determine a suitable or optimal placement of the solar panels.

The proposed size and/or construction material of a neighboring structure may adversely affect the irradiance at a site. The shadow from the structure may occlude solar exposure and cast a shadow on the location of solar panels. For example, an adjacent property with a four-story apartment building may occlude more light than a two-story structure. A vacant lot may require further investigation to determine whether the lot is zoned for a two-story, three-story, or four-story building. The system may modify a solar panel layout design based on the zoning laws and ordinances and/or a proposed construction plan. For example, the heatmap may reflect the future adversely affected exposure for a part of the roof where the zoning of a vacant adjacent lot permits a four-story building. Although the lot is currently vacant, the heatmap may compute an expected shadow based on setback requirements, zoning laws and regulations, ordinances, building plans, and/or other construction requirements. Based on the altered heatmap, the UAV solar evaluation system may recommend locating the solar panels in locations that are less affected by the expected building.

Similarly, in the northern hemisphere, a building to the north of a structure with a reflective surface (e.g., large windows) may actually increase solar exposure on north-facing slopes of a building. Again, the ray-path modeling may include ray paths between locations on the roof of the structure and the modeled location of the sun that are reflected off of the neighboring structure. Accordingly, the system may estimate or measure an increase in solar irradiance caused by reflected sunlight from neighboring structures.

The UAV-based solar irradiance assessment system may utilize various user inputs to determine a solar panel layout. User-specified goals for daily, monthly, or annual solar collection may be used to determine the number of panels needed and an optimal or partially optimized placement for the panels. Alternatively, as a user digitally places solar panels on a displayed model of the roof, the system may show the user how many kilowatts will be generated per hour, day, week, month, year, lifetime, etc. For example, a 300-watt solar panel in one location on the roof may be expected to collect 100 watts early in the morning, 300 watts in the afternoon, and be shaded in the later afternoon and evening. The panel in such a location may be expected to generate 1.6 kW per day, for example. The same panel in a more optimized location may generate nearly the full 300 watts for most of the day for a total of around 2.8 kW per day.

Thus, in some embodiments, a user may place panels with known specifications, and the system may inform the user of the total expected solar collection at a peak time, per day, per hour, per month, per year, etc. In other embodiments, a user may specify that they want to collect an average of 7.2 kW per day. The system can identify the number of panels and placement necessary to achieve a daily average of 7.2 kW on an annual basis or a monthly basis. In another embodiment, the user may specify that they desire no less than 7.2 kW on any given (sunny) day. This would likely require more panels to compensate for the lower angle of the sun during the winter months. In various embodiments, the system may provide solar layout design specifications that include the total number of panels, the number of panels connected in series, the number of panels connected in parallel, the gauge of wire needed, the number of branch connectors, the number of maximum power point tracking (MPPT) controllers, the number of inverters, the number of batteries, the number of transfer switches, etc.

In other embodiments, the system may recommend a number of panels based on a target payoff or break-even date at a given price per kilowatt-hour and price per kilowatt of installation. Solar panels placed in locations with the maximum sun exposure may generate sufficient solar power to cover the cost of installation very quickly (e.g., two years), while solar panels placed in partial shade may generate less solar power and take longer (e.g., eight years) to cover the cost of installation. A user may specify a desired break-even payoff period of, for example, five years or a desired profitability over a ten-year period. The system may generate a solar panel layout based on the desired financial goal as well as the solar irradiance mapping produced in conjunction with the UAV scanning.

In some embodiments, the UAV solar irradiance assessment model may include a graphical user interface that allows an operator to select a threshold for the panels to be installed. The operator may input a minimum irradiance for the system and an acceptable panel size. The system may generate recommended locations of the selected solar panels on the structure. In one embodiment, a user may toggle a box for acceptable sizes of the solar panels. For example, the operator may select a panel type from a drop-down menu or select specific panel sizes that are available (e.g., 2'×4', 3'×5', etc., or other size panels including non-rectangular shapes). In some embodiments, a user may select all available panel sizes and allow the system to return the best design to capture the highest level of solar exposure and/or highest level of solar exposure within financial constraints (e.g., a break-even or profitability goal). Once selected, the system may generate the ideal locations for installing the panels.

In addition, the system may recommend an angle of the panels relative to the roof and/or account for and recommend solar-tracking solar panel mounts (i.e., mechanically rotating solar panel mounts). In some embodiments, a user may specify limitations for aesthetic reasons. For instance, a user may want only low-profile solar panels or avoid solar tracking mounts.

The user may input threshold angles of the panels relative to the roof and/or a default range of angles may be presumed to be available. The heatmap generated by the system may account for these possible or expected angles. The angle relative to the roof of a solar panel may affect the heatmap. User specification of available or acceptable angles may be used to update a heatmap and/or expected output of a specific solar panel layout. For example, an angled panel may enable areas formerly in a shadow to receive greater sunlight. The operator and/or the system may establish practical limits to the acceptable angles. For example, the graphical user interface may ask the operator to set a limit to the recommended angle of the solar panels relative to the roof.

The solar exposure system may include a network of components and modules that interact to generate the heatmap and/or the optimum placement of solar panels on the roof. For example, the solar exposure system may include a non-transitory computer-readable medium for storing instructions. The system may store the instructions in memory, and a processor may implement various modules to accomplish calculations and tasks performed by the system. The processor may be located on the UAV or may be remotely connected through a network and/or network interface. The network interface may enable communications of one or more operations to the UAV pre-flight, post-flight, and/or during flight.

As an example, but not by way of limitation, one or more computer-readable storage mediums of local and/or remote systems may include: a scanning module, a navigation module, a risk zone generator, a tag reading module, an irradiance module, an obstacle module, an estimator module, and/or other modules to perform the operations and methods described herein. The system may include each module on the UAV, off the UAV, or in a system on and off the UAV and/or connected through a network. For example, the network may connect some of the modules located on the UAV with others connected remotely through the network.

The scanning module may include detailed scans of complex areas or locations where additional data is required. For example, the scanning module may determine the pitch of a roof, identify hazards, identify ray paths blocked by obstacles obstructing solar irradiation, locate potential future obstructions to solar irradiation, measure distances to such obstructions, and/or otherwise identify and scan detailed obstructions or target areas of the subject property. In some embodiments, the scanning module may determine the time of day, the angle of the sun, the sun's trajectory, and historical scans for correlating a scan to annual predictions of irradiance.

The scanning module may predict an expected length of time for which obstructions will occlude solar exposure, the total period of time for which a target location will receive solar exposure, and/or the total irradiance at the target location for a period of exposure time. For example, the scanning module may base the expected period of exposure on the scanned angle of irradiance, the measured level of irradiance at the target location, the distance measurement to any obstacles, and/or the length of time of any obstructions to the irradiance.

An obstacle module may calculate obstructed irradiance at the target location of a roof. For example, the obstacle module may identify a scanned obstacle, predict the length of time the obstacle may occlude solar exposure at the target location, and determine the extent of the solar exposure blocked by the obstacle. The calculation may determine solar irradiance as a power measurement (e.g., W or kW), as a flux measurement (e.g., $kW/m^2$), or as a length of time (e.g., seconds, minutes, hours, or days).

The solar exposure system may include an estimator module. The estimator module may use historical data to estimate cloudy, rainy, and/or snowy lengths of time that occlude solar exposure. The estimator module may compute a heatmap of the solar irradiation on the roof or at the subject site. The heatmap may identify optimal locations for the placement of solar panels and/or the optimal size of the solar panels. The estimator module may also indicate a recommended angle or orientation of the solar panels relative to the roof. The estimator module may determine optimal panel placement on the heatmap based on the recommended angle of the panels. The estimator module may calculate and return a recommended solar panel size, angle, and/or location of the solar panels to the graphical user interface.

In some embodiments, the system may utilize images and/or models provided by other systems (e.g., external or third-party systems). In such embodiments, ray-path modeling may be performed, according to any of the various embodiments described herein, to calculate the locations of shadows and/or solar irradiance values during a time period. Thus, image capture (e.g., via a UAV) and 3D modeling systems and subsystems may be omitted or externally implemented.

For example, systems and methods described herein may receive a three-dimensional model of a structure, roof, surrounding obstacles, and/or other features. The system may model a ray path between each of a plurality of locations on the roof of the structure (e.g., based on mapped polygons, according to a random selection, or according to a pattern). The solar rays may be mapped to modeled locations of the sun at different times of day on various days of a month, multiple months, a year, or multiple years.

For instance, the system may model ray paths between 100 locations on a roof of a structure to modeled locations of the sun every hour between 6 am and 10 pm (e.g., 17 times each day) for 180 days of the year (e.g., almost every other day). A higher resolution ray-path modeling may include 1,000 locations on the same roof of the structure, modeling every 30 minutes for an entire 24-hour cycle, and/or modeling each day of the year. As can be appreciated, even higher resolutions are possible with more locations on the roof of the structure (e.g., tens of thousands, hundreds of thousands, millions, etc.) and/or more frequency modeling (e.g., every second, every minute, every ten minutes, etc.).

The time required to model ray paths depends on the modeling resolution and the available computing resources. In some instances, an operator or customer may desire results (e.g., a report) within a specific amount of time or within a reasonable amount of time. It may, therefore, be desirable to use a reasonably low-resolution ray-path modeling that allows for results and reports within a reasonable amount of time via a reasonable amount of computing resources.

For instance, the system may model ray paths from 1,000 locations on the roof of the structure (e.g., to provide a desired spatial resolution) to modeled locations of the sun at time intervals during a time period that provide an adequate temporal resolution. For example, ray paths may be modeled every two hours between 7 am and 9 pm every week during a one-year period of time. In such an embodiment, 1,000 ray paths would be modeled to locations of the sun 8 times each day on 52 different days during the year. Even with this lower resolution (sparse) modeling, 416,000 ray paths would be modeled within the three-dimensional model. Given available computing resources and/or expected delivery timelines, the spatial resolution and/or the temporal resolution may be increased or decreased.

As described above, the spatial resolution may be modified by changing the density or number of locations on the roof of the structure, and the temporal resolution may be modified by changing one or more of: the time interval at which ray paths are modeled on a given day (e.g., every minute, every hour, every three hours, etc.); the time window during each day during which ray paths are modeled (e.g., 24-hours each day, 11 am-7 pm, etc.); the number of days ray paths are modeled during a time period (e.g., every day, every other day, every third day, once each week, once every two weeks, once a month, etc.); and the total time period during which ray paths are modeled (e.g., a one-month period, a three-month period, a six-month period, a twelve-month period, or even a multi-year period).

According to various embodiments, a non-transitory computer-readable medium may include instructions that, when executed by a processor, cause a system to model a ray path between each of a plurality of locations on the roof of a structure and modeled locations of the sun relative to the roof of the structure at a defined time interval during an extended time period (e.g., at different times during a time period). The instructions may further cause the system to distinguish between obstructed and unobstructed ray paths, as described herein. The instructions may then cause the system to calculate a solar irradiance value for each location on the roof during a time period (e.g., one year) as a function of the number of unobstructed ray paths associated with each respective location on the roof. As described herein, the solar irradiance value may further be a function of the angle of each modeled ray path relative to a normal associated with each location on the roof.

As described herein, the number of locations on the roof may vary to achieve a target spatial resolution. For example, locations may be selected that correspond to surface areas between 0.01 meters squared and 1.0 meters squared. As previously described, each ray path may be modeled as a line segment between a location on the roof of the structure and the modeled location of the sun at each given time.

According to various embodiments and variations of the embodiments described herein, relatively lower-resolution or sparse modeling of solar ray paths may result in erroneous outputs in which the effects of an occluding obstacle are missed. For example, if sampling for a given location occurs at 9 am and 11 am (e.g., corresponding to a two-hour sampling interval), it is possible that a tree or other obstacle may be missed that casts a shadow on the given location from 9:45 am until 10:30 am. The ray path at 9 am and the ray path at 11 am may both be unobstructed and the system may (erroneously) interpolate the solar irradiance as continuous between 9 am and 11 am. Sampling with a one-hour interval would reveal an unobstructed ray path at 9 am, an obstructed ray path at 10 am, and an unobstructed ray path at 11 am, which may provide more accurate data for solar irradiance calculations. Sampling with one-minute intervals would result in much more accurate solar irradiance estimations but would require significantly more computing power and/or time.

According to various embodiments of the systems and methods described herein, ray paths may be modeled as divergent beam ray paths instead of line segments. A divergent beam ray path may be modeled as a cone or a pyramid with the apex at a location on the roof. The angle of divergence as the ray path extends from the location on the roof to the modeled location of the sun may be selected based on the sparsity of daily time interval sampling.

As an example, if a one-hour time interval is selected for sampling ray paths from the various locations on the roof, depending on the time of year and latitude of the structure, the sun may be modeled as moving approximately 15 degrees each hour (e.g., approximately 900 arcminutes). A vent pipe, pole, or tree may only occlude a 5-degree portion of the sky relative to a given location on the roof. In embodiments in which the sun is modeled as a single point for ray-path modeling between the location on the roof and the sun, modeling with one-hour increments may result in the modeling missing the vent pipe, pole, or tree. In some embodiments, divergent beam ray paths may be modeled as cones or pyramids that diverge in order to detect objects or obstacles that would otherwise be missed due to sparse temporal modeling. The divergent beam ray path may be identified as obstructed if any portion or more than a threshold percentage of the divergent beam ray path intersects an object or obstacle between the location on the roof and the modeled location of the sun.

The angle of divergence may be selected to correspond to the sampling interval. For example, an angle of divergence may be selected such that diverging cones or pyramids from a given location on the roof at a first sampling time and a second, next interval sampling time overlap at a target distance.

In various embodiments, a system for divergent beam ray-path modeling may receive or otherwise utilize an existing 3D model of a roof of a structure and surrounding obstacles. The system may include a divergent beam ray-path modeling subsystem to model a divergent beam ray path from each location (e.g., hundreds, thousands, or tens of thousands of locations) on a roof of a structure to a modeled location of the sun at multiple, discrete times during a time period. The system may further include a beam ray-path analysis subsystem to identify (i) obstructed divergent beam ray paths that are obstructed by an obstacle and (ii) unobstructed divergent beam ray paths. The system may further include an irradiance calculation subsystem to calculate a solar irradiance value for each location on the roof of the structure during the time period based on the number of unobstructed divergent beam ray paths associated with each respective location during the time period.

In some embodiments, the system may include a modeling subsystem to identify the plurality of locations on the roof of the structure as a number of locations corresponding to a spatial sampling resolution, as described herein. In some embodiments, the system may also include an analemma resolution subsystem to identify the multiple, discrete times during the time period as a number of times each day and a number of days during the time period for which a divergent beam ray path is modeled from each location on the roof of the structure. In other embodiments, the spatial sampling resolution and/or the temporal sampling resolution may be specified by an external system, automatically according to default settings, and/or manually by an operator or other user of the system.

As previously described, each divergent beam ray path may be modeled as a cone or pyramid with an apex and an altitude. The apex of the cone or pyramid may be modeled at the location on the roof of the structure. The altitude may extend from the location on the roof of the structure to the modeled location of the sun at each given sampling time. For pyramid divergent beam ray paths, the base of the pyramid may be modeled as an n-sided polygon, where n is an integer. In various embodiments, each divergent beam ray path may be identified as "obstructed" only when the divergent beam ray path is fully or completely obstructed by an obstacle, when the divergent beam ray path is partially obstructed by the obstacle, or when the divergent beam ray path is obstructed by more than a threshold amount (e.g., percentage).

Some of the infrastructure that can be used with embodiments disclosed herein is already available, such as general-purpose computers, computer programming tools and techniques, digital storage media, and communications networks. A computer may include a processor, such as a microprocessor, microcontroller, logic circuitry, or the like. The processor may include a special-purpose processing device, such as an ASIC, a PAL, a PLA, a PLD, a CPLD, a Field Programmable Gate Array (FPGA), or another customized or programmable device. The computer may also include a computer-readable storage device, such as non-volatile memory, static RAM, dynamic RAM, ROM, CD-ROM, disk, tape, magnetic memory, optical memory, flash memory, or another computer-readable storage medium.

Suitable networks for configuration and/or use, as described herein, include any of a wide variety of network infrastructures. A network may incorporate landlines, wireless communication, optical connections, various modulators, demodulators, small form-factor pluggable (SFP) transceivers, routers, hubs, switches, and/or other networking equipment.

The network may include communications or networking software, such as software available from Novell, Microsoft, Artisoft, and other vendors, and may operate using TCP/IP, SPX, IPX, SONET, and other protocols over twisted pair, coaxial, or optical fiber cables, telephone lines, satellites, microwave relays, modulated AC power lines, physical media transfer, wireless radio links, and/or other data transmission "wires." The network may encompass smaller networks and/or be connectable to other networks through a gateway or similar mechanism.

Aspects of certain embodiments described herein may be implemented as software modules or components. As used herein, a software module or component may include any type of computer instruction or computer-executable code located within or on a computer-readable storage medium, such as a non-transitory computer-readable medium. A software module may, for instance, comprise one or more physical or logical blocks of computer instructions, which may be organized as a routine, program, object, component, data structure, etc., that perform one or more tasks or implement particular data types, algorithms, and/or methods.

A particular software module may comprise disparate instructions stored in different locations of a computer-readable storage medium, which together implement the described functionality of the module. Indeed, a module may comprise a single instruction or many instructions and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Further, those of skill in the art will recognize that one or more of the specific details may be omitted, or other methods, components, or materials may be used. In some cases, operations are not shown or described in detail. Thus, the following detailed description of the embodiments of the systems and methods of the disclosure is not intended to limit the scope of the disclosure, as claimed, but is merely representative of possible embodiments.

FIG. 1 illustrates a graphical user interface 100 for inputting a subject property 102 for investigation. Subject property 102 may include any site, including a vacant lot, a house 103, a roof, and/or any other structure for solar panel installation. For example, a user input 104 may include selecting the house 103 on subject property 102. The user input 104 may select the subject property 102 for analysis of solar panel installations. The graphical user interface 100 may include a map, a satellite image, GPS coordinates, an address according to county records, and/or other identifying information. User input 104 may allow an operator to select a property, enter an address or GPS coordinates, and/or otherwise identify the subject property 102. The subject property 102 may have many obstacles to solar irradiance (e.g., on a roof of the subject property 102). For example, the subject property 102 may border a retaining wall 106 and a neighboring property 108. In some embodiments, neighboring property 108 may be a house. In other embodiments, neighboring property 108, high-rise office or residential building 110 and/or a commercial building 112 may impact solar irradiance. Commercial building 112 may include, for example, a grocery store, a shopping mall, a warehouse, an industrial building, and/or any other building used in commerce.

Figure 2:
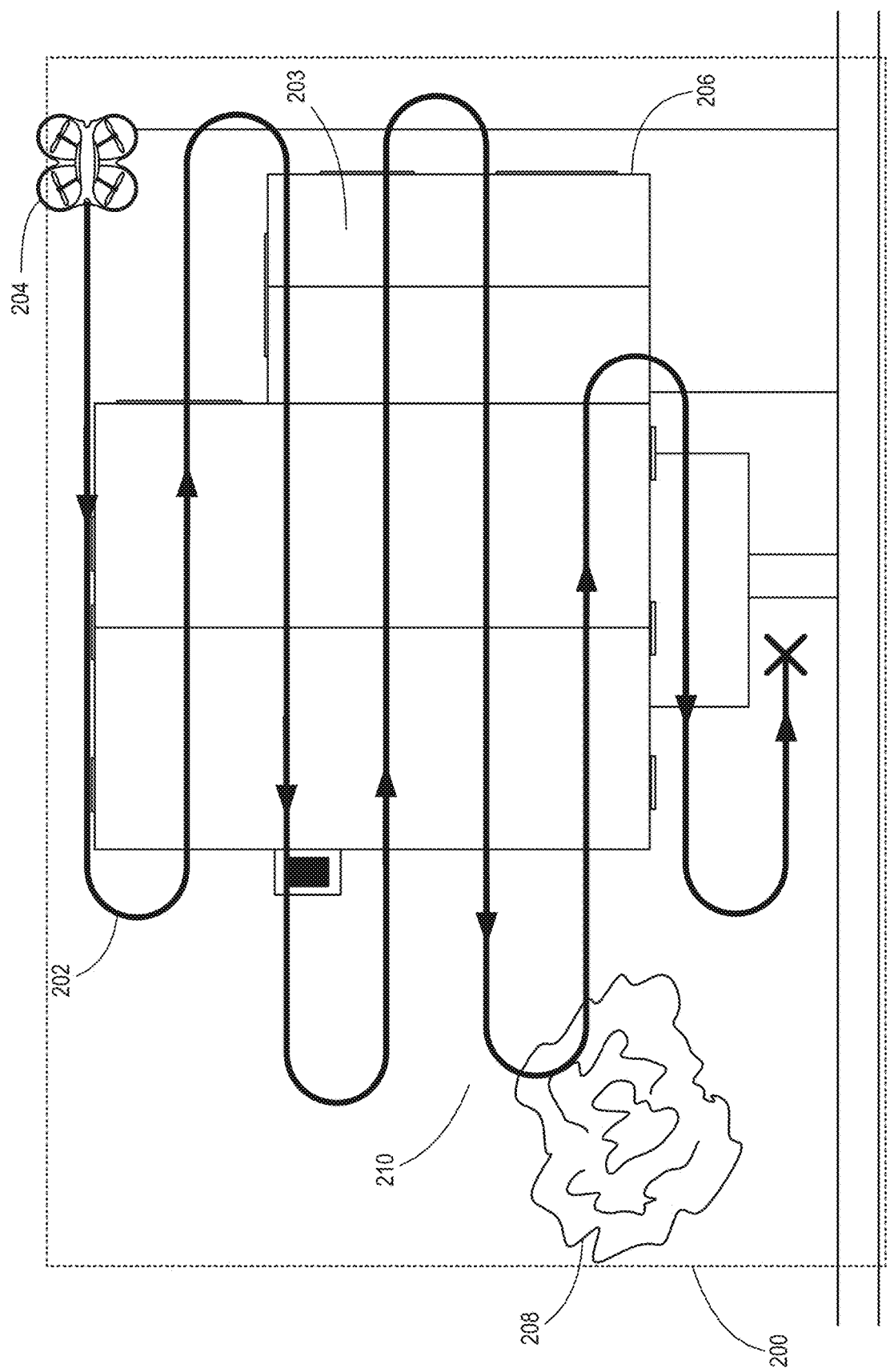
FIG. 2 illustrates an example of a boustrophedonic flight pattern of an unmanned aerial vehicle (UAV) over a structure.

FIG. 2 illustrates a boustrophedonic flight pattern 202 over house 203. The boustrophedonic flight pattern 202 involves multiple scans in opposite directions. The boustrophedonic flight pattern 202 may slightly offset each scan or pass. For example, a second scan may be slightly offset from the first so that some of the data in the scans may overlap and give context for joining the scans into a complete scan of subject property 200. The operator may input or define the boustrophedonic flight pattern 202 over any portion of subject property, including house 203. The unmanned aerial vehicle (UAV) 204 may capture images, scan for data, and/or make measurements during the flight. The operator may pre-program the boustrophedonic flight pattern 202, or the operator may limit the boustrophedonic flight pattern 202 to set boundaries 206 of the subject property 200 (e.g., the house 203 and/or the subject property 102 may provide the input boundaries).

In some embodiments, the UAV 204 may slightly exceed the set boundaries 206 or the set boundaries 206 may change when UAV 204 detects an obstacle (e.g. tree 208). For example, the UAV 204 may slightly exceed the set boundaries 206 when the UAV 204 detects a tree 208. The UAV 204 may capture data, take pictures, and/or make measurements of the tree 208 and the shadow 210 cast by the obstacle (e.g., tree 208). For clarity, FIG. 2 only depicts eight boustrophedonic passes; however, a boustrophedonic flight pattern 202 may include additional or fewer passes. The actual number of passes may vary based on the size of the roof or site analyzed, the elevation of the UAV 204, the desired detail, sensor field of view (e.g., camera zoom), desired overlap of captured images, and/or other variables. Similarly, the flight path 202 may not extend to the set boundaries 206 of the subject property 200 (or roof of house 203) but may extend just beyond or just short of the boundaries of the subject property 200 (or roof of house 203).

In some embodiments, the boustrophedonic scan may include a crisscross boustrophedonic scan with two boustrophedonic scans performed at an angle relative to one another. The angle of the optical axis of the camera of the UAV may be adjusted during the scans to capture structure-facing images to enhance the quality and accuracy of three-dimensional modeling. In still other embodiments, multiple cameras on the UAV 204 may capture images at different angles from various locations as the UAV 204 navigates a flight pattern.

For example, a downward-facing camera (i.e., with the optical axis pointed toward the earth) and a forward-facing camera tilted slightly upward (e.g., at 15°, 30°, 45°, 60°, etc.) can capture forward-facing images (i.e., in the direction of travel) or rearward-facing images (i.e., away from travel). Additional cameras may be used to capture images at any angle and in any direction relative to the direction of travel. Alternatively, a single camera on a gimbal can be rotated to capture images in multiple directions during a flight pattern and/or from the same location(s) during the navigation of a flight pattern.

Figure 3:
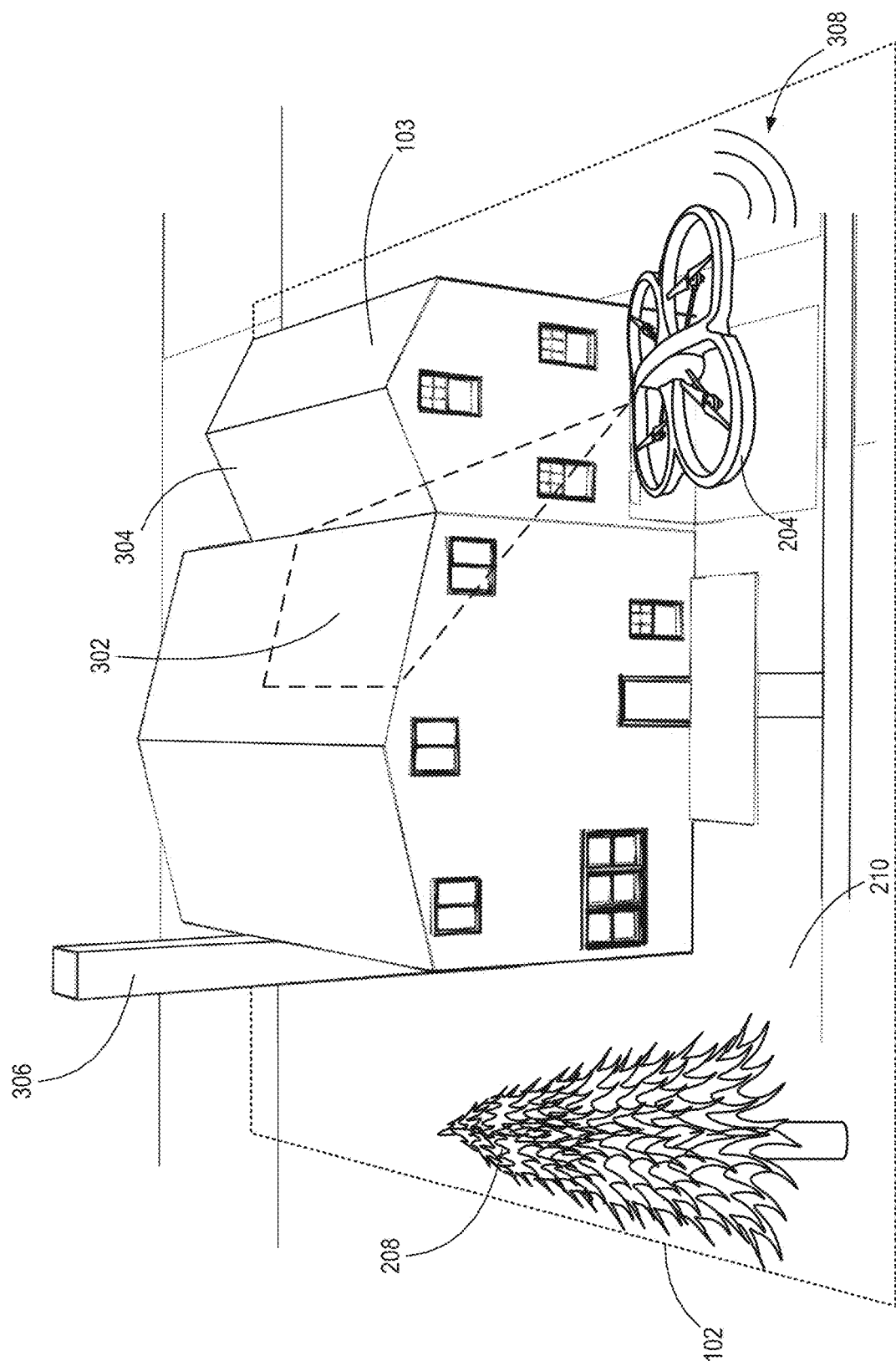
FIG. 3 illustrates an example of a scan of a portion of a planar roof section of a structure.

FIG. 3 illustrates UAV 204 analyzing a target location 302 (e.g., a planar section) of roof 304. The target location 302 of roof 304 may be part of a boustrophedonic flight pattern 202 (e.g., as shown in FIG. 2) or as part of a microscan of a detailed section of roof 304. For example, the detailed microscan of target location 302 of roof 304 may analyze various obstacles to the solar irradiance at the detailed section of roof 304. The UAV 204 may capture images of the shadow 210 of a tree 208. Based on the time of day, the UAV 204 system may also identify obstacles that are not casting shadows. For example, chimney 306 may obstruct the target location 302 area during certain times of the day, even though it does not currently cast a shadow on that area during the scan. Similarly, other sections of roof 304 may obstruct the solar irradiance at the particular microscan target location 302. Gables, adjacent sloped roofs 304, the direction of the roof 304 relative to the trajectory of the sun, and/or other factors of the roof 304 may affect the solar irradiance at the analyzed microscan target location 302.

In some embodiments, the system may connect UAV 204 through a network signal 308. The signal 308 may provide inputs and/or outputs to UAV 204. For example, the signal 308 may directly control the flight of UAV 204. The system may pre-program a particular flight pattern for the UAV, identifying target locations 302 for microscans. Similarly, UAV 204 may output data, photographs, video, measurements, and/or other outputs to the system network via signal 308. Signal 308 may transmit data in real-time following a particular scan (e.g., microscan of target location 302) or following the complete flight pattern to allow time to compile and assimilate the scanned data.

Figure 4:
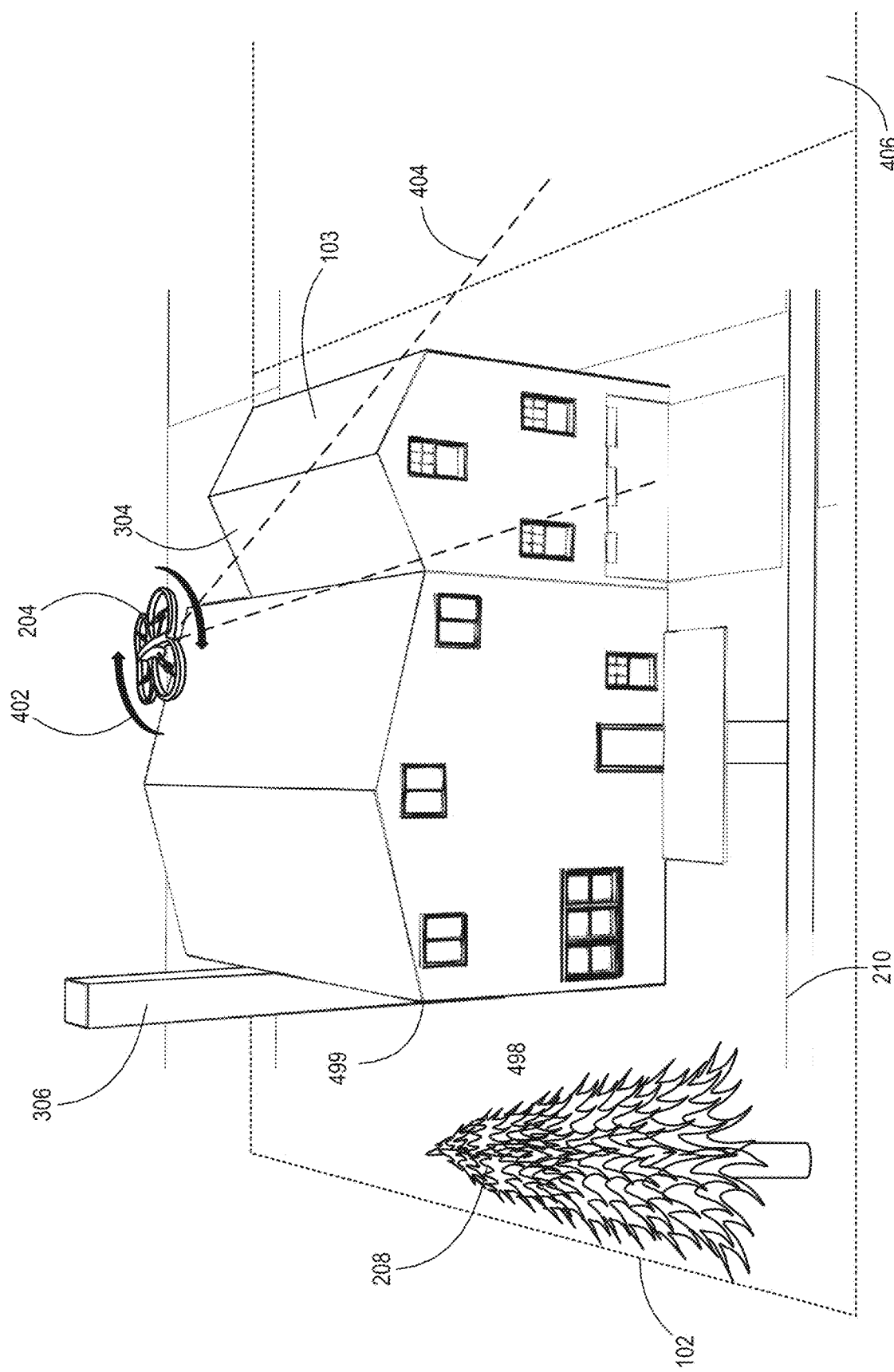
FIG. 4 illustrates an example of a UAV performing a 360-degree panoramic scan of a region proximate to the structure to identify actual and/or forecasted obstructions.

FIG. 4 illustrates the UAV 204 at a top and near-middle location of house 103. In this location, UAV 204 may perform a 360-degree spin 402 to obtain a panoramic capture 404 of surrounding buildings, trees, and other obstacles. As shown in FIG. 4, the angle of the scan is approximately five degrees, but the operator may select any angle for a panoramic scan 404. Panoramic scan 404 may capture surrounding obstacles and scan for future obstacles. Multiple panoramic scans may be taken from different elevations. In some embodiments, a panoramic scan may be taken from other locations, such as location 498 between the tree 208 and the exterior walls of the house 103 at an elevation below, at, or above the corner 499 of the house 103. Such panoramic scans may facilitate detailed three-dimensional modeling of the structure and surrounding objects.

A panoramic scan 404 may include a scan of vacant neighboring parcels 406. The system for determining solar exposure at designated locations may determine the zoning of the vacant parcel 406 and calculate an estimated obstruction by any future construction on that parcel 406. For example, the system may access county records, construction plans, zoning ordinances, and/or other relevant information to estimate a period of time a future obstacle on vacant parcel 406 may obstruct one or more sections of the roof 304. Panoramic scan 404 may consider the expected growth of trees 208 and the potential future impact of shadow 210. The panoramic scan 404 may identify other obstacles. For example, panoramic scan 404 may identify obstacles such as chimney 306, telephone poles, satellite dishes, gables, roof orientation to the sun's trajectory, and/or other obstacles requiring microscans of target locations 302 illustrated in FIG. 3.

Figure 5:
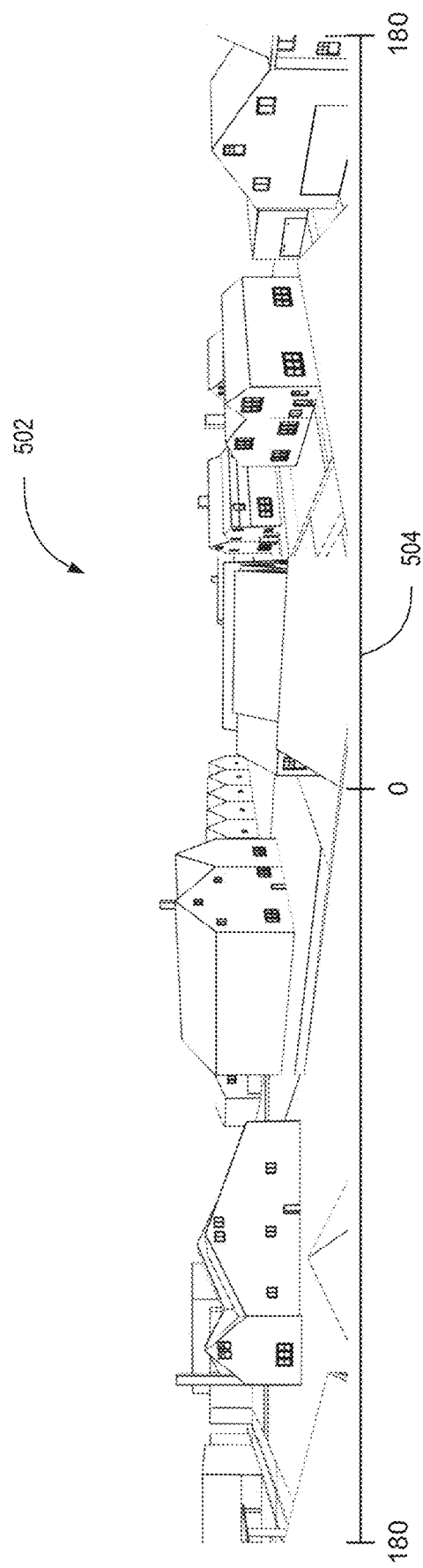
FIG. 5 illustrates an example of a rectangular representation of a panoramic image generated by a panoramic scan by a UAV.

FIG. 5 illustrates the data 502 captured in the panoramic scan 404 of FIG. 4. The panoramic scan 404 may provide a panoramic image capture 504. Panoramic image 504 may be in a rectangular form representing a 360-degree spin 402 of a camera attached to UAV 204 (e.g., as illustrated in FIG. 4). The system may use image 504 in conjunction with detailed microscans of target locations 302 on roof 304, as illustrated in FIG. 3.

Figure 6:
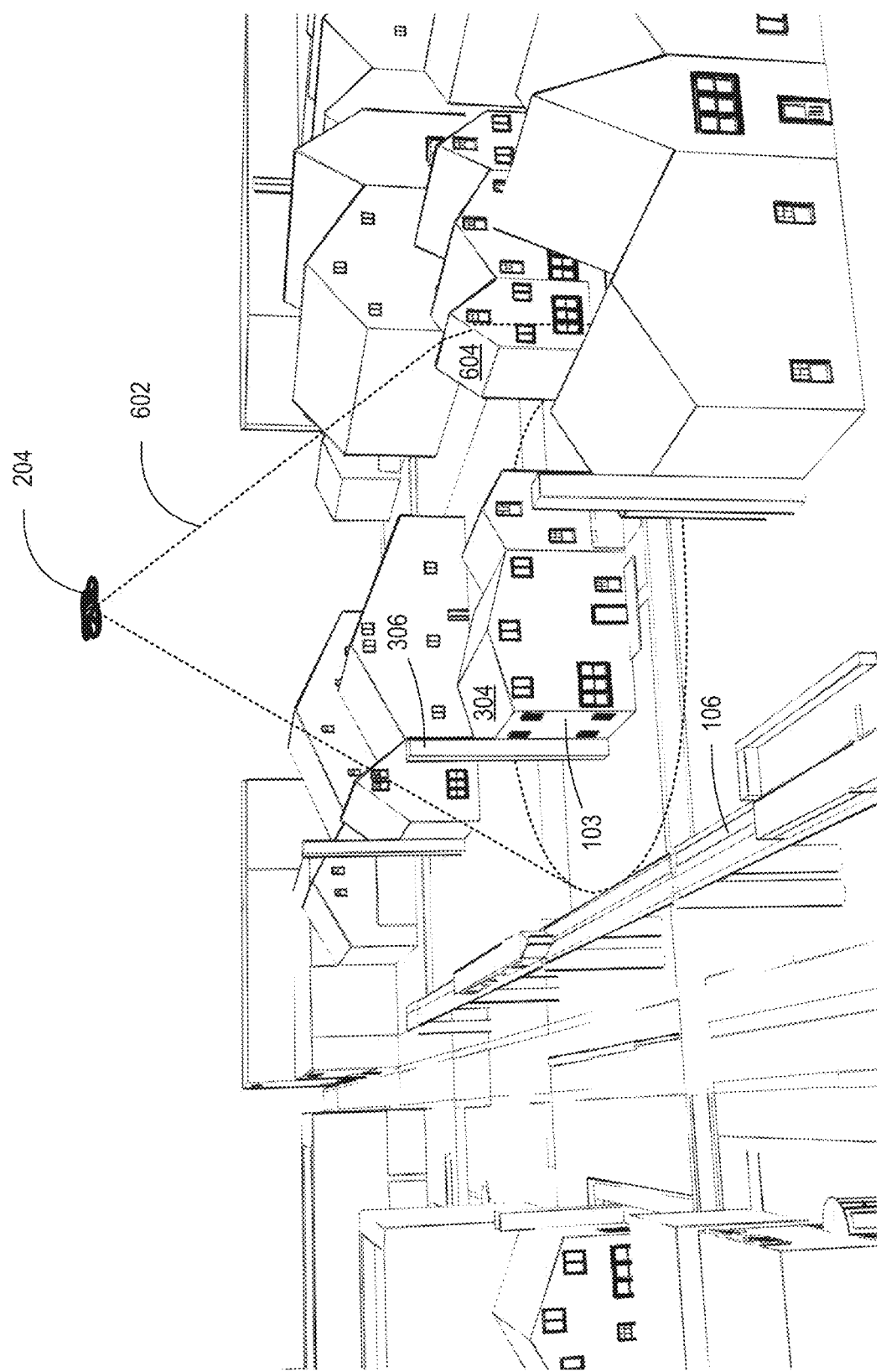
FIG. 6 illustrates an example of a UAV capturing a nadir scan of a structure.

FIG. 6 illustrates UAV 204 capturing a nadir image 602 of subject property 102 (from FIG. 1). The nadir image 602 may include the roof 304 of house 103 as well as obstructions on the neighboring property 604. Nadir image 602 may also capture other obstacles such as chimney 306 and wall 106 and locate areas for additional microscans of target locations 302 illustrated in FIG. 3. Nadir image 602 may identify obstacles on neighboring properties 604, such as buildings, trees, chimneys, and/or other structures that may interfere with the solar exposure received at roof 304. Nadir image 602 may identify locations of future or potential obstructions and may transmit and/or record these areas for further study. In some embodiments, the solar exposure system may locate or retrieve pertinent information such as the zoning of vacant lots and/or construction plans.

In FIG. 6, the nadir image 602 may be captured with the camera pointing straight down such that the optical axis of the camera is normal to the gravitational pull of the earth, or the earth itself if the lot is relatively flat. The UAV 204 may capture additional surrounding-area images from the same location by positioning the optical axis of the camera at a different angle and rotating the UAV 204 360 degrees.

Figure 7:
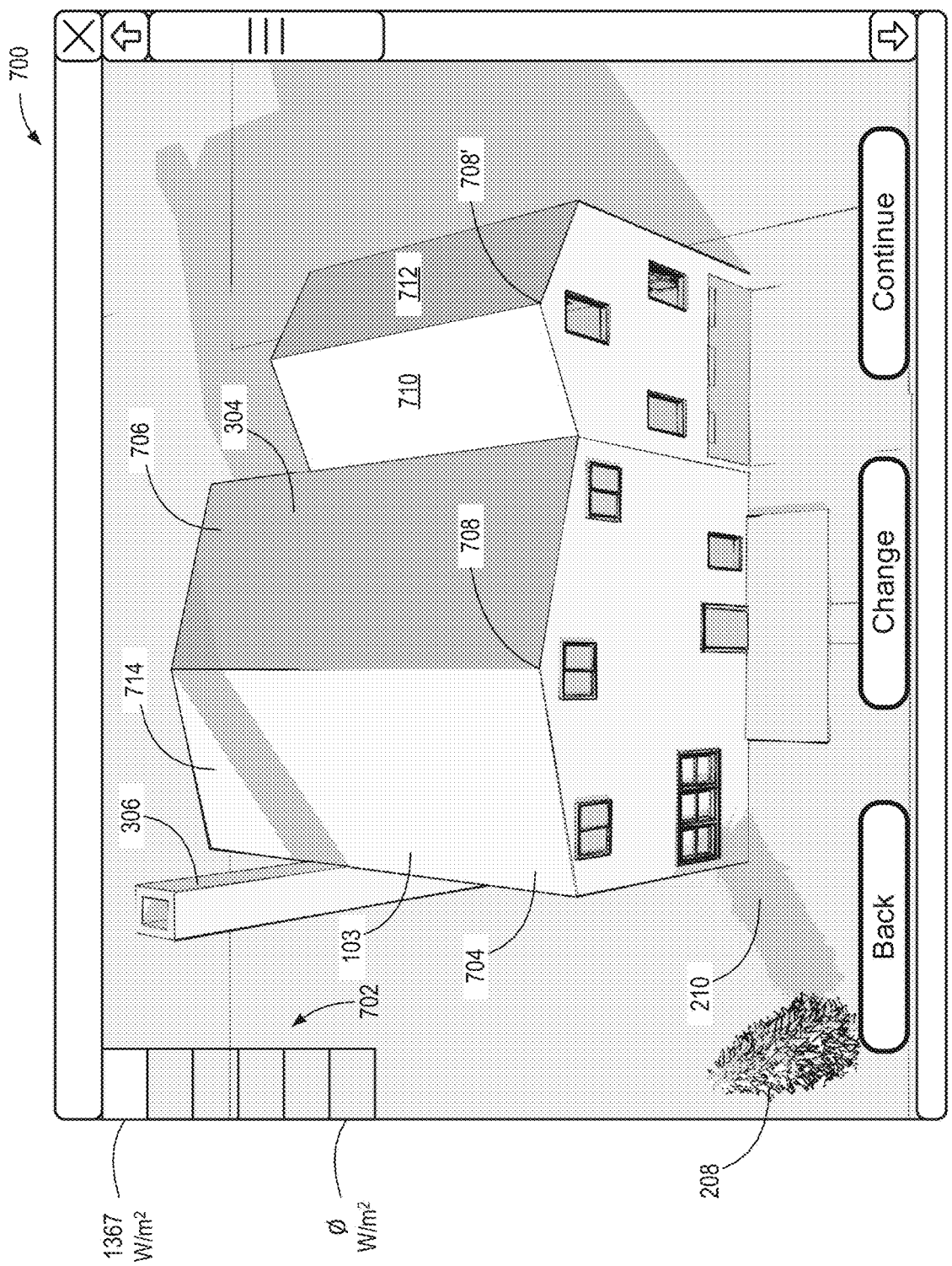
FIG. 7 illustrates a graphical user interface (GUI) with a spatial heatmap representing solar irradiance values on a roof of a structure, according to one embodiment.

FIG. 7 illustrates a graphical user interface showing a three-dimensional model of the structure and surrounding area. The graphical user interface includes a heatmap 700 of the solar irradiance at various locations of the structure. The heatmap 700 includes a legend 702 identifying white area 704 as corresponding to the area with the highest solar irradiance and dark area 706 as corresponding to the region with the least solar irradiance. The legend 702 also indicates that the heatmap 700 varies in solar irradiance from 1367 W/m$^2$ (e.g., at white area 704) in the most irradiant portions to zero W/m$^2$ (e.g., at dark area 706) in the most obstructed portions. The system may round the irradiance down to zero for any region with insufficient light to activate a solar panel. FIG. 7 also illustrates how gables 708 and 708' can affect the solar irradiance at various locations along roof 304. For example, the solar irradiance at a location along a section of roof 710 is slightly less than the solar irradiance at white area 704 due to the obstruction of gable 708. At a location along a section of roof 712, both gables 708 and 708' may occlude solar exposure. Direct obstructions, such as chimney 306, may play an expanded role in the solar exposure throughout the day. Heatmap 700 allows for an averaged shadow 714 throughout the day. Thus, the averaged shadow 714 is shown having an area larger than the area of any actual shadow cast by chimney 306 at any point in time during the day.

As previously described, ray-path tracing from various locations on the surface of the roof to modeled locations of the sun for various times during the day over any period of time can be used to develop average solar irradiance values for any given location on the roof 304 over any averaged period of time.

Figure 8:
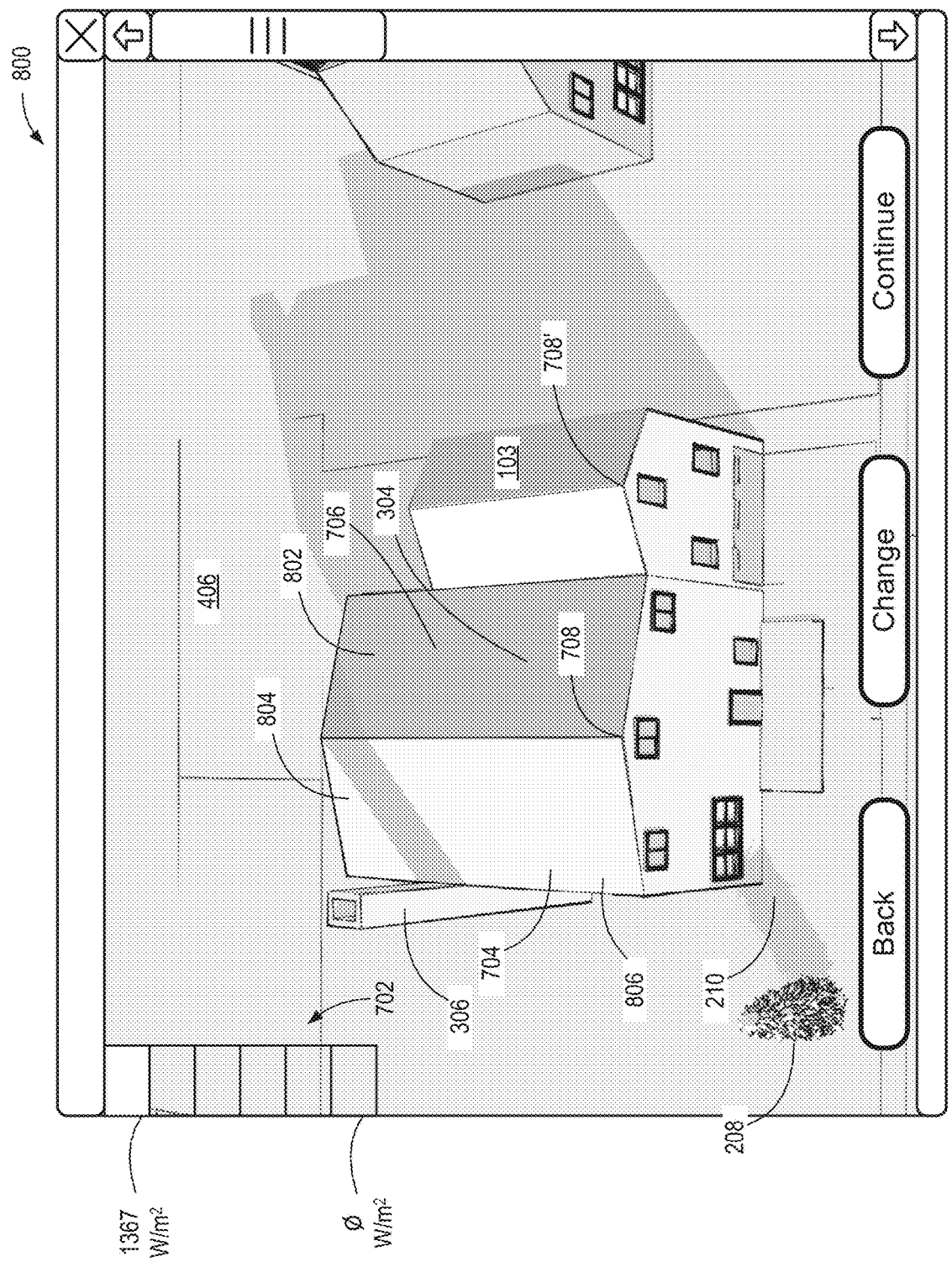
FIG. 8 illustrates a GUI with a spatial heatmap representing solar irradiance values on a roof of a structure, according to one embodiment.

FIG. 8 illustrates a graphical user interface showing a heatmap 800 that accounts for future obstacles. A vacant lot 406 (e.g., to the west) and the tree 208 do not appear to be obstacles at the present time but may become obstacles at some future time. The heatmap 800 considers the features of these future obstacles through time. For example, the zone 802 considers the combined effect of the chimney 306, the gable 708, and a future building built on the vacant lot 406.

The zone 804 represents the locations on the roof from which the ray paths are blocked by the actual chimney 306 and the three-dimensionally modeled building that could be constructed within the zoning requirements on the vacant lot 406. The zone 806 illustrates the effects of the shadow 210 cast by the future growth of the tree 208. The three-dimensional model may include the tree 208 in its current state but model it larger over time. The ray paths blocked over time are averaged to develop an accurate prediction of the solar irradiance average in zone 806 over a selected time period. For example, the system may evaluate the ray paths blocked by more mature tree 208 to predict a shadow 210 at a future time (e.g., in five years). Thus, the system may account for and combine both present obstacles (e.g., the chimney 306 and the gables 708) and future obstacles (e.g., the vacant lot 406 and the tree 208) into a single heatmap 800.

In some embodiments, the system may estimate that every tree will grow a certain amount per year. In other embodiments, the system may use a standard growth rate model based on the current height of the tree (e.g., very small trees may be expected to grow at a relatively high rate per year, while very tall trees may be expected to grow at a relatively slower rate per year). In some embodiments, the system may include or connect with a tree variety identification subsystem. The system may thereby identify the variety of a detected tree and estimate a mature-sized tree. The estimated mature-sized tree may then be used to identify future or potential shadows on the structure.

In some embodiments, the tree variety identification subsystem may identify a tree variety based on the shape of branches, current height of the tree, current width of the tree, bark texture, bark pattern, bark color, foliage color, foliage shape, foliage size, needle size, needle clusters, fruit of the tree, flowers on the tree, cones produced by the tree, etc.

Figure 9:
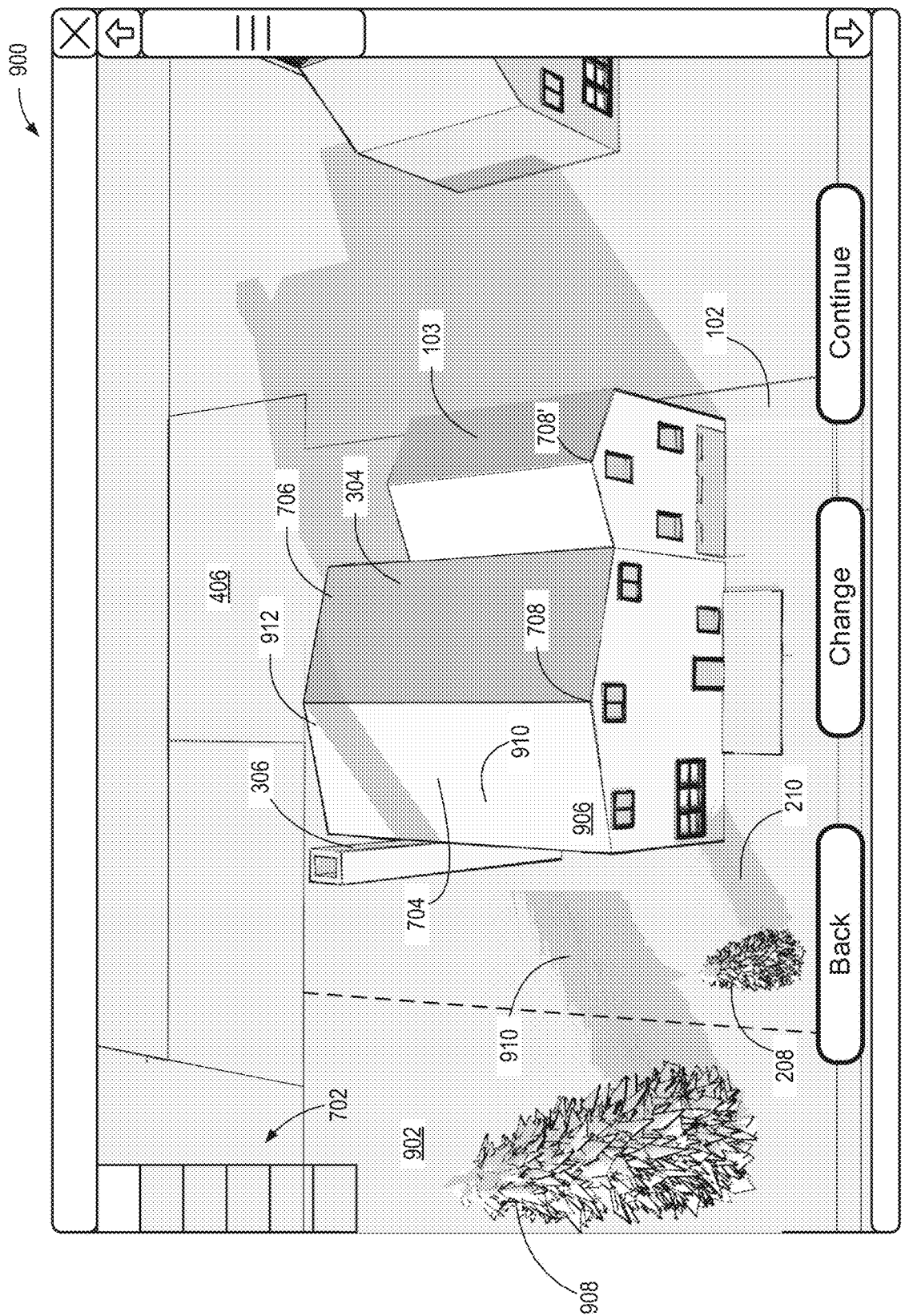
FIG. 9 illustrates a spatial heatmap showing a spatial distribution of average solar irradiance values temporally averaged over a predetermined time period, according to one embodiment.

FIG. 9 illustrates how obstacles on an adjacent lot 902 may affect heatmap 900. As in FIG. 8, the heatmap 900 may include present obstacles (e.g., the chimney 306 and the gables 708 and 708'), future obstacles (e.g., the shadow 210 from the mature tree 208 illustrated as the zone 906) and may include obstacles from neighboring adjacent lots 902. For example, the neighbor's tree 908 casts a shadow 910 on the zone 704 of the roof 304. In addition, the vacant lot 406 may create a future shadow in the zone 912 of roof 304. The heatmap 900 may combine these obstacles created by the neighboring lot 902 and future obstacles created by the vacant lot 406.

Figure 10:
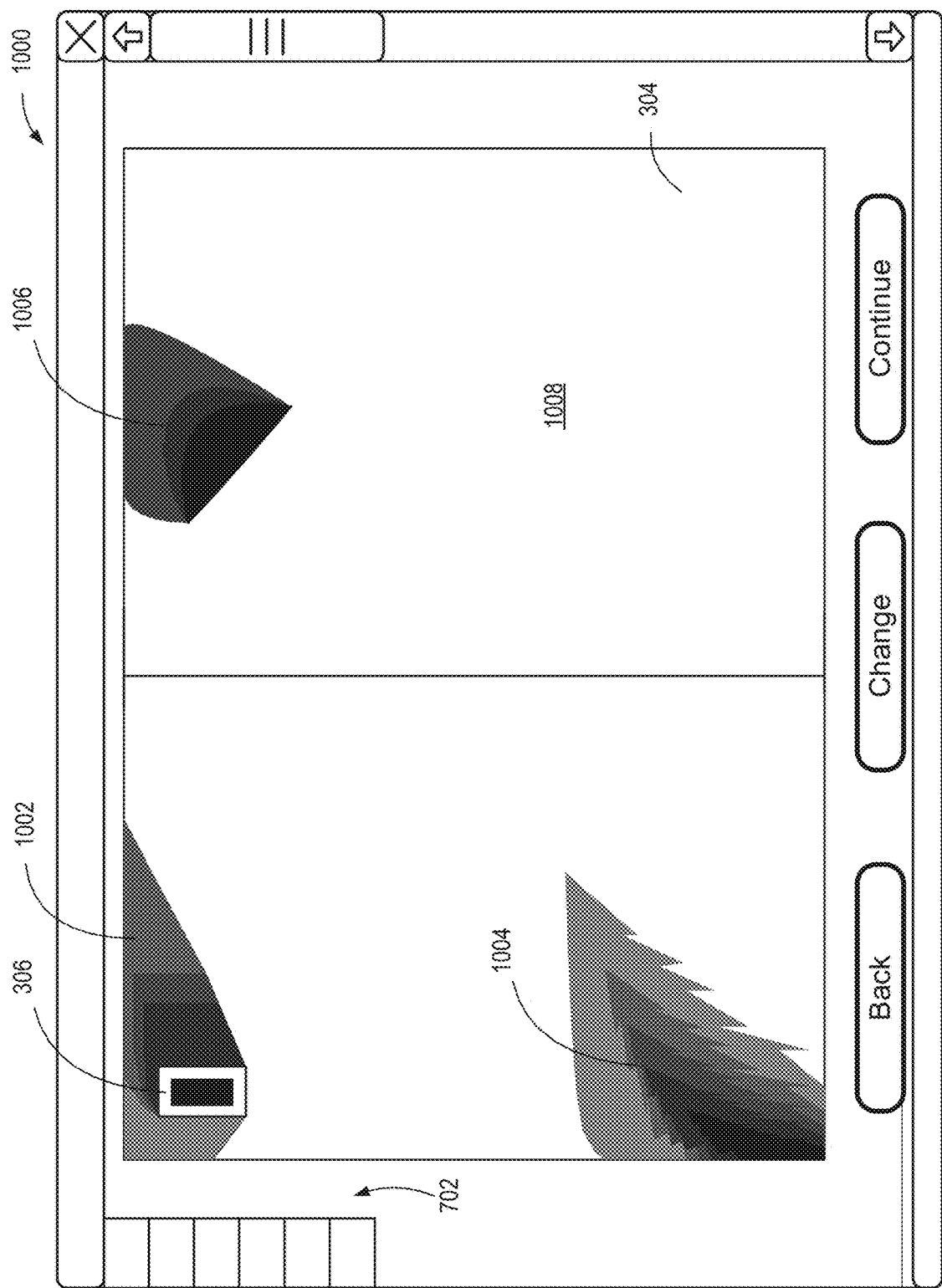
FIG. 10 illustrates an example of a spatial heatmap of an isolated section of the roof showing temporally averaged solar irradiance values affected by obstructions, according to one embodiment.

FIG. 10 illustrates a detailed view of a complex heatmap 1000 representing a section of the roof 304. For clarity, FIG. 10 removes several features of the roof 304 to display an isolated heatmap 1000 with shadowed regions 1002, 1004, 1006, and 1008. The heatmap 1000 illustrates how a variety of obstacles may combine onto a single heatmap 1000. For example, obstacles may include obstacles on the roof 304 (e.g., chimney 306), external to roof 304 (e.g., on subject property 102 illustrated in FIG. 1), and/or on neighboring lots 902 illustrated in FIG. 9. Obstacles may include but are not limited to trees, satellite dishes, satellite antenna, power lines, power poles, cellular towers, chimneys, buildings, attic vents, plumbing vents, the orientation of the roof, the structure of the roof, gables, and other obstacles that obstruct solar irradiation. The heatmap may become quite complicated based on the variety of obstacles to solar irradiation. However, heatmap 1000 may combine the obstruction caused by all these obstacles. The heatmap 1000 may provide a visual tool for a user to determine the placement for solar panels and/or the system may auto-generate placement recommendations/options. Even if part of the panel may, at times, become obstructed, the system may determine that placement in a partially obstructed location satisfies system parameters.

Figure 11:
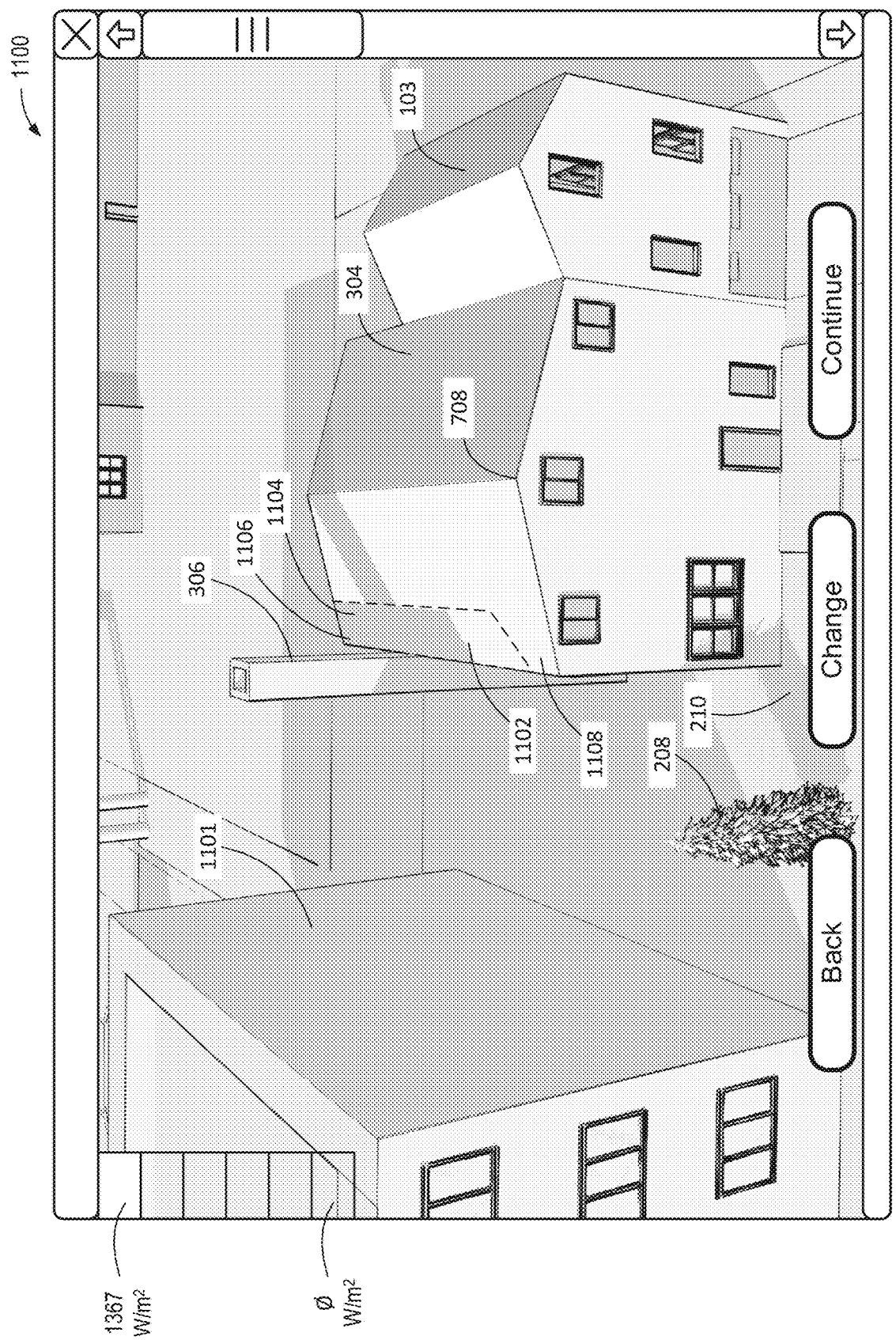
FIG. 11 illustrates an example of a spatial heatmap of temporally averaged solar irradiance values on a roof of a structure affected by various obstructions, including a nearby building.

FIG. 11 illustrates a graphical user interface including a heatmap 1100 of a roof 304 showing the effects of a neighboring three-story building 1101. For example, the three-story building 1101 casts a shadow 1102 on roof 304. Shadow 1104 combines the effects of shadow 1102 cast by three-story building 1101 as well as the shadow cast by chimney 306. This combined shadow 1104 relocates a minimum exposure location 1106 to an area adjacent to the chimney 306. A maximum exposure location 1108 remains in the same area (e.g., compare location 1108 to the maximum exposure location 704 in FIG. 7). Although maximum exposure location 1108 did not change, the optimal placement of solar panels may not be in this location due to the shadow 1102 cast by three-story building 1101. Heatmap 1100 provides an analytical method for determining the optimal placement of solar panels by considering not just the locations of maximum and minimum exposure (e.g., locations 1106 and 1108), but also the average solar exposure at all locations across the panel. In addition, heatmap 1100 allows for contemplation of future complexities in the placement of solar panels. For example, although shown as an actual building, three-story building 1101 may be a model created by the system to depict future developments or zoning on an adjacent vacant lot.

Figure 12:
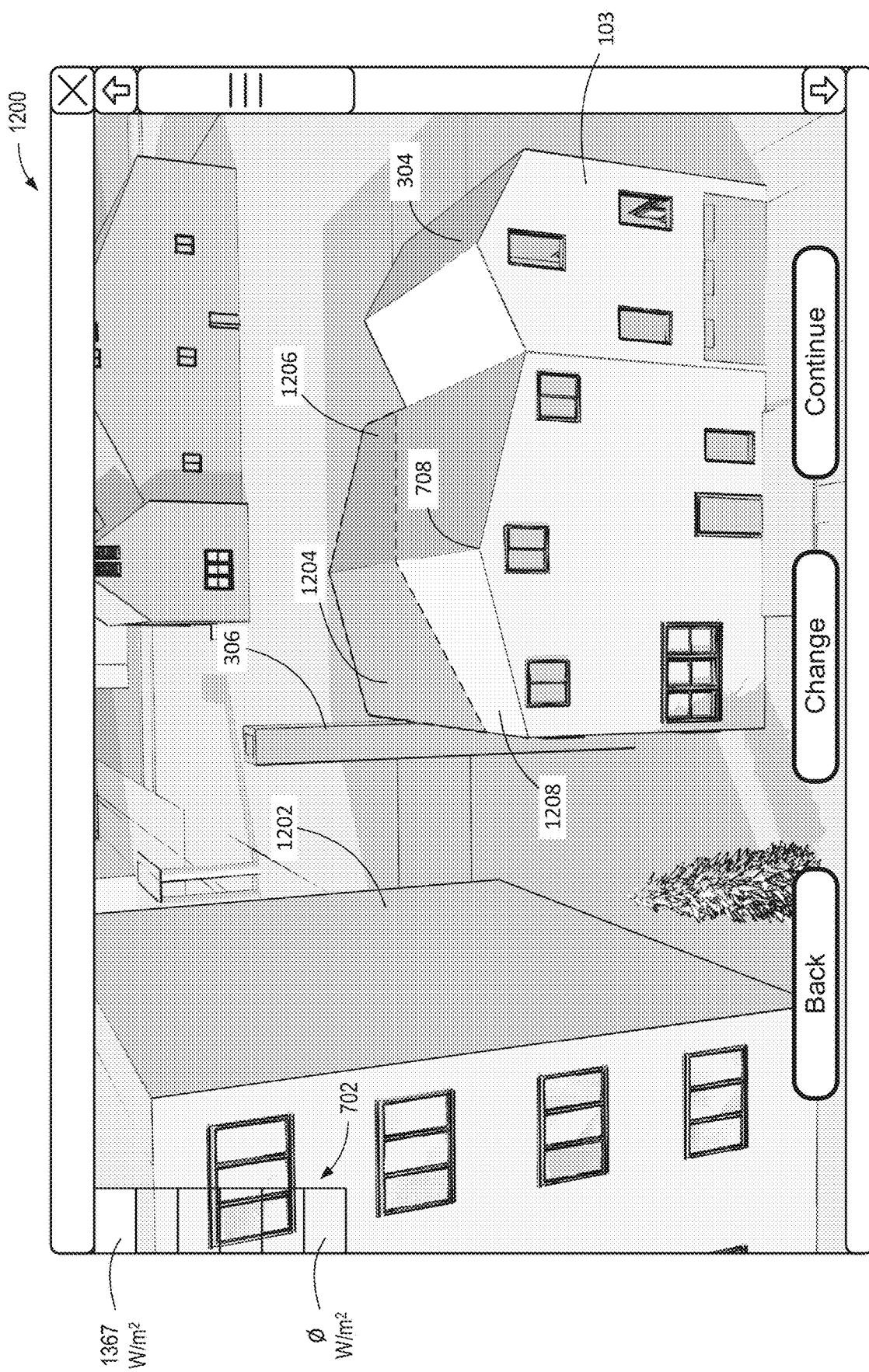
FIG. 12 illustrates an example of a spatial heatmap of temporally averaged solar irradiance affected by a neighboring four-story apartment building.

FIG. 12 illustrates a graphical user interface showing a heatmap 1200 generated by a four-story building 1202. As shown on heatmap 1200, the obstructed effect of chimney 306 and four-story building 1202 may combine into a large shadow 1204. The minimum solar exposure at location 1206 includes the effects of chimney 306, four-story building 1202, gable 708 and the orientation of the roof 304. Although the maximum exposure location 1208 remains the same (e.g., compare location 704 in FIG. 7), the system may not recommend solar panels in this location due to the large shadow 1204 created by building 1202. Heatmap 1200 provides an analytical framework to analyze each finite element of heatmap 1200 and calculate the optimal placement of solar panels along roof 304. For example, although legend 702 still indicates a maximum exposure of 1367 W/m$^2$ at location 1208, that level of irradiance may not be possible at the optimal location of the solar panels due to large shadow 1204. The system may suggest angled panels (e.g., on the other side of gable 708) or alternative placement locations that receive less than optimal irradiance but have the highest average irradiance. Although depicted as an actual building 1202 in FIG. 12, the solar exposure system may approximate a four-story building 1202 based on the zoning of an adjacent vacant lot to create shadow 1204. Therefore, heatmap 1200 may consider the effects of real and/or potential future obstructions (e.g., buildings) on an adjacent vacant lot.

Figure 13:
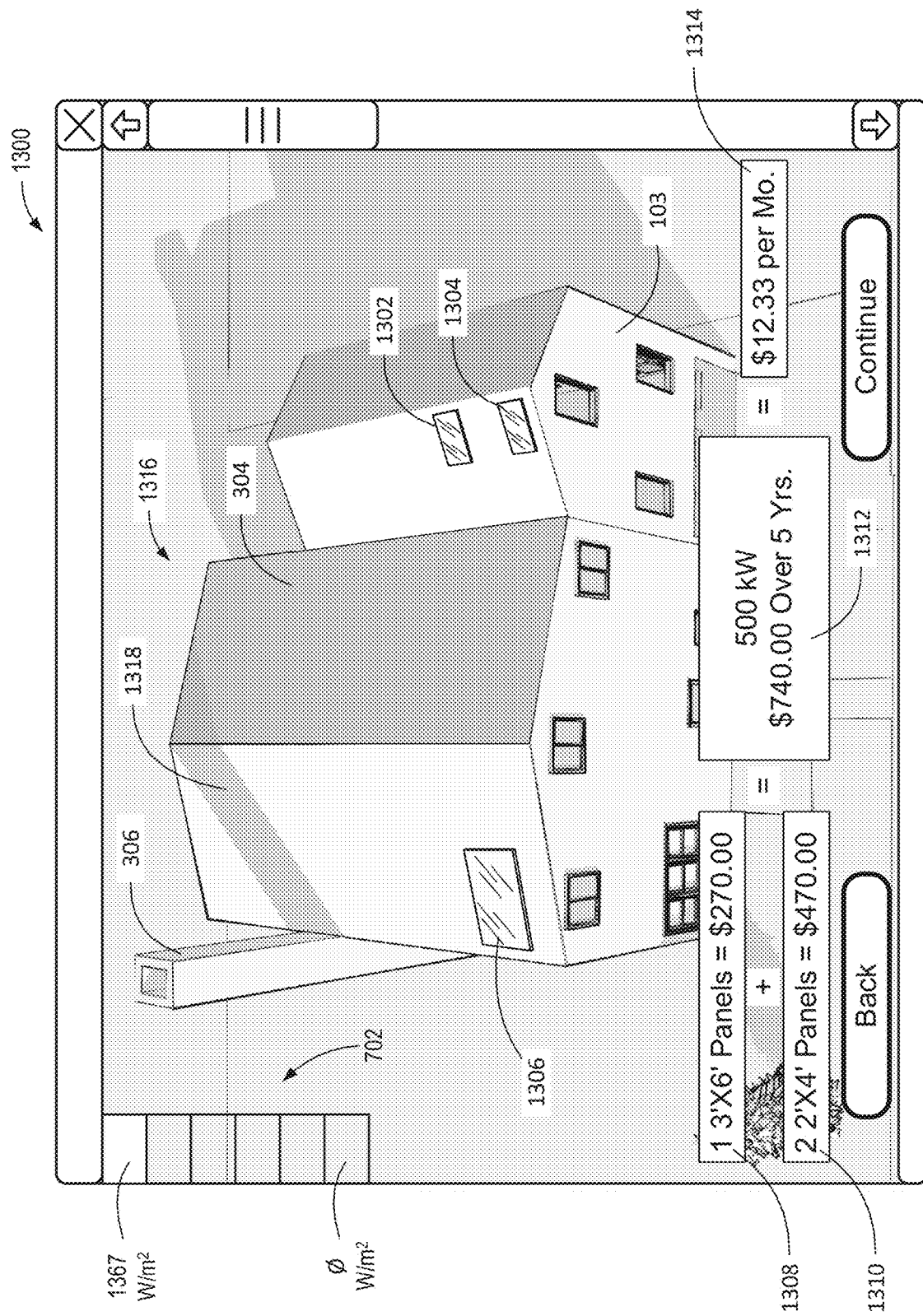
FIG. 13 illustrates an overlay recommendation of solar panel placement based on temporally averaged solar irradiance values calculated for a roof of a particular structure, according to one embodiment.

FIG. 13 illustrates a graphical user interface 1300 of a solar irradiance assessment system. The solar irradiance assessment system may recommend locations 1302, 1304, and 1306 for solar panels based on a user-input size of solar panels, e.g., inputs 1308 and 1310. The user inputs 1308 and 1310 may include the size and quantity of panels, the threshold limit 1312 of the system, the cost per period 1314 for the system, and/or other user-defined data. The solar irradiance assessment system may recommend the placement of a particular size panel (e.g., 3'×6' panel) in a specific location 1306 on the roof 304. The solar irradiance assessment system may recommend the placement of multiple panels 1302, 1304, and 1306. The system may generate a heatmap 1316 and/or "stay-out" regions 1318 for the panels based on one or more obstacles (e.g., chimney 306). The recommended placement of panels 1302, 1304, and 1306 may depend on user inputs such as the cost, size, number, threshold limit 1312, the cost per period 1314, and/or other user inputs.

The heatmap 1316 may identify stay-out regions 1318 for solar panel placement. The heatmap 1316 may represent an average solar distribution of irradiance for a period of time, such as a year. The system may base the estimated distribution of solar irradiance on historical irradiance data. For example, the system may use the solar irradiance of the past year (or an average of the last five, ten, twenty, or another number of years) to determine recommended panel sizes 1308 and 1310 and/or solar panel locations 1302, 1304, and 1306. Heatmap 1316 may provide a graphical recommendation of panel placement, as illustrated. Heatmap 1316 may provide numerical irradiance data for the system to calculate panel placement.

For example, if the operator sets a 500-kW threshold limit 1312 over a period of five years (e.g., 100 kW/year), the system may generate a heatmap 1316 and recommend one or more suitable panel placements (e.g. 1302, 1304, and 1306). The system may determine a quantity and location for solar panels to allow for a purchaser to fully offset an installation cost (e.g., based on saved electricity or electricity sold to another entity) within a prescribed time period (e.g., 7 years) at expected or current energy rates.

A graphical user interface 1400 is illustrated in FIG. 14. The interface 1400 allows the user to select a panel size 1402 and quantity 1404, and the system will generate the watts produced 1405 and the price of the panels 1406. For example, the operator may select a specific size panel 1402 and a quantity 1404 of each panel. The system may auto-populate the watts produced 1405 and the price of the selected panels 1406. In some embodiments, the operator may select all available panel sizes. This selection may permit the system to return a recommended optimal design to maximize solar exposure. The system may generate the quantity 1404, size 1402, price 1406, and/or locations of the panels.

In some embodiments, the system may total the quantity of panels 1408, the total watts generated 1410, and the total price 1412. The user may input a desired payoff period 1414, and the system may generate a cost per month 1416. A person having ordinary skill in the art would recognize other variations on user inputs and system outputs.

Figure 15:
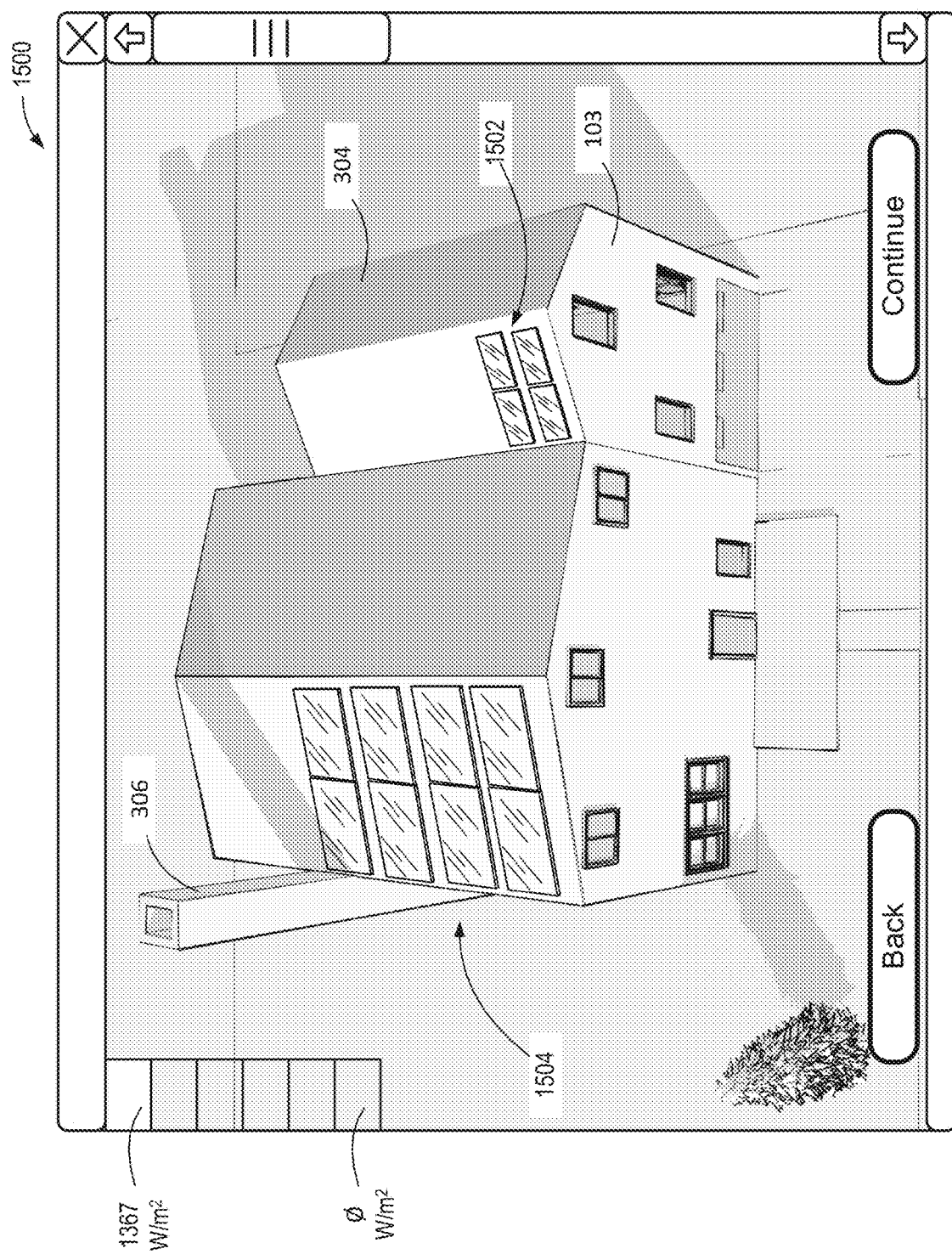
FIG. 15 illustrates an example of an overlay recommendation of solar panel placement based on temporally averaged solar irradiance values and user-specified solar power system specifications.

FIG. 15 illustrates a graphical user interface 1500 for a solar placement system with the placement of panels of various sizes based on user input. The user may specify a total desired output, and the system may generate an optimized or suitable panel placement recommendation. Alternatively, the system may provide total output values, payoff values, estimated costs, etc. as an operator virtually places solar panels on the roof with the overlaid irradiation values (e.g., via a drag and drop operation) at locations 1502 and 1504. The system accounts for the decreased irradiance expected for solar panels placed within shadowed areas, as described herein.

Figure 16A:
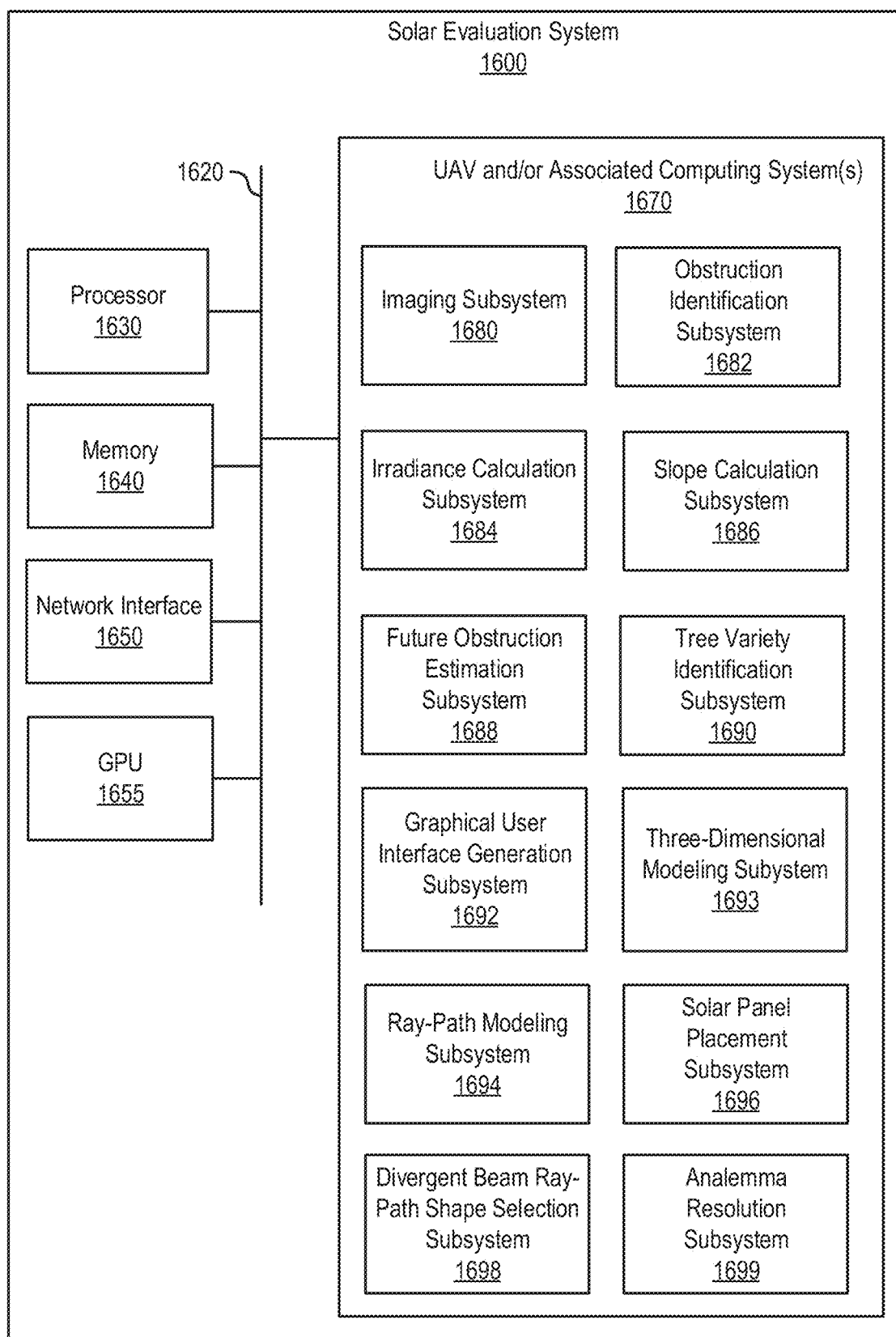
FIG. 16A illustrates a UAV-based solar power design system, according to one embodiment.

FIG. 16A illustrates a UAV-based solar evaluation system 1600. The UAV solar evaluation system 1600 may include a processor 1630, memory 1640, a network interface 1650, and a graphics processing unit 1655 connected via a bus 1620 to various subsystems 1680-1699 of a UAV and/or associated computing systems 1670. Examples of the various subsystems 1680-1699 may include any number of systems, subsystems, and modules to implement the methods and techniques described herein. Examples of such subsystems are illustrated, including an imaging subsystem 1680 with an electronic hardware camera, obstruction identification subsystem 1682, irradiance calculation subsystem 1684, slope calculation subsystem 1686, future obstruction estimation subsystem 1688, tree variety identification subsystem 1690, graphical user interface generation subsystem 1692, three-dimensional modeling subsystem 1693, ray-path modeling subsystem 1694, solar panel placement subsystem 1696, divergent beam ray-path shape selection subsystem 1698, and analemma resolution subsystem 1699.

The ray-path modeling subsystem 1694 may utilize captured images to generate a three-dimensional model that includes the structure, obstacles on the structure, and/or obstacles proximate to the structure. The level of detail, the accuracy of the scan, and the newness (e.g., a recent scan as opposed to old, outdated satellite images) of the scan all contribute to more accurate solar irradiance calculations.

In various embodiments, the ray-path modeling subsystem 1694 may identify and conceptually divide the roof surfaces into a plurality of polygons. Each polygon may be approximated as a planar surface, the normal to which represents the ideal angle from which to receive solar radiation. National services and databases can be used to look up the maximum solar irradiation possible for a given geolocation (e.g., based on the longitude and latitude of the structure). Additionally, or alternatively, a maximum possible solar irradiation level may be measured at the location. Similarly, publicly available databases and calculators may be used to model the relative location of the sun at any given time, past or future.

The ray-path modeling subsystem 1694 may model ray paths between each polygon on the roof and the modeled location of the sun. The ray-path modeling subsystem 1694 may determine an angle between the normal to each polygon on the roof and the ray between the polygon and the modeled location of the sun. In some embodiments, the ray-path modeling subsystem 1694 may approximate or estimate the solar irradiance as zero for each polygon for which the ray path between the polygon and the modeled location of the sun is at an angle in excess of the glancing angle.

In various embodiments, the ray-path modeling subsystem 1694 may model ray-path tracing for other objects in the space that may obstruct a ray path between the modeled location of the sun and a polygon on the roof, depending on the modeled location of the sun for a given day and time. The system may model the ray path between each polygon on the roof surface and the modeled location of the sun at different times of the day and for different days each week.

The ray-path modeling subsystem 1694 may model the number of polygons on the roof of the surface and a corresponding number of modeled ray paths to achieve a target balance between accuracy and processing speed. Increasing the number of polygons or other locations used to model the roof surface(s) may increase the resolution and/or accuracy of the solar irradiance calculations but increase the complexity of the calculations.

The ray-path modeling subsystem 1694 may calculate the solar irradiance associated with each polygon in time increments selected by the user or at default time increments. For example, solar irradiation values may be calculated every second of every day of every year. As another example, to reduce the computational load, the system may calculate the solar irradiation values of each polygon every fifteen minutes of one day each week for a year.

The ray-path modeling subsystem 1694 calculates the decrease in solar irradiation based on ray paths being blocked by obstructions and/or at an angle to the normal of each respective polygon for the various time increments. For various modeled locations of the sun, the ray paths to some polygons may be blocked by obstacles proximate to the house (e.g., trees or other buildings) or by obstacles on the roof of the house (e.g., swamp coolers, AC units, vent pipes, satellite dishes, other portions of the roof, etc.). Effectively, the ray paths that are blocked correspond to the shadows that would be present for different locations of the sun at various times of the day and various days during the year.

For instance, the ray-path modeling subsystem 1694 may model the sun as being directly overhead at noon such that the ray paths are relatively unobstructed. However, at other times of the day, the ray-path modeling subsystem 1694 may model the ray paths and identify ray paths blocked by, for example, vent pipes, other portions of the roof, or nearby trees. The ray-path modeling subsystem 1694 may identify these blocked ray paths as shadows on the roof and different times of the day. The modeled location of the sun may depend, at least in part, on the latitude of the structure, longitude of the structure, season, day of the year, time of day, etc.

The ray-path modeling subsystem 1694 identifies ray paths between locations on the roof and the modeled location of the sun that are obstructed by an object at various time increments throughout a time period. The blocked ray paths correspond to shadows that will be cast on the locations of the roof at various times of day, always, and/or on various days of the year.

In the various embodiments, a UAV 1670 may capture images (optical or otherwise), and the UAV 1670 or a remote system may perform imaging processing and/or utilize computer vision techniques to identify planar sections of the roof, relative pitches thereof, objects on the roof, and/or objects and structures proximate the roof.

The ray-path modeling subsystem 1694 may implement a polygonal modeling of the roof surface to facilitate dividing the roof surface into a discrete set of locations and facilitate the identification of a normal from each polygon surface corresponding to the ideal ray path for optimum solar irradiance. For example, the ray-path modeling subsystem 1694 may conceptually divide the roof surface into a plurality of triangles, squares, hexagons, rectangles, or another polygonal shape.

In some embodiments, the ray-path modeling subsystem 1694 may calculate the normal to the surface of the roof for a plurality of locations on the surface of the roof without necessarily dividing the roof into a plurality of polygons. For example, the thousands of points on the surface of the roof may be identified, and the solar irradiance ray-path tracing to various modeled locations of the sun at various time increments during a time period may be mapped. The solar irradiance to each location on the roof may be modeled based on the presence of an obstruction (i.e., blocking the ray path) and the angle of the ray path relative to the normal of the surface underlying each respective location.

In various embodiments, the graphical user interface generation subsystem 1692 may use the data from the ray-path modeling subsystem 1694 to display a heatmap that uses various shades of gray or different colors (e.g., blackbody temperature modeling) to illustrate the relative impact or effect of various obstacles and obstructions. White or red may be used to show unshaded portions of the roof. Darker gray shading or darker shades of blue may be used to show the impact or effect of shadows (ray-blocking objects) on the roof that have a significant or relatively higher light-blocking effect over a period of time. Lighter gray shading or various shades of red may be used to show the impact or effect of shadows cast by obstacles that have less of an overall light-blocking effect over a period of time.

The graphical user interface generation subsystem 1692 may present a graphical user interface with slider or selection icons that allow a user to view the solar irradiation heatmap on the roof of a structure at various times during a multi-year time period. As the user moves, for example, the slider, to transition the image from a first day in a starting year to another day in a future year, the graphical user interface may augment the three-dimensional model to show tree growth, building construction, weather conditions (e.g., sunny days, cloudy days, snow, rain, etc.). The granularity of the slider or another selection icon in the graphical user interface may allow for average solar irradiance values to be displayed as a heatmap, and averaged over a period of minutes, hours, days, weeks, months, or years.

For instance, a slider with hourly granularity may allow the user to visualize an hour-by-hour change in solar irradiance as a heatmap on the surface of a roof every hour for any number of days, months, or years. Similarly, a selection element with daily or weekly granularity allows a user to visualize a daily or weekly change in solar irradiance as a heatmap on the surface of the roof during an extended time period.

In some embodiments, the graphical user interface may allow the user to visualize the snow on the roof. Average annual snowfalls, temperatures, and other weather information may be used to modify the three-dimensional model to show the effect of the snow on the heatmap. In other embodiments, as a user navigates through the hours, days, or weeks of a wintertime period, the graphical user interface may display snow on the roof of the structure for a number of days corresponding to the average weather patterns for the location of the structure.

The solar panel placement subsystem 1696 may model the placement of solar panels on the roof based on the solar irradiance calculations. The divergent beam ray-path shape selection subsystem 1698 may select a ray-path modeling using line segments, as described herein. In other embodiments, the divergent beam ray-path shape selection subsystem 1698 (e.g., part of a divergent beam ray-path modeling subsystem) may cause the system to use cones and/or pyramids instead of line segments. The conical or pyramidal ray paths may be used to reduce the likelihood of object occlusion when sparse sampling is employed. The analemma resolution subsystem 1699 allows for an automatic system-selection or customized user-selection of a modeling resolution for the solar ray-path modeling. Lower resolution solar ray-path modeling can be accomplished in less time and/or with fewer computing resources than relatively higher resolution solar ray-path modeling.

The analemma resolution subsystem 1699 may allow for the selection of the number of analemmas to be used (corresponding to the number of samples taken each day) and the number of points in each analemma (corresponding to the number of sample days in a given time period). For time periods corresponding to a full year, the analemma may have a complete shape similar to that of a figure-eight. For partial year time periods, the analemma may be cut off or have a gap.

Figure 16B:
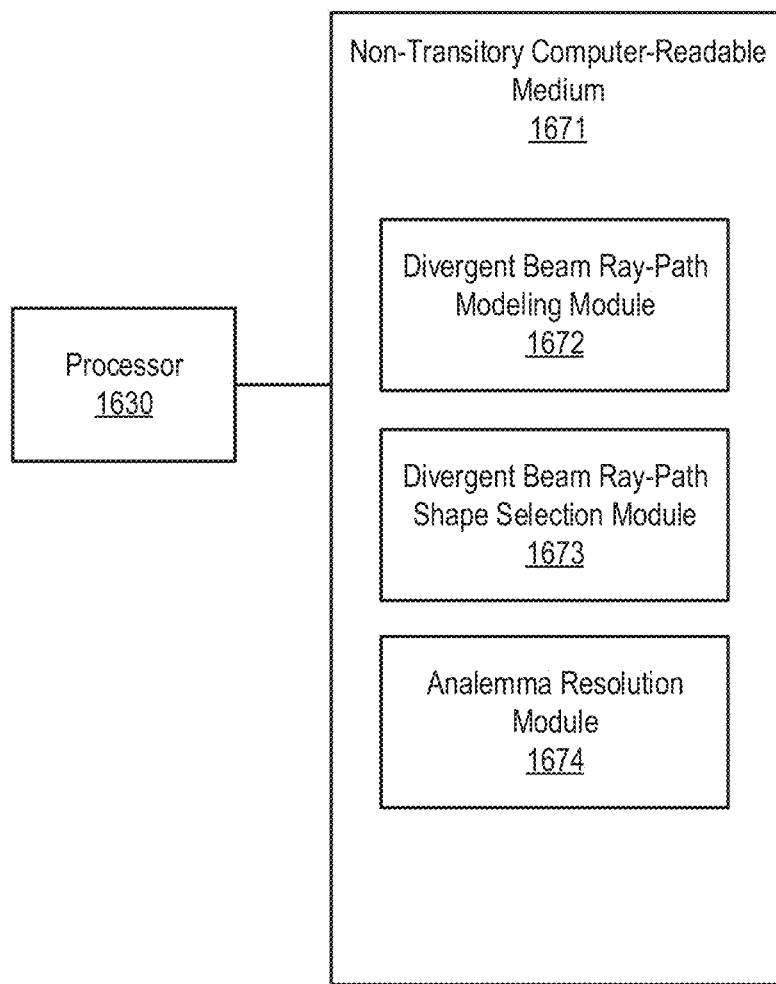
FIG. 16B illustrates a non-transitory computer-readable medium for ray-path modeling, according to one embodiment.

FIG. 16B illustrates a non-transitory computer-readable medium 1671 for ray-path modeling, according to one embodiment. As illustrated, the non-transitory computer-readable medium 1671 may be in communication with a processor 1630 to execute instructions. The non-transitory computer-readable medium 1671 includes instructions for a divergent beam ray-path modeling module 1672, a divergent beam ray-path shape selection module 1673, and an analemma resolution module 1674. The divergent beam ray-path modeling module 1672 may facilitate the modeling of a divergent beam ray path between each of a plurality of locations on the roof and modeled locations of the sun relative to the roof at each of a plurality of discrete times during a time period.

The divergent beam ray-path shape selection module 1673 may determine whether the divergent beam ray paths are modeled as cones or pyramids. The analemma resolution module 1674 may determine the daily sampling interval, the number of sampling days, and/or the total time period for sampling during which the divergent beam ray paths are modeled from each location on the roof to the modeled location of the sun at a given sample time.

Figure 17A:
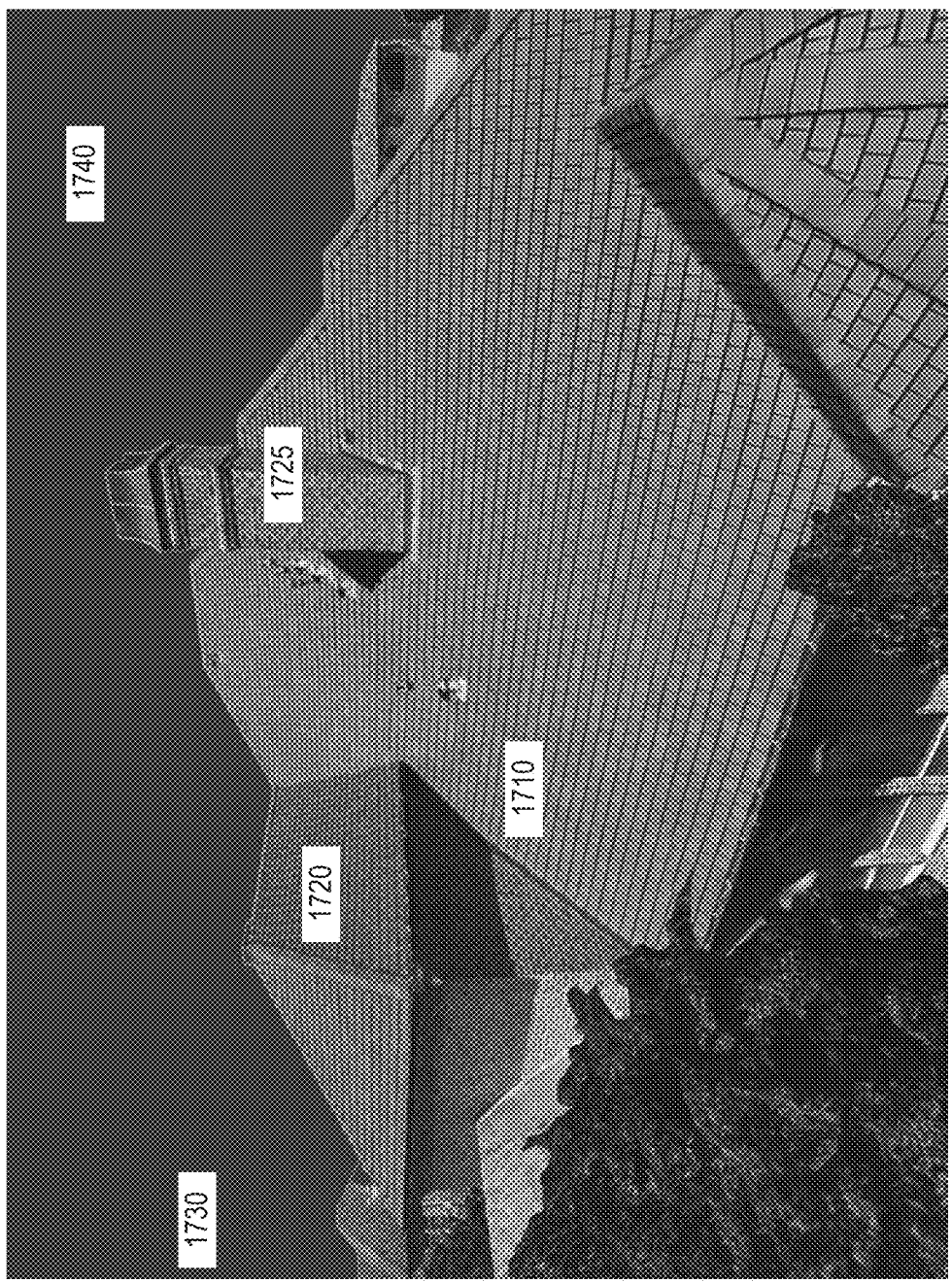
FIG. 17A illustrates a three-dimensional model of a space that includes multiple trees and a house with multiple roof surfaces at different angles, according to one embodiment.

FIG. 17A illustrates a three-dimensional model of a space that includes multiple trees and a house with multiple roof surfaces at different angles. Ray paths incident on location 1710 may be blocked by a higher portion of the roof 1720 for some modeled locations of the sun (e.g., location 1730). Similarly, ray paths from locations on the surface 1720 may be blocked by the chimney 1725 when the sun is modeled in location 1740.

Figure 17B:
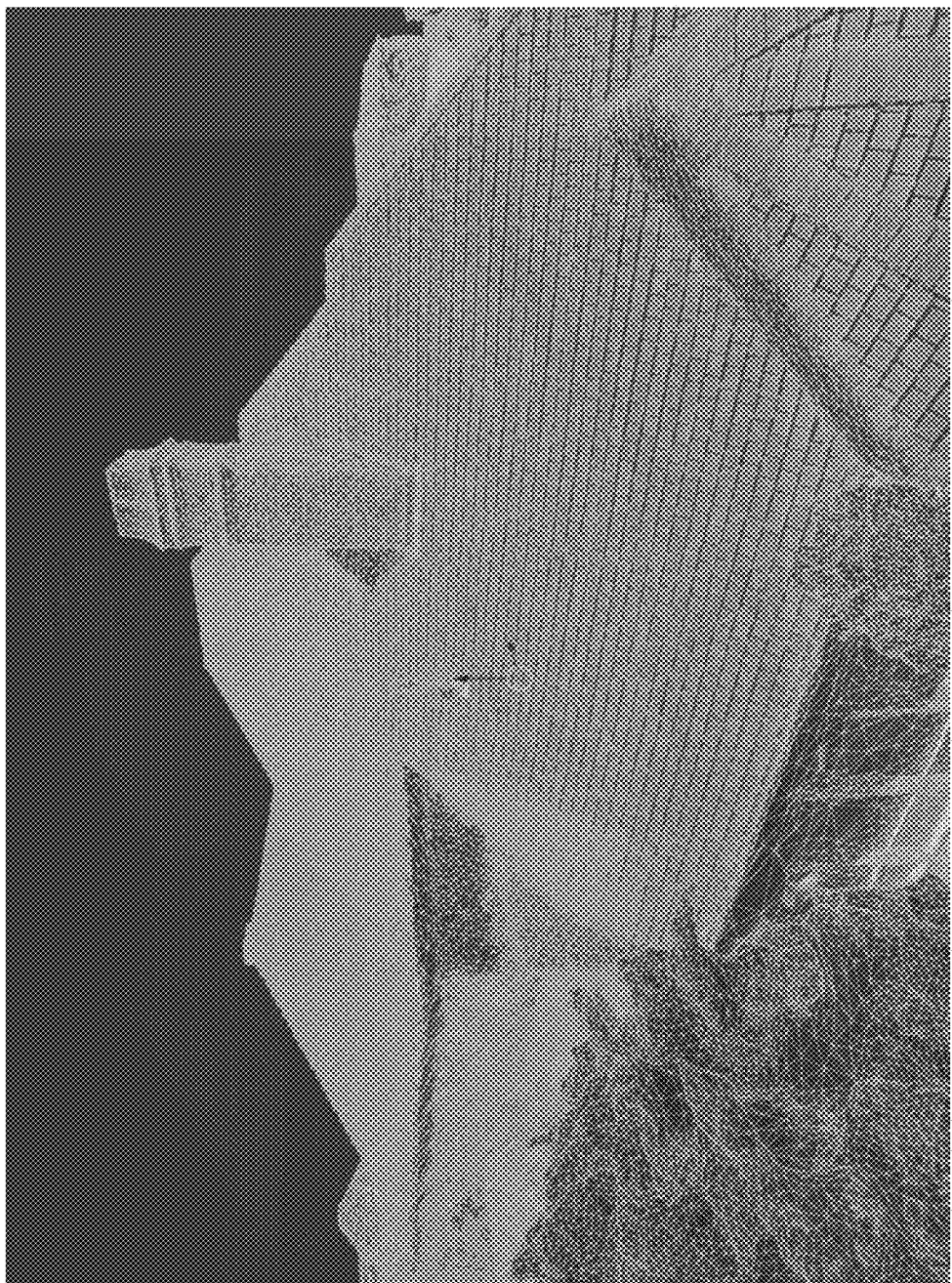
FIG. 17B illustrates a polygonal mapping of the surfaces in the three-dimensional model of FIG. 17A, according to one embodiment.

FIG. 17B illustrates a polygonal mapping of the surfaces in the three-dimensional model of FIG. 17A. In the illustrated embodiment, triangles having edges within a preset range of lengths are used to map the two-dimensional surface of the structure and other objects in the three-dimensional space. Other polygons may be used and/or locations may be selected for ray-path modeling without necessarily mapping the surface with polygons. The smaller the polygons and/or the more locations from which ray paths are evaluated, the more complex the analysis is, and the longer it will take to complete for a given set of computing resources. However, the accuracy and granularity of the solar irradiance calculations, and ultimately the resolution of the displayed heatmap, are increased with smaller polygons or more locations from which solar rays are mapped. In some examples, the edges of the polygons fitted to the two-dimensional surface of the roof are constrained to be within 0.01 and 0.5 meters.

For example, in a specific embodiment, the roof is mapped with a plurality of triangles having edge lengths between 0.1 and 0.15 meters. For a lower resolution but faster processing time, triangles having edge lengths between 0.2 and 0.3 meters may be used. A lower spatial resolution may utilize polygons with edge lengths of 0.5 meters. A ray path from the centroid of each triangle may be mapped to modeled locations of the sun at various time increments for a time window of weeks, months, or even years. Unblocked ray paths contribute to the overall average solar irradiance for a given location on the roof, while blocked ray paths indicate an obstacle will occlude solar irradiance during the analyzed time period.

In some embodiments, a random or patterned number of locations on the roof may be modeled for ray-path tracing. For instance, the area of each polygon may be approaching, approximate, or equal to zero such that the polygons are dots or points that are spaced apart from one another. The dots or points may be patterned or randomly positioned on the roof with a density selected to achieve a target balance between resolution and processing speed. The density of the dots or points (or non-zero-area polygons) may also be a function of the time increment used to model the solar irradiance.

Figure 17C:
FIG. 17C illustrates a polygonal mapping of one roof surface of the house in the three-dimensional model of FIG. 17A, according to one embodiment.

FIG. 17C illustrates a polygonal mapping of one roof surface of the house in the three-dimensional model of FIG. 17A. In some instances, a customer may indicate that this is the only surface on which he or she wants to place solar panels. Ray-path mapping may be used to determine how many solar panels should be placed on this roof surface and in which locations to obtain a specific amount of solar power over a selected time period.

Figure 17E:
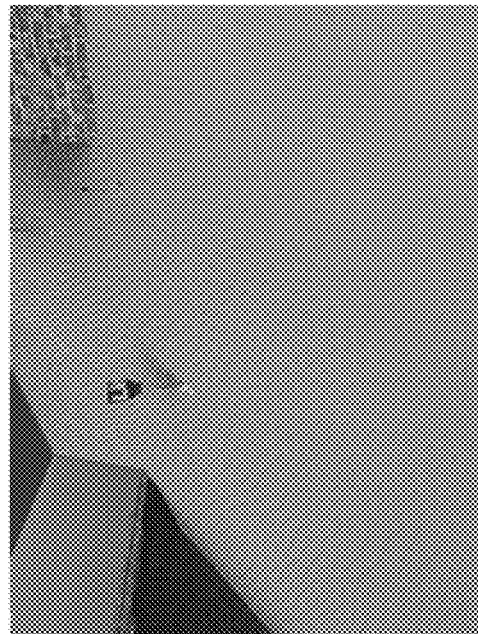
FIG. 17E illustrates a close-up view of the polygonal mapping of a portion of the roof of the house in the three-dimensional model of FIG. 17A, according to one embodiment.
Figure 17D:
FIG. 17D illustrates a polygonal mapping of the roof surfaces of the house in the three-dimensional model of FIG. 17A, according to one embodiment.

FIG. 17D illustrates a polygonal mapping of the roof surfaces of the house in the three-dimensional model of FIG. 17A. Ray paths may be mapped from the centroid of each polygon on each surface of the roof to determine instantaneous, average, and total solar irradiance values for each location on the roof of the house.

FIG. 17E illustrates a close-up view of the polygonal mapping of a portion of the roof of the house in the three-dimensional model of FIG. 17A.

Figure 17F:
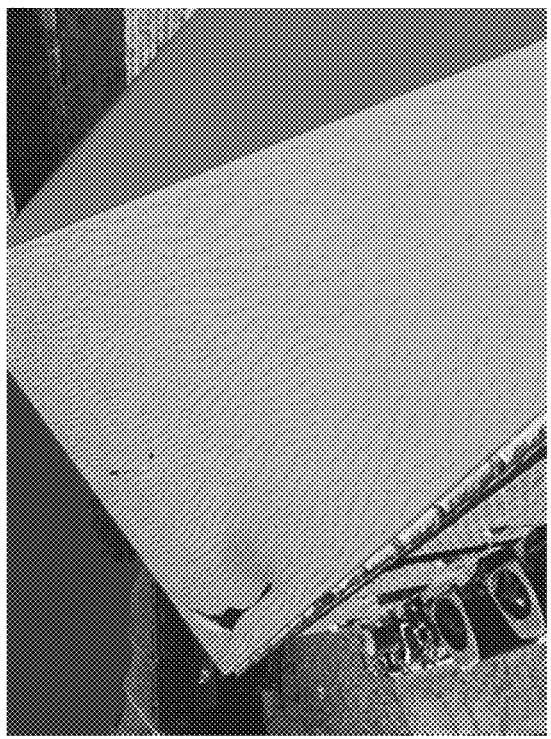
FIG. 17F illustrates another close-up view of the polygonal mapping of a different portion of the roof of the house in the three-dimensional model of FIG. 17A, according to one embodiment.

FIG. 17F illustrates another close-up view of the polygonal mapping of a different portion of the roof of the house in the three-dimensional model of FIG. 17A.

Figure 18:
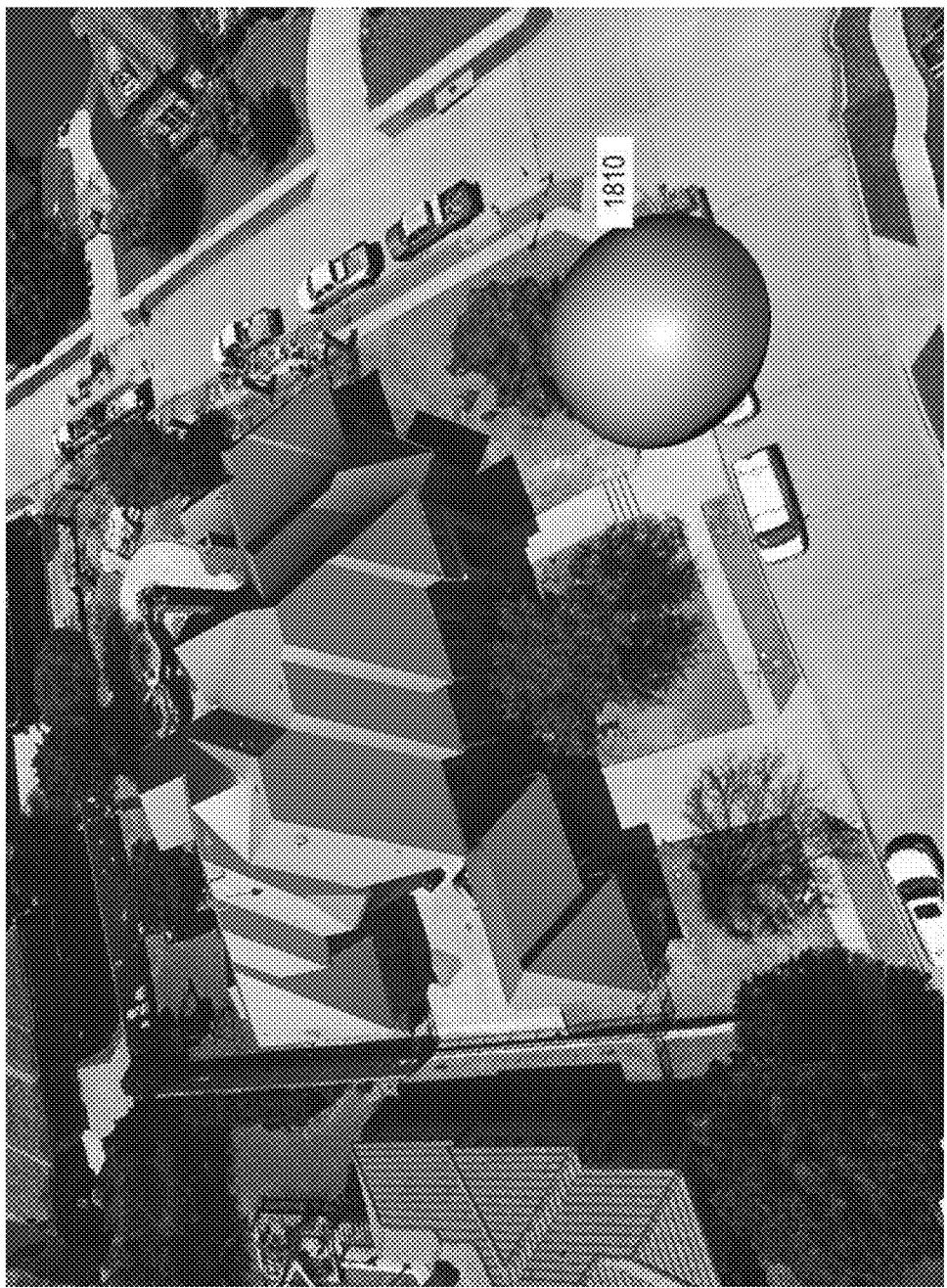
FIG. 18 illustrates a top view of the house in the three-dimensional model of FIG. 17A with a multi-faceted sphere for modeling solar irradiance, according to one embodiment.
Figure 19A:
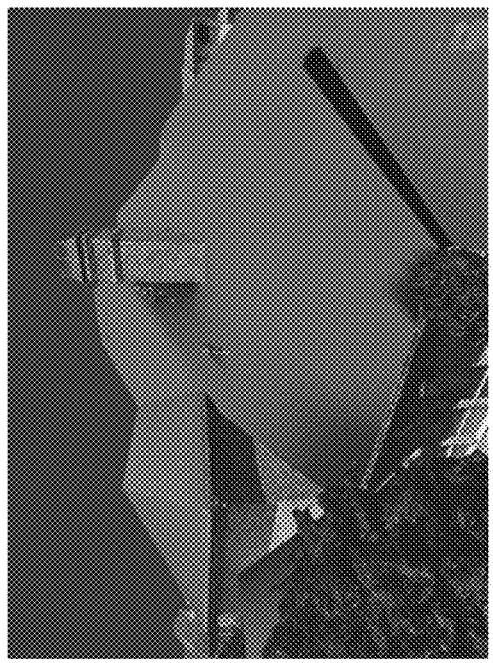
FIGS. 19A-D illustrate an example of a color-coded heatmap representing the calculated solar irradiance on each surface of the roof at different times as the sun rises and then sets in the sky relative to the roof of the house in the three-dimensional model.
Figure 19B:
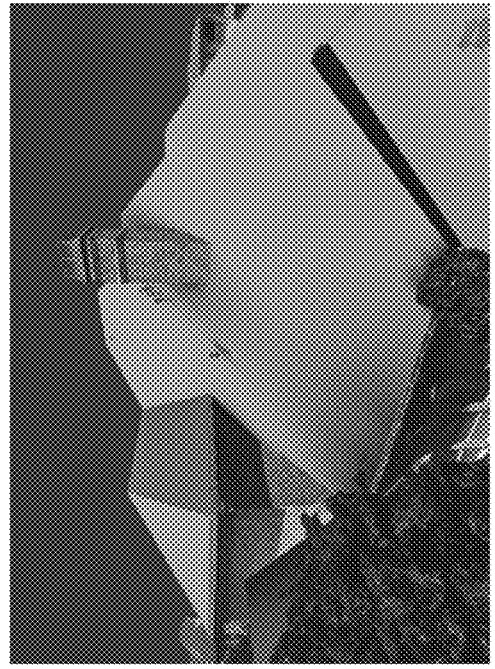
Figure 19C:
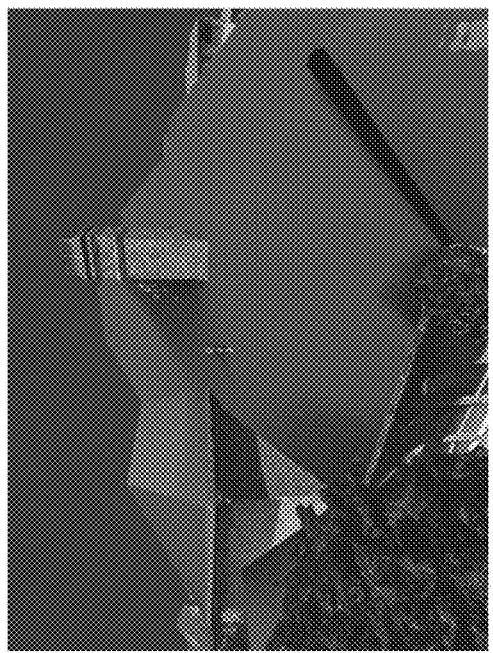
Figure 19D:

FIG. 18 illustrates a top view of the house in the three-dimensional model of FIG. 17A with a multi-faceted sphere for modeling solar irradiance. The sphere 1810 includes polygonal facets that each have a normal at a different angle relative to the modeled location of the sun. The brightest white location is the only location at which the angle of incidence of the sun is parallel to the normal of the polygonal facet. Ray paths from all other facets to the modeled location of the sun are at an angle relative to the normal of the polygonal facet and, therefore, does not receive a maximum solar irradiance value. Edges of the sphere may have ray paths at angles in excess of the glancing angle and therefore be modeled as receiving little or no solar irradiance.

Each location on the surface of the roof of the house may be mapped to one of the polygonal facets on the sphere. Absent any obstructions, each location on a given planar surface will have the same solar irradiance values for a given time period.

FIGS. 19A-D illustrate a color-coded heatmap (shown in grayscale, but available in an example color version in the provisional patent application file) that represents the calculated solar irradiance on each surface of the roof at different times as the sun rises and then sets relative to the roof of the house in the three-dimensional model of FIG. 17A. The ray paths early in the morning and late at night are at greater angles relative to the normal of the various locations (e.g., centroids of triangles) on the roof of the structure. Accordingly, the average solar irradiance in the morning and evening is lower than when the sun is high in the sky.

Figure 20:
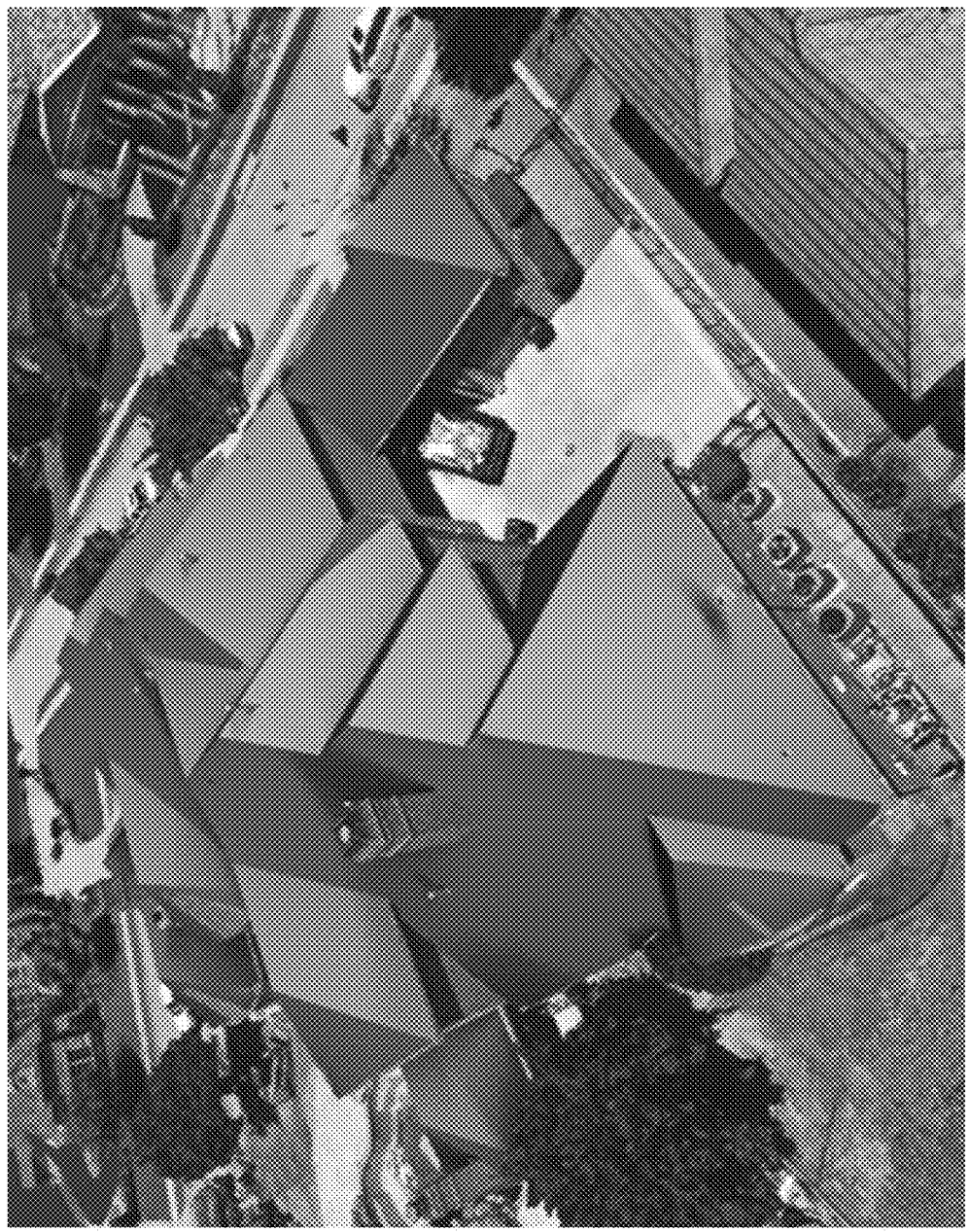
FIG. 20 illustrates a color-coded heatmap showing the calculated solar irradiance on various surfaces of the house in the three-dimensional model at one example time, according to one embodiment.

FIG. 20 illustrates a color-coded heatmap showing the calculated solar irradiance on various surfaces of the house in the three-dimensional model of FIG. 17A at one example time.

Figure 21A:
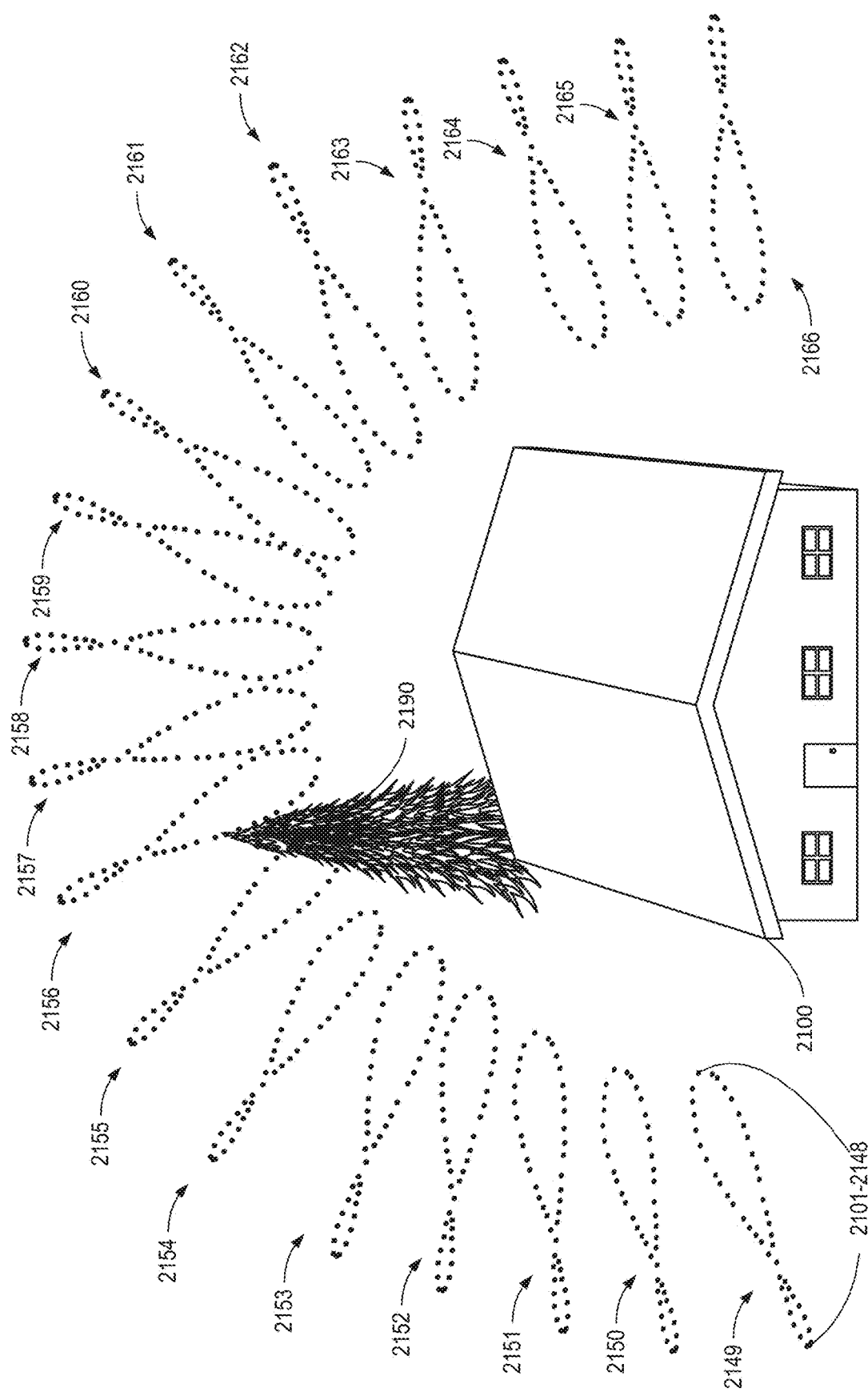
FIG. 21A illustrates a model of the roof and multiple analemmas for solar ray mapping, according to one embodiment.

FIG. 21A illustrates a model of a roof 2100 and multiple analemmas 2149-2166 for solar ray mapping, according to one embodiment. Each dot in each analemma 2149-2166 represents a mapped location of the sun 2101-2148 at a specific time of day on a specific day of the year. For example, analemma 2149 may represent the location of the sun at 5 am (likely obscured by the horizon). Analemma 2166 may represent the location of the sun at 10 pm (again, likely obscured by the horizon). Eighteen analemmas are illustrated to represent one-hour increments of time from 5 am to 10 pm, such that analemma 2157 represents the location of the sun at 1 pm.

In the illustrated example, each analemma is represented by 48 dots, each of which represents the location of the sun 2101-2148 at the specific time of day on different days of the year. For example, the location of the sun at 5 am (analemma 2149) on the summer solstice in the northern hemisphere is represented by the mapped location of the sun 2101. The location of the sun at 5 am (analemma 2149) on the winter solstice in the northern hemisphere is represented by the mapped location of the sun 2148.

Accordingly, the number of analemmas 2149-2166 represents the sampling rate on any given day, which could be expressed in seconds, minutes, or hours. The daily sampling rate may intentionally exclude hours during the day when the sun is known to be obscured by the horizon (e.g., nighttime) and/or below a glancing angle threshold, as described herein. In a sparse low-resolution sampling, only four analemmas may be used to correspond to 9 am, 12 pm, 3 pm, and 6 pm. In a high-resolution sampling, ray-path mapping may be modeled for every second of the day with 86,400 analemmas. The illustrated examples ignore the effects of daylight savings time adjustments, but such adjustments could be modeled if desired or advantageous.

In the illustrated embodiment, each analemma 2149-2166 is represented by 48 dots corresponding to the modeled locations of the sun 2101-2148 on 48 different days of the year. In sparse or lower-resolution modeling, the number of dots may be reduced significantly. For example, twelve dots could be used to sample one day each month of the year. In higher-resolution modeling, as many as 365 dots may be used in each analemma to model every day of the year (or 366 in a leap year). In the illustrated embodiments, the spacings of the analemmas and the spacings of the dots in each analemma are uniform to represent uniform sampling intervals of time on each given day and uniform samples of days during a given year, respectively. However, it is appreciated that non-uniform spacing may be used to represent an increased focus (e.g., weighting or importance) on specific times of the day or specific days or months of the year.

For example, the ray-path modeling may include analemmas every hour from 5 am to 11 am, every 15 minutes from 11 am to 6 pm, and then every hour from 6 pm to 11 pm. Similarly, each analemma may include daily sampling between April and October and weekly sampling between November and March.

As illustrated, the tree 2190 is an obstacle that will block solar rays from reaching varying locations of the roof 2100 at different times of the day and on different days of the year, as illustrated in the subsequent figures.

Figure 21B:
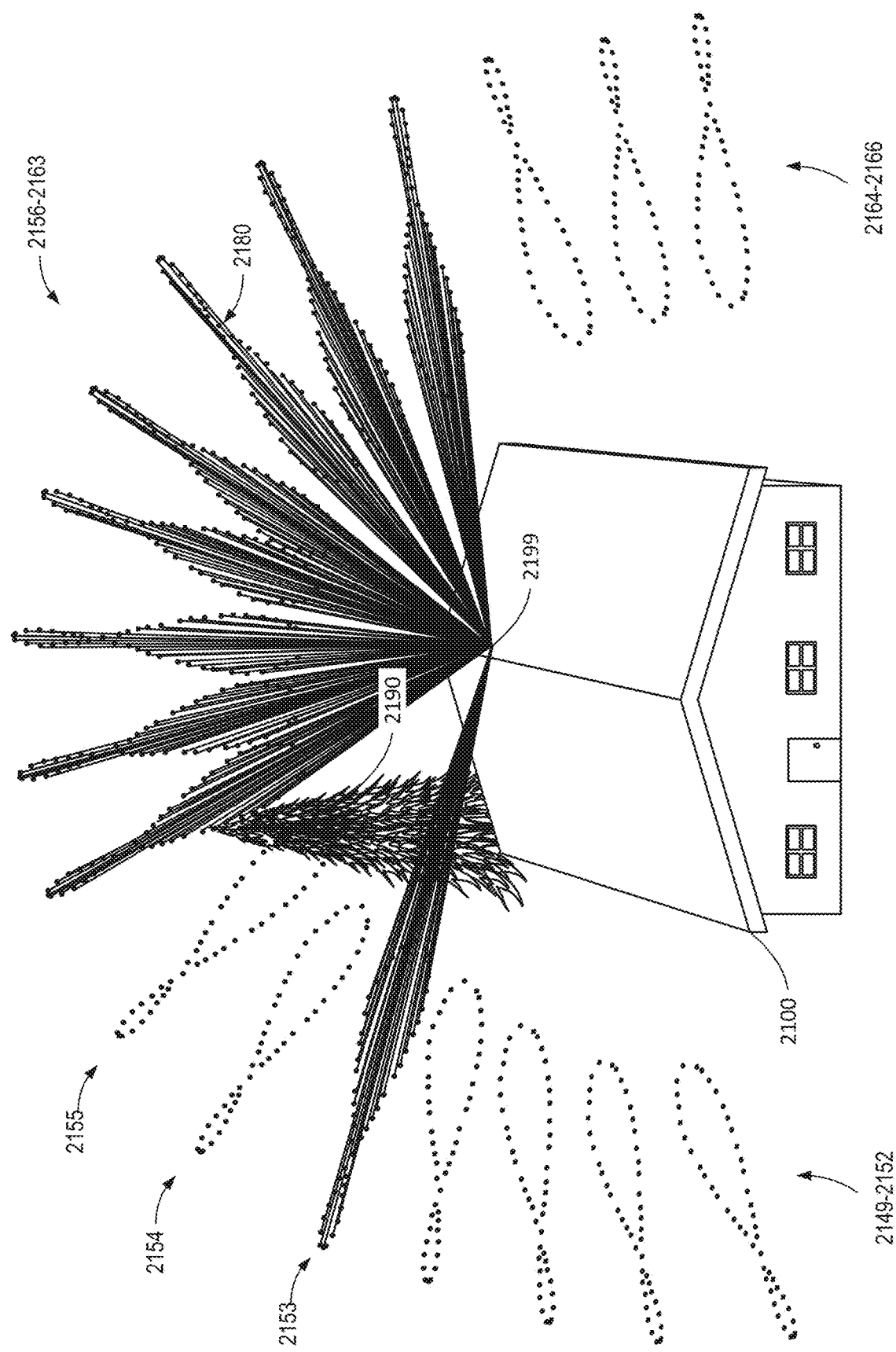
FIG. 21B illustrates solar rays mapped to points on analemmas that are not blocked by a tree, according to one embodiment.

FIG. 21B illustrates solar rays 2180 mapped between a location 2199 on the roof 2100 and the modeled locations of the sun on each of the analemmas 2149-2166 that are not blocked by the tree 2190, below a glancing angle threshold, and/or blocked by the horizon, according to one embodiment. For example, ray paths to analemmas 2149-2152 and 2164-2166 are blocked by the horizon, blocked by the peak of the roof, and/or are incident below a threshold glancing angle. In contrast, the ray paths from analemma 2153 and 2156-2163 are unobstructed between the location on the roof 2199 and each modeled location of the sun. The tree 2190 blocks ray paths between the location 2199 on the roof 2100 and the modeled locations of the sun in analemmas 2154 and 2155.

Figure 21C:
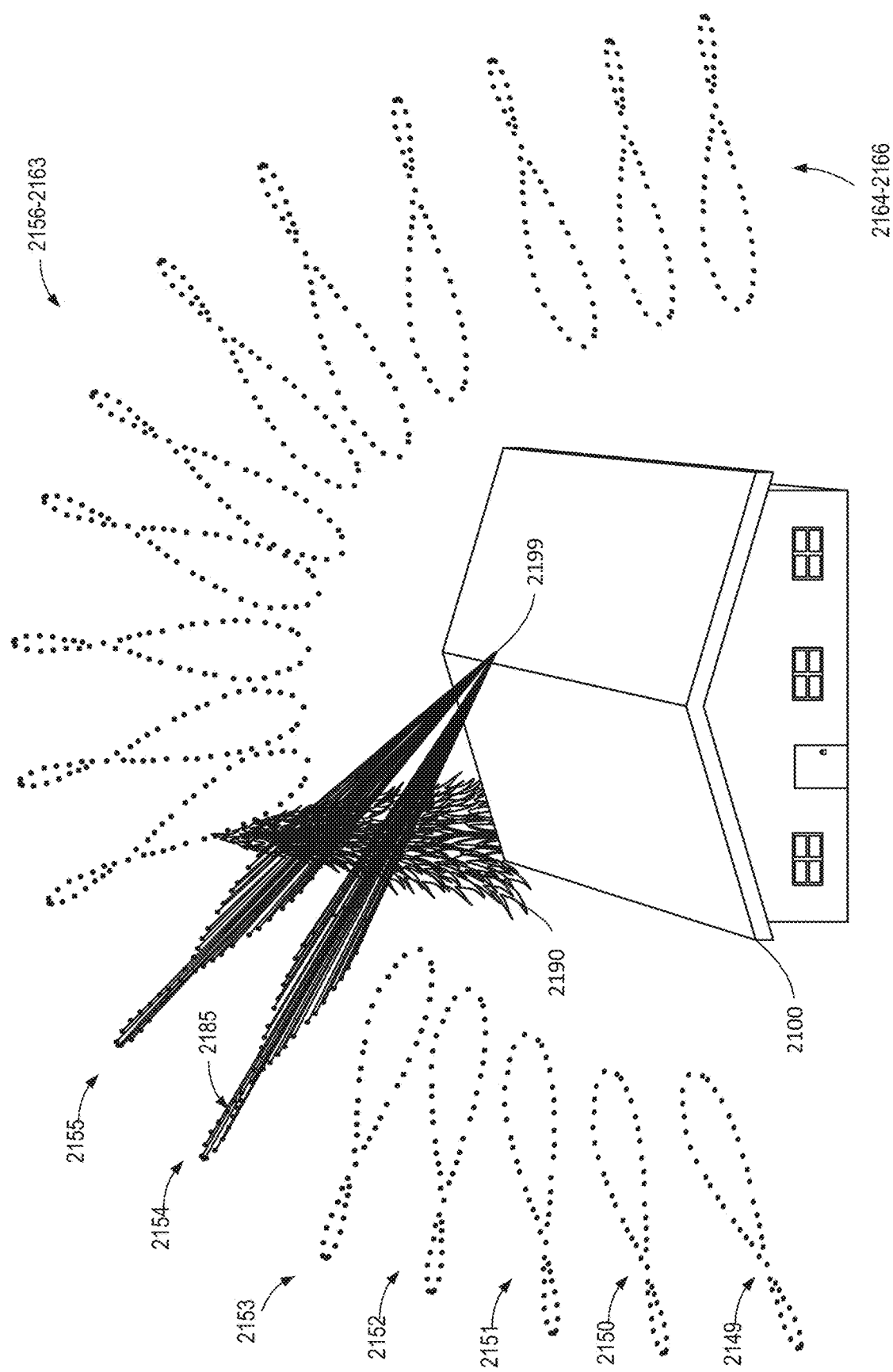
FIG. 21C illustrates solar rays mapped to points on analemmas that are blocked by the tree, according to one embodiment.

FIG. 21C illustrates the solar ray paths modeled between the location 2199 on the roof 2100 and the locations of the sun within analemmas 2154 and 2155 that are blocked or obstructed by the tree 2190, according to one embodiment.

Figure 22A:
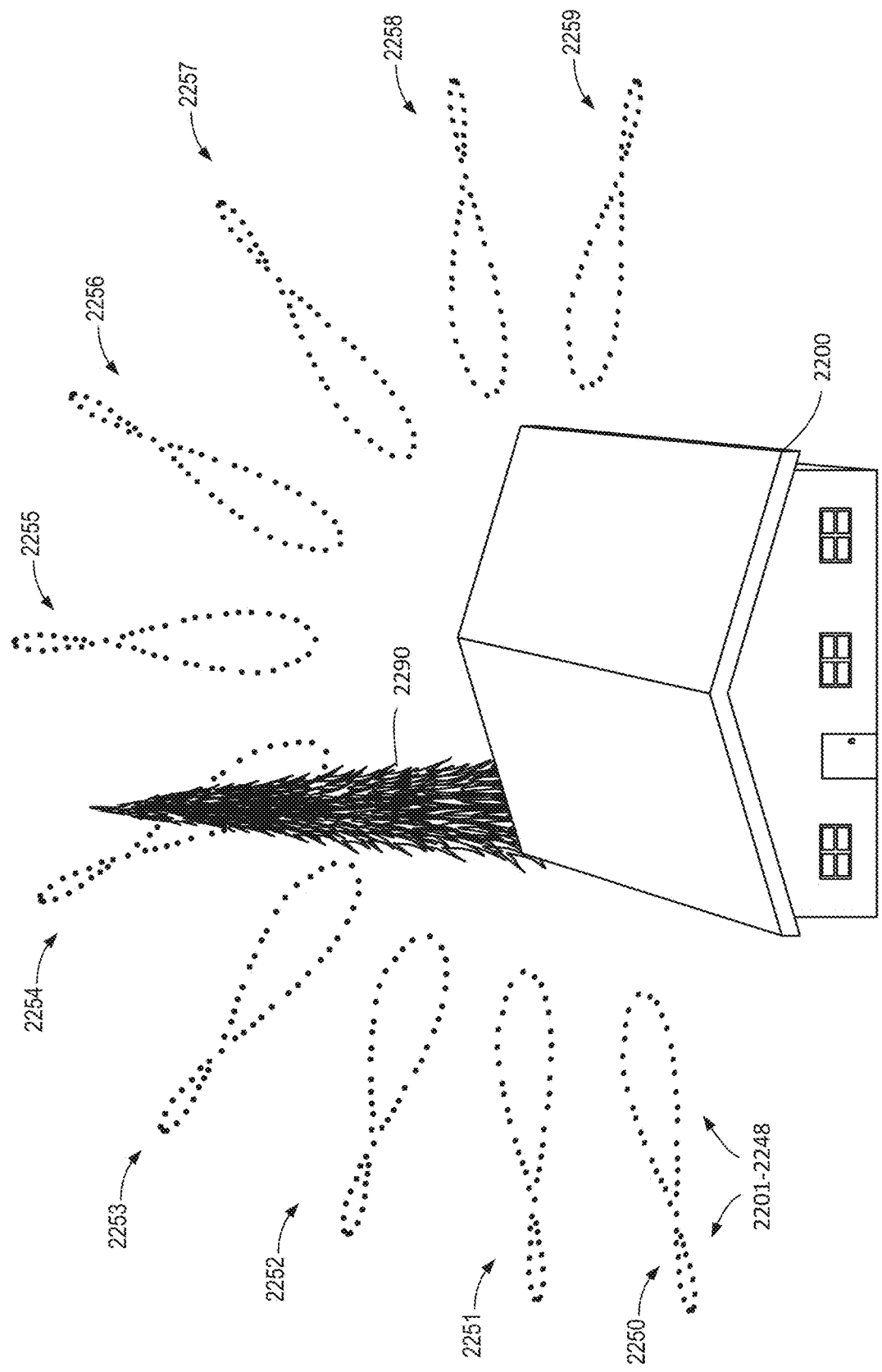
FIG. 22A illustrates another example of a model of a roof with multiple analemmas for solar ray mapping, according to one embodiment.

FIG. 22A illustrates another example of a model of a roof 2200 with multiple analemmas 2250-2259 for solar ray mapping, according to one embodiment. The illustrated embodiment includes only ten analemmas 2250-2259, representing ten different times of the day. Each analemma still includes 48 dots representing 48 different modeled locations of the sun 2201-2248 at each time of day during a one-year period of time. Again, it is apparent that a tree 2290 will block solar rays between the roof 2200 and some locations of the sun at some times of the day and on some days of the year.

Figure 22B:
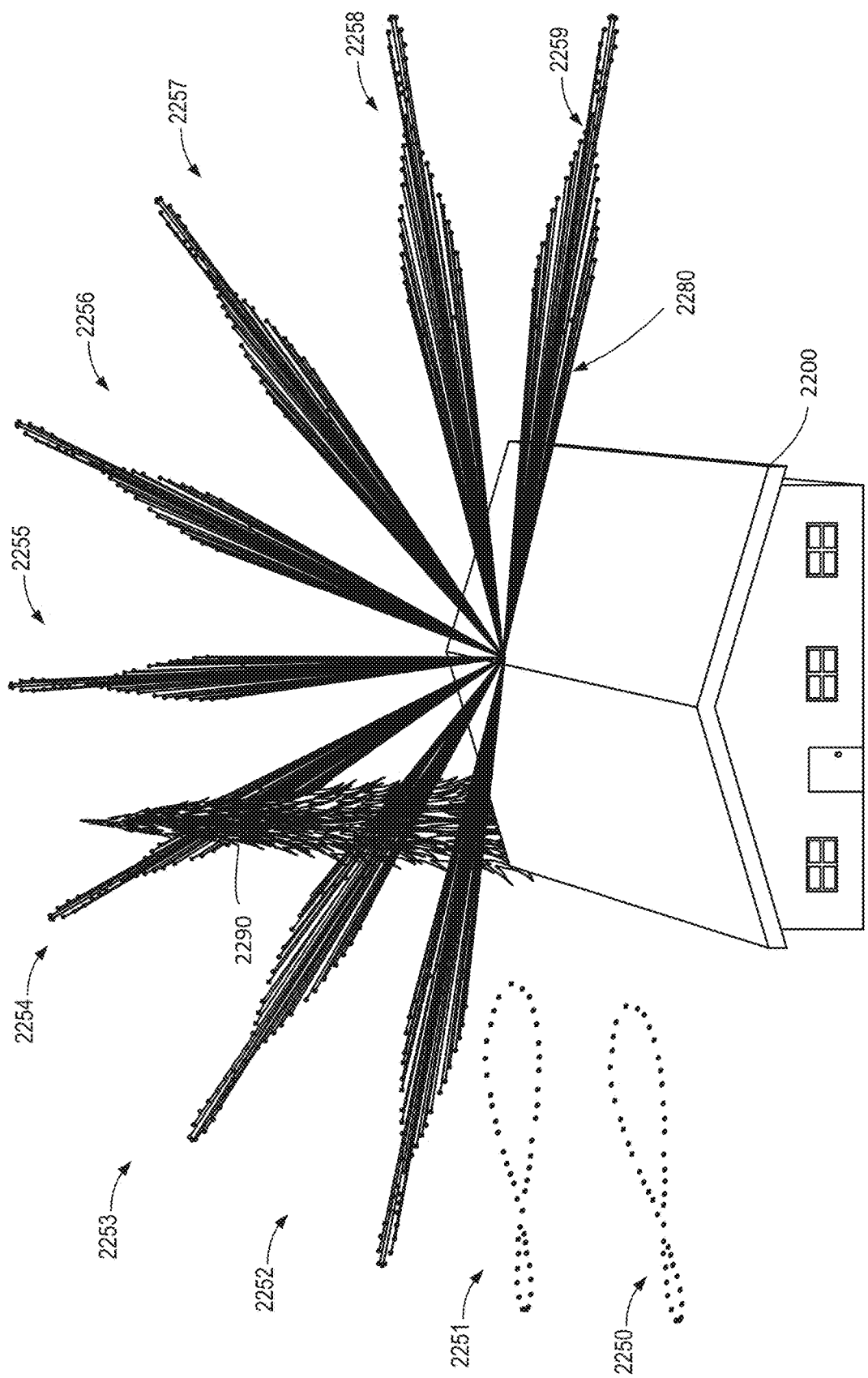
FIG. 22B illustrates the model of the roof with none of the sparsely mapped solar rays blocked by the tree, according to one embodiment.

FIG. 22B illustrates the model of the roof 2200 with none of the mapped solar ray paths 2280 blocked by the tree 2290, according to one embodiment. As illustrated, because the spacing of the analemmas 2250-2259 is relatively sparse, none of the mapped solar ray paths 2280 are blocked. In such an embodiment, the modeling system may fail to account for the shadowing effects of the tree 2290 when calculating the solar irradiance.

Figure 23A:
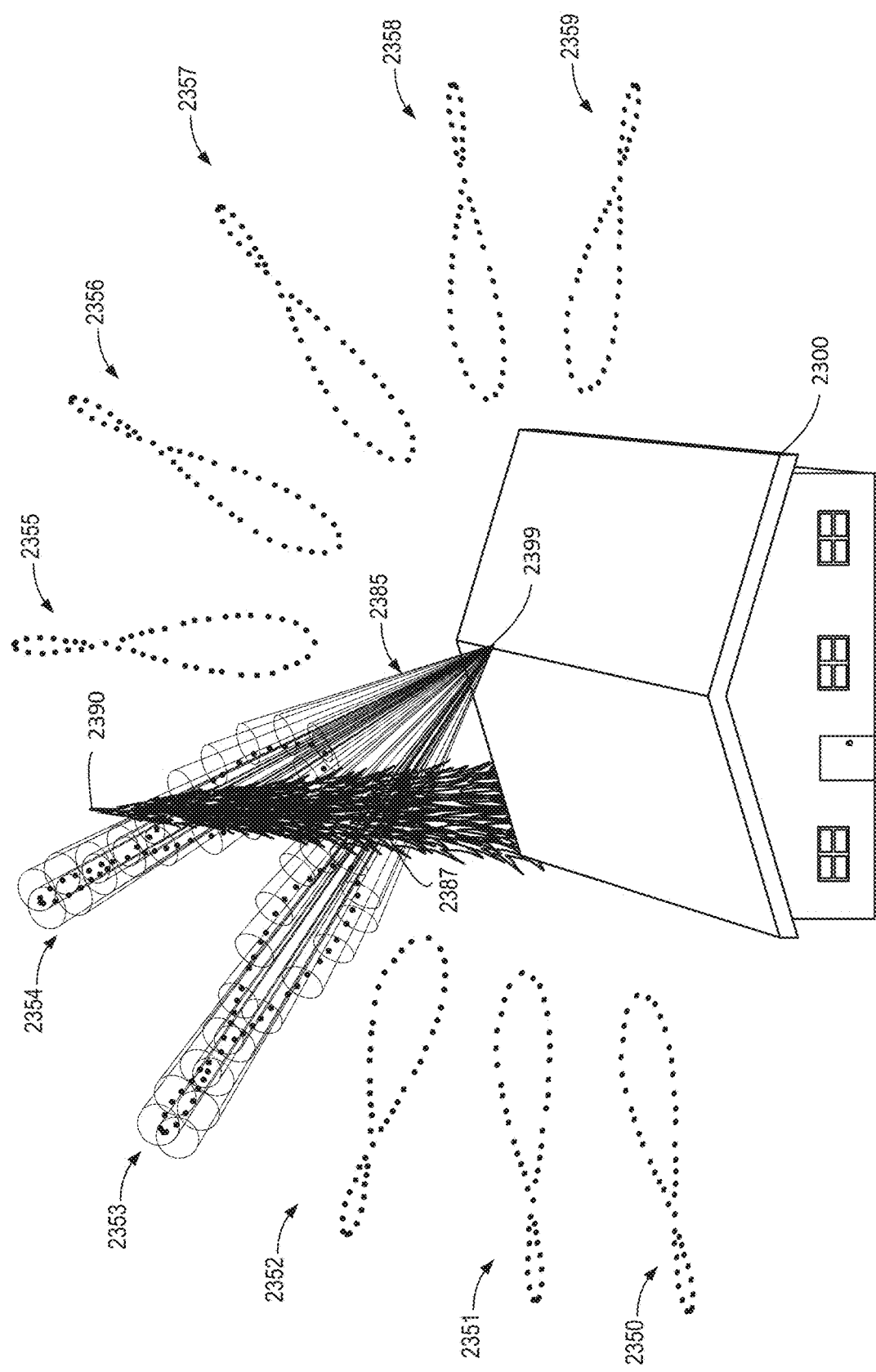
FIG. 23A illustrates a model of a roof with divergent beam solar rays mapped using conical beams to avoid object occlusion in the sparsely mapped solar ray mapping, according to one embodiment.

FIG. 23A illustrates a model of a roof 2300 with divergent beam solar ray paths 2385 and 2387 mapped using conical beams to avoid object occlusion in the relatively sparse (lower resolution) solar ray mapping, according to one embodiment. As in FIGS. 22A and 22B, only ten analemmas 2350-2359 are included in the illustrated embodiment. However, to avoid missing the shadowing effects of the tree 2390, divergent beam solar ray paths 2385 and 2387 (e.g., in the form of cones) are illustrated to improve object detection. Conical divergent beam solar ray paths 2387 (shown with darker shading) at least partially intersect the tree 2390 as they diverge from the location 2399 on the roof 2300.

Conical divergent beam solar ray paths 2385 (shown in lighter shading) are unobstructed. Conical divergent beam solar ray paths 2385 would also be unobstructed to the modeled locations of the sun in analemmas 2352 and 2355-2358, but are not illustrated to avoid obscuring the drawing. Conical divergent beam solar ray paths from the location 2399 to analemmas 2350, 2351, and 2359 may be blocked by the peak of the roof 2300, the modeled location of the sun may be blocked by modeled locations of the horizon, and/or the ray paths may be below a glancing threshold value. In some embodiments, the modeled location of the horizon may be based on images of the horizon, assumed to be flat, assumed to include hills or mountains, and/or be user-definable.

Figure 23B:
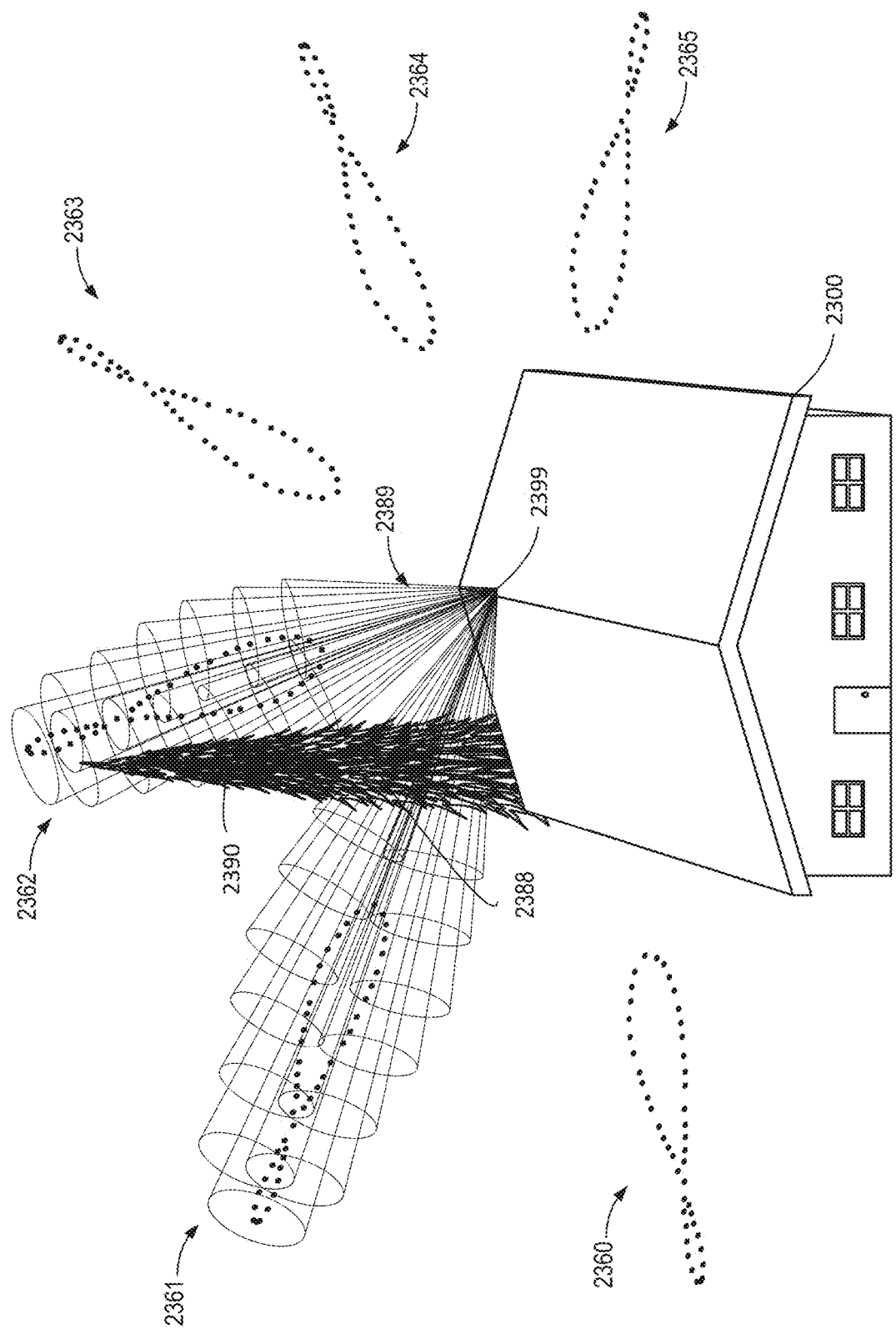
FIG. 23B illustrates a model of a roof with divergent beam solar rays mapped using wider conical beams to avoid object occlusion in an even sparser solar ray mapping, according to one embodiment.

FIG. 23B illustrates a model of the roof 2300 with divergent beam solar rays 2388 and 2389 mapped using wider conical beams to avoid object occlusion (e.g., tree 2390) in an even sparser solar ray mapping that only includes six analemmas 2360-2365, according to one embodiment. The rate or angle at which the analemmas 2360-2365 diverge from the location 2399 may be based, at least in part, on the spacing of the analemmas 2360-2365 (i.e., the daily time sampling interval).

In one embodiment, a user may specify a minimum number of arcseconds for object detection. Objects occupying a smaller field of view relative to each location on the roof 2300 may be missed. Objects occupying a larger field of view than the threshold width in arcseconds (or other width specification convertible to arcseconds) will not be missed. The system may then specify one or both of the daily time sampling interval and/or the rate of divergence of the divergent beam solar rays to ensure that objects larger than the threshold width are detected, and the shadowing effects of such objects are factored into the solar irradiance calculation.

In each of the illustrated examples of FIGS. 23A and 23B, divergent solar ray paths are modeled between a single location on the roof 2300 and modeled locations of the sun in the analemmas. However, as described herein, the system may model the divergent solar ray paths to any number of locations on the roof 2300 according to a target spatial resolution. Mappings to multiple locations on the roof 2300 are omitted from the drawings to avoid obscuring the drawings.

FIG. 24 illustrates a model of a roof 2400 with divergent beam solar rays 2488 and 2489 mapped using pyramidal beams to avoid object occlusion in a sparse solar ray mapping, according to one embodiment. The pyramidal divergent beam solar rays 2488 (shown with darker shading) are obstructed or at least partially intersect the tree 2490. The pyramidal divergent beam solar rays 2489 (shown with lighter shading) are unobstructed to the modeled locations of the sun in the analemmas 2461 and 2462.

In some embodiments, the system may detect that some divergent beam solar rays are at least partially obstructed (e.g., pyramidal divergent beam solar rays 2488) and may dynamically increase the resolution of the solar ray-path mapping in that region to increase the accuracy of shadow detection and associated solar irradiance calculations. For example, the system may dynamically determine that two additional analemmas between 2461 and 2462 would increase the accuracy with which the shadowing effects of the tree 2490 are factored into the calculated solar irradiance at the location 2499 on the roof 2400. The system may additionally or alternatively determine that additional days (i.e., more dots in each analemma) should be included in some analemmas to increase the accuracy, as described above. Thus, the system may dynamically increase the temporal and/or spatial resolution of the solar ray mapping (using divergent beam solar rays or segment-based solar rays) when objects are detected. The enhanced resolution may increase the time and/or computing power to complete the solar irradiance calculation but increase the accuracy thereof. In some embodiments, the dynamic resolution enhancement may be limited or disabled to ensure calculations are completed within a specified budget, using specified computing resources, and/or within a specified timeframe.

In some embodiments, the system may dynamically lower the resolution when no obstacles are detected and when increased extrapolation is not expected to decrease accuracy. For example, the system may model solar ray paths (divergent beam or otherwise) between each of locations 2499, 2499', 2499", 2499''', and 2499"" and the modeled locations of the sun in analemmas 2463 and 2464. Based on the determination that no obstacles existed between any of these spatially separated locations on the roof 2400 and the analemmas 2463 and 2464, the system may dynamically decrease the spatial resolution of the number of locations on the roof 2400 to be solar ray mapped to analemmas 2463 and 2464. For example, 10,000 locations may normally be used for solar ray mapping. The system may dynamically lower the spatial resolution for solar rays mapped to analemmas 2463 and 2464 to only 100 locations. Data for the other 9,900 locations may be extrapolated by the system without any loss of accuracy since there are no detected obstacles.

Additionally, or alternatively, the number of locations of the sun in each of analemmas 2463 and 2464 may be dynamically decreased, and data for different days may be extrapolated without any loss of accuracy. Additionally, or alternatively, analemmas 2463 and 2464 may be combined or one of them deleted, and the missing data can be extrapolated without any loss of accuracy.

In alternative embodiments, the system may start with a relatively low-resolution mapping of fewer locations on the roof 2400, fewer analemmas, and/or fewer dots in each analemma. Very wide divergent beam solar rays may be mapped to avoid missing objects wider than a threshold width. When an object is detected, the system may dynamically increase the spatial and/or temporal resolution while simultaneously decreasing the width of the divergent beam solar rays until each object is detected with a target resolution. Regions of the three-dimensional model that do not include detected obstacles can continue to be modeled with sparse, lower resolutions without significant (or perhaps any) loss of accuracy.

Figure 25A:
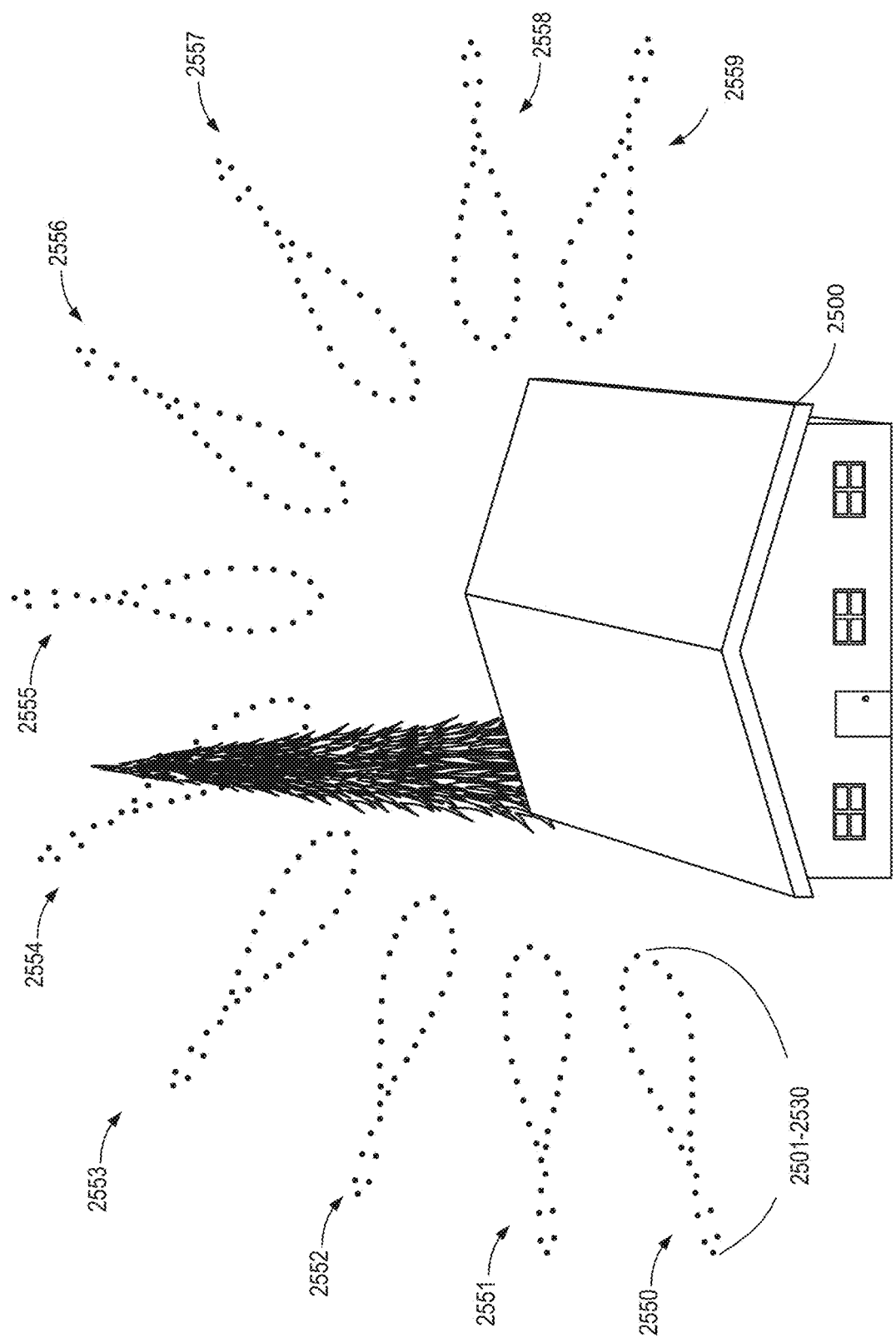
FIG. 25A illustrates a sparse solar ray mapping of a roof with fewer days in each analemma, according to one embodiment.

FIG. 25A illustrates a model of a roof 2500 of sparse solar ray mapping with fewer days mapped per analemma, according to one embodiment. Specifically, each of analemmas 2550-2559 includes only thirty dots, representing solar ray mapping corresponding to the modeled locations of the sun 2501-2530 on thirty days of each year.

FIG. 25B illustrates a model of a roof 2500 of sparse solar ray mapping with only the summer months mapped, according to one embodiment. Accordingly, the bottom portion of each of the analemmas 2560-2565 is missing since no days are mapped during the winter months. The summer months include mapped locations of the sun 2531-2546 on sixteen different days, as represented by the sixteen dots forming the top half of each analemma 2560-2565.

This disclosure has been made with reference to various embodiments, including the best mode. However, those skilled in the art will recognize that changes and modifications may be made to the embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present disclosure should, therefore, be understood to encompass at least the claims presented herein.

What is claimed is:

1. A method, comprising:

modeling a ray path between each of a plurality of locations on a surface of a structure and modeled locations of a sun relative to the surface of the structure at each of a plurality of different times during a time period;

identifying a first set of the modeled ray paths that, for their respective locations on the surface and times during the time period, are unobstructed between the surface and the respective modeled locations of the sun;

identifying a second set of the modeled ray paths that, for their respective locations on the surface and times during the time period, are obstructed by an obstacle between the surface and the respective modeled locations of the sun; and calculating a solar irradiance value for each location on the surface between a first time and a second time based, at least in part, on the identified unobstructed ray paths associated with each respective location on the surface between the first time and the second time.

2. The method of claim 1, further comprising:
calculating an angle of each modeled ray path relative to a normal of each respective location on the surface of the structure at each of the plurality of different times during the time period,
wherein calculating the solar irradiance value for each location on the surface is further based on the calculated angle of each unobstructed ray path.

3. The method of claim 1, wherein the surface of the structure is divided into a plurality of polygons, and wherein each location on the surface of the structure corresponds to one of the polygons.

4. The method of claim 3, wherein the plurality of polygons comprises a plurality of triangles, rectangles, rhombi, or hexagons.

5. The method of claim 3, wherein each polygon has an edge length between 0.1 and 0.5 meters.

6. The method of claim 1, wherein each location on the surface of the structure corresponds to a surface area of between 0.01 meters squared and 1.0 meters squared.

7. The method of claim 1, wherein the time period comprises one of: a month, multiple months, a year, and multiple years.

8. The method of claim 1, wherein the plurality of different times during the time period for which ray paths are modeled is defined in terms of a number of days and a number of times each day to model the ray paths.

9. The method of claim 8, wherein the plurality of different times during the time period for which ray paths are modeled is defined such that a ray path is modeled for each location on the surface of the structure between 4 and 48 times each day for between 12 and 365 days for a one-year time period.

10. The method of claim 1, wherein each ray path is modeled as a line segment between a location on the surface of the structure and the modeled location of the sun.

11. A system for divergent beam ray-path modeling, comprising:
a divergent beam ray-path modeling subsystem to model a divergent beam ray path from each of a plurality of locations on a roof of a structure to a modeled location of a sun at multiple, discrete times during a time period;
a beam path analysis subsystem to:
identify obstructed divergent beam ray paths that are obstructed by an obstacle, and
identify unobstructed divergent beam ray paths; and
an irradiance calculation subsystem to calculate a solar irradiance value for each location on the roof of the structure during the time period based on the identified unobstructed divergent beam ray paths associated with each respective location during the time period.

12. The system of claim 11, further comprising:
a modeling subsystem to identify the plurality of locations on the roof of the structure as a number of locations corresponding to a spatial sampling resolution; and
an analemma resolution subsystem to identify the multiple, discrete times during the time period as a number of times each day and a number of days during the time period for which a divergent beam ray path is modeled from each location on the roof of the structure.

13. The system of claim 12, wherein the modeling subsystem is configured to model the roof of the structure as a plurality of polygons, wherein each location on the roof of the structure corresponds to one of the polygons.

14. The system of claim 13, wherein the polygons comprise one or more of: triangles, rectangles, rhombi, and hexagons.

15. The system of claim 11, wherein the number of locations on the roof of the structure and the number of discrete times are selected based on a function of available computing resources and target completion time.

16. The system of claim 11, wherein each divergent beam ray path is modeled as a cone with an apex and an altitude, with the apex at the location on the roof of the structure and the altitude extending from the location on the roof of the structure to one of the modeled locations of the sun.

17. The system of claim 11, wherein each divergent beam ray path is modeled as a pyramid with an apex, an altitude, and an n-sided base, with the apex at the location on the roof of the structure and the altitude extending from the location on the roof of the structure to one of the modeled locations of the sun, wherein n is an integer.

18. The system of claim 11, wherein the beam path analysis subsystem is configured to identify divergent beam ray paths obstructed by an obstacle as those divergent beam ray paths that are one of:
fully obstructed by the obstacle,
partially obstructed by the obstacle, or
obstructed by the obstacle by more than a threshold amount.

19. A non-transitory computer-readable medium with instructions stored thereon that, when executed by a processor of a computing device, cause the computing device to:
model a divergent beam ray path between each of a plurality of locations on a roof and modeled locations of a sun relative to the roof at each of a plurality of discrete times during a time period;
identify divergent beam ray paths that are obstructed by an obstacle positioned between the roof and the respective modeled locations of the sun;
identify unobstructed divergent beam ray paths; and
calculate a solar irradiance value for each location on the roof during the time period based, at least in part, on the identified unobstructed divergent beam ray paths associated with each respective location on the roof during the time period.

20. The non-transitory computer-readable medium of claim 19, wherein the divergent beam ray paths are modeled as one of cones and pyramids diverging as they extend from the locations on the roof to the respective modeled locations of the sun.

* * * * *